US006219376B1

(12) United States Patent
Zhodzishsky et al.

(10) Patent No.: US 6,219,376 B1
(45) Date of Patent: Apr. 17, 2001

(54) APPARATUSES AND METHODS OF SUPPRESSING A NARROW-BAND INTERFERENCE WITH A COMPENSATOR AND ADJUSTMENT LOOPS

(75) Inventors: Mark I. Zhodzishsky, Moscow; Michail Y. Vorobiev, Lyubertcy; Victor A. Prasolov, Moscow, all of (RU); Javad Ashjaee, Saratoga, CA (US)

(73) Assignee: Topcon Positioning Systems, Inc., San Jose, CA (US)

( * ) Notice: Subject to any disclaimer, the term of this patent is extended or adjusted under 35 U.S.C. 154(b) by 0 days.

(21) Appl. No.: 09/027,550

(22) Filed: Feb. 21, 1998

(51) Int. Cl.[7] ................................................. H04B 15/00
(52) U.S. Cl. ......................... 375/148; 375/285; 375/346; 375/350; 455/296; 455/306
(58) Field of Search ...................................... 375/144, 148, 375/285, 346, 348, 350; 455/296, 304, 305, 306

(56) References Cited

U.S. PATENT DOCUMENTS

| 4,589,083 | 5/1986 | Le Dinh et al. | 364/724 |
|---|---|---|---|
| 5,268,927 | 12/1993 | Dimos et al. | 375/1 |
| 5,400,084 | * 3/1995 | Scarpa | 348/624 |
| 5,410,750 | * 4/1995 | Cantwell et al. | 455/306 |
| 5,596,600 | * 1/1997 | Dimos et al. | 375/206 |
| 5,717,717 | * 2/1998 | Yang et al. | 375/232 |
| 5,872,540 | * 2/1999 | Casabona et al. | 342/362 |

OTHER PUBLICATIONS

G.I. Tuzov, Section 4.9 from "Statistical Theory of Reception of Compound Signals," Soviet Radio, Moscow, 1977, pp. 231–238 (in Russian); with English translation thereof attached to the citation. The translation does not replicate the mathematical formulas of the original, but these formulas may be read and understood from the original without the need for translation.

J.J. Spilker, F. D. Natali, Chapter 20 : "Interference Effects and Mitigation Techniques" in *Global Positioning System: Theory and Applications*. vol. I, 1996, pp. 717–771.

J. Przyjemski, et al., "GPS Anti–Jam Enhancement Techniques," Report Case #ASC 93–1384, Department of the Air Force Aeronautical Systems Center (AMSC), Office of Public Affairs, Jun. 7, 1993.

T. Upadhyay, et al., "Test Results on Mitigation of SATCOM–Induced Interference to GPS Operation," Proceedings of the 8–th International Technical Meeting of the Satellite Division of the Institute of Navigation (ION GPS–95), Part 2, pp. 1545–1552.

* cited by examiner

*Primary Examiner*—Stephen Chin
*Assistant Examiner*—Dac V. Ha
(74) *Attorney, Agent, or Firm*—Coudert Brothers

(57) ABSTRACT

Method of suppression of narrow-band interferences attending at the receiver input added to the useful broadband signal and noise.

There is a disclosed compensator rejecting narrow-band interferences by means of adjustment loops. Two general methods of construction of such loops are considered. The first general method is based on filtration of the in-phase and quadrature components of the error vector—difference of the interference vector and compensating vector. The second method is based on filtration of the amplitude and full phase of the interference signal. Automatic tuning of the compensator to the mean frequency and effective interference band is ensured.

85 Claims, 17 Drawing Sheets

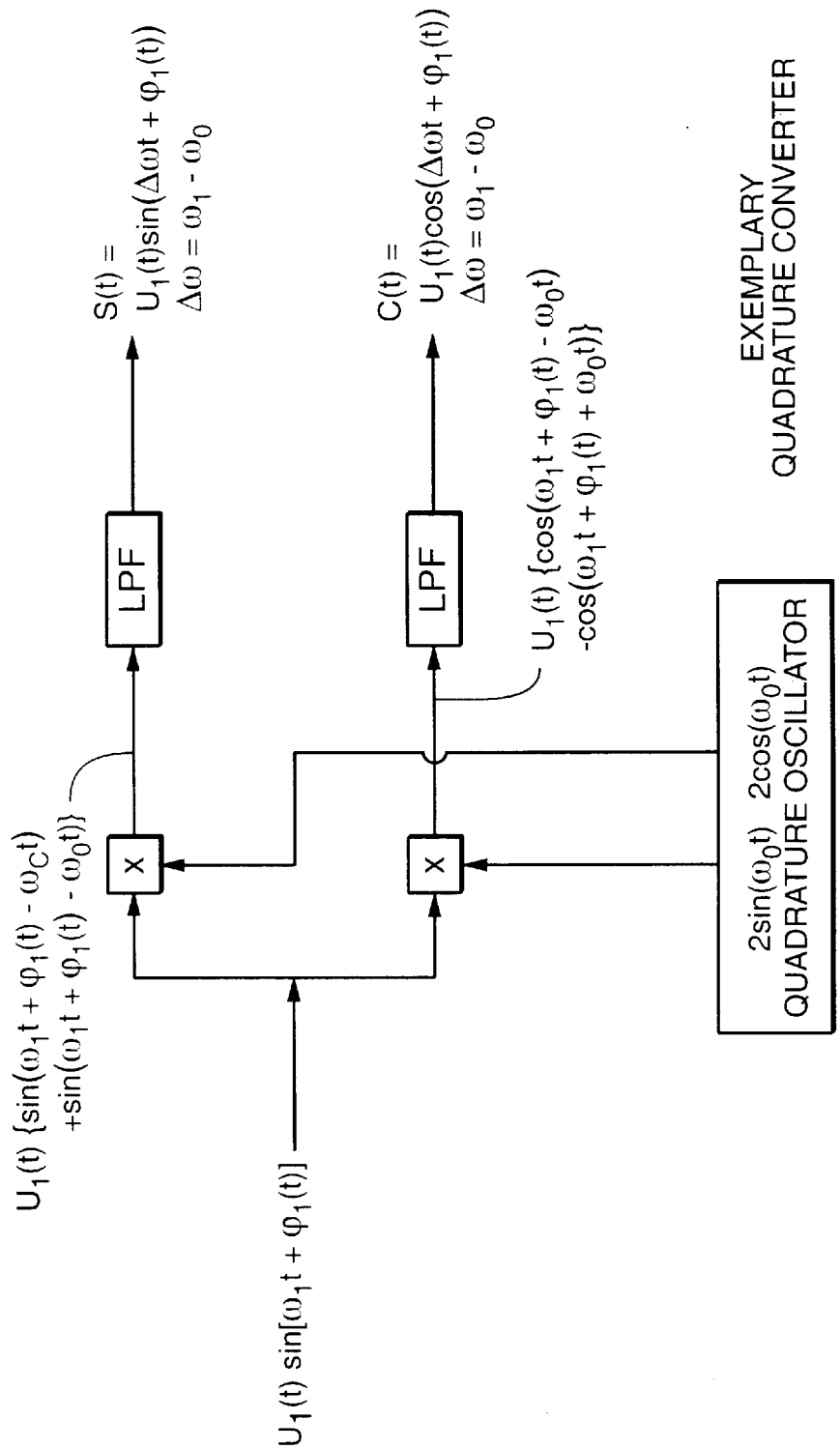
FIG._1A  EXEMPLARY QUADRATURE CONVERTER

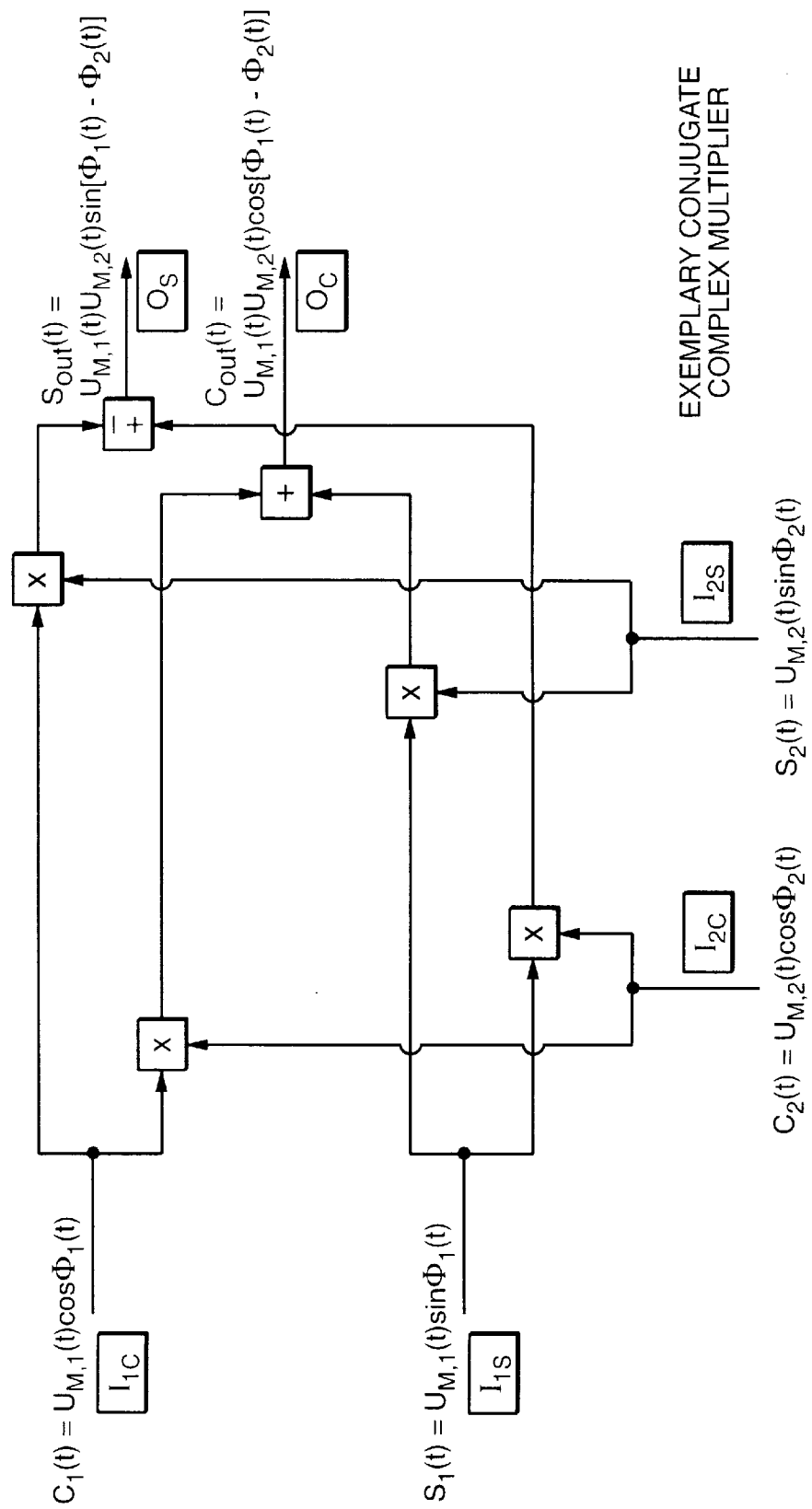
FIG._1B
EXEMPLARY CONJUGATE COMPLEX MULTIPLIER

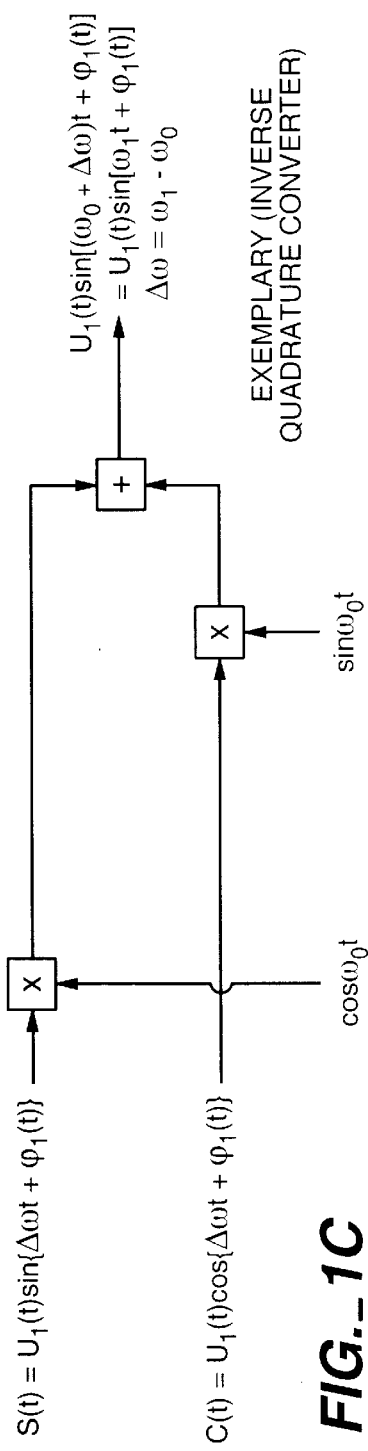
FIG._1C
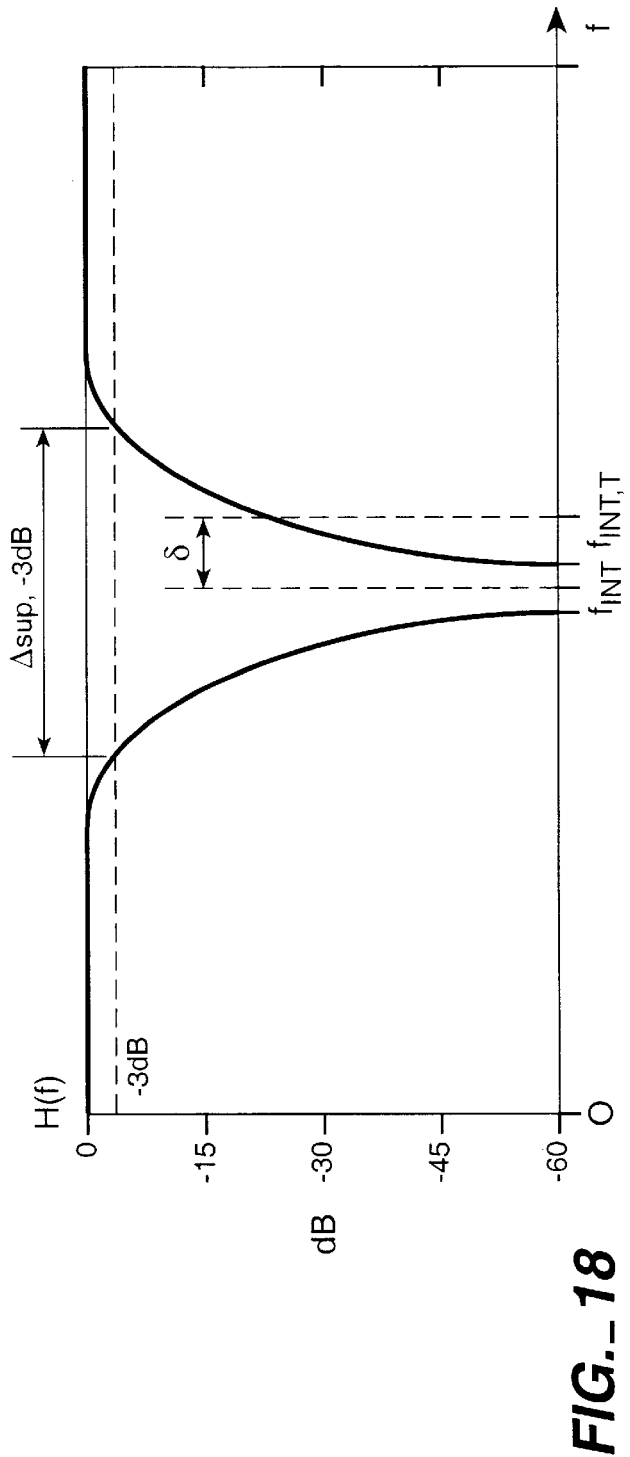
FIG._18

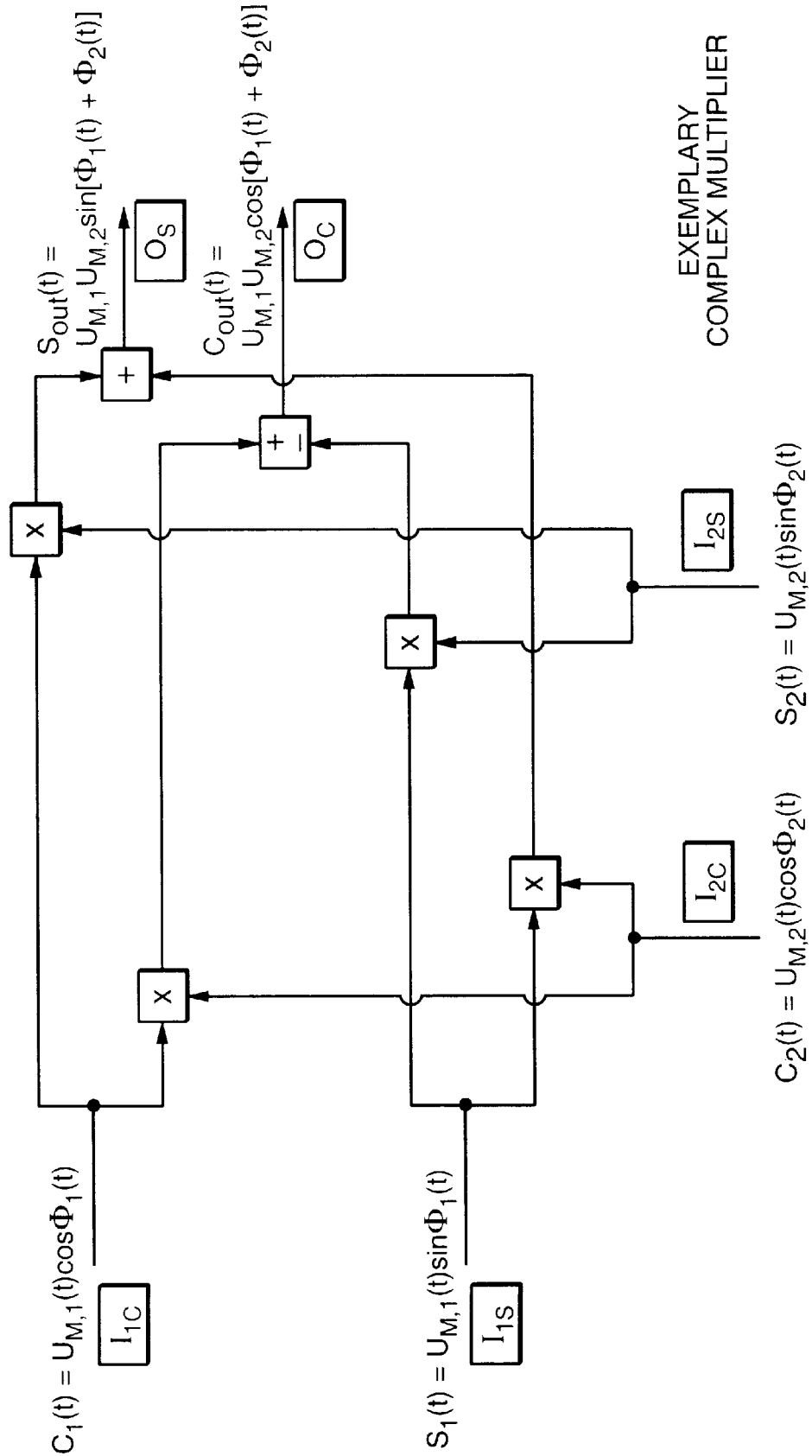
FIG._1D
EXEMPLARY COMPLEX MULTIPLIER

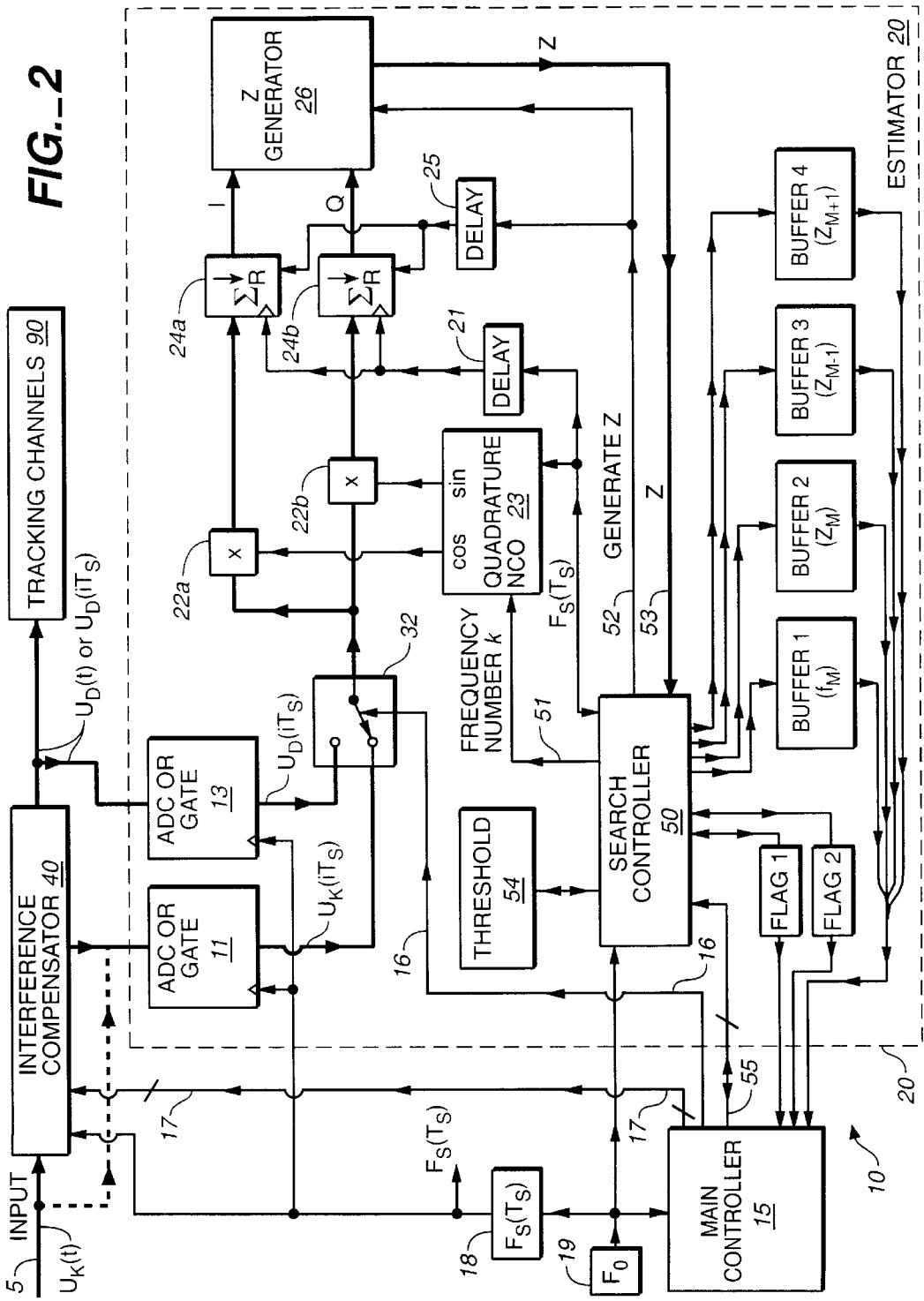
FIG._2

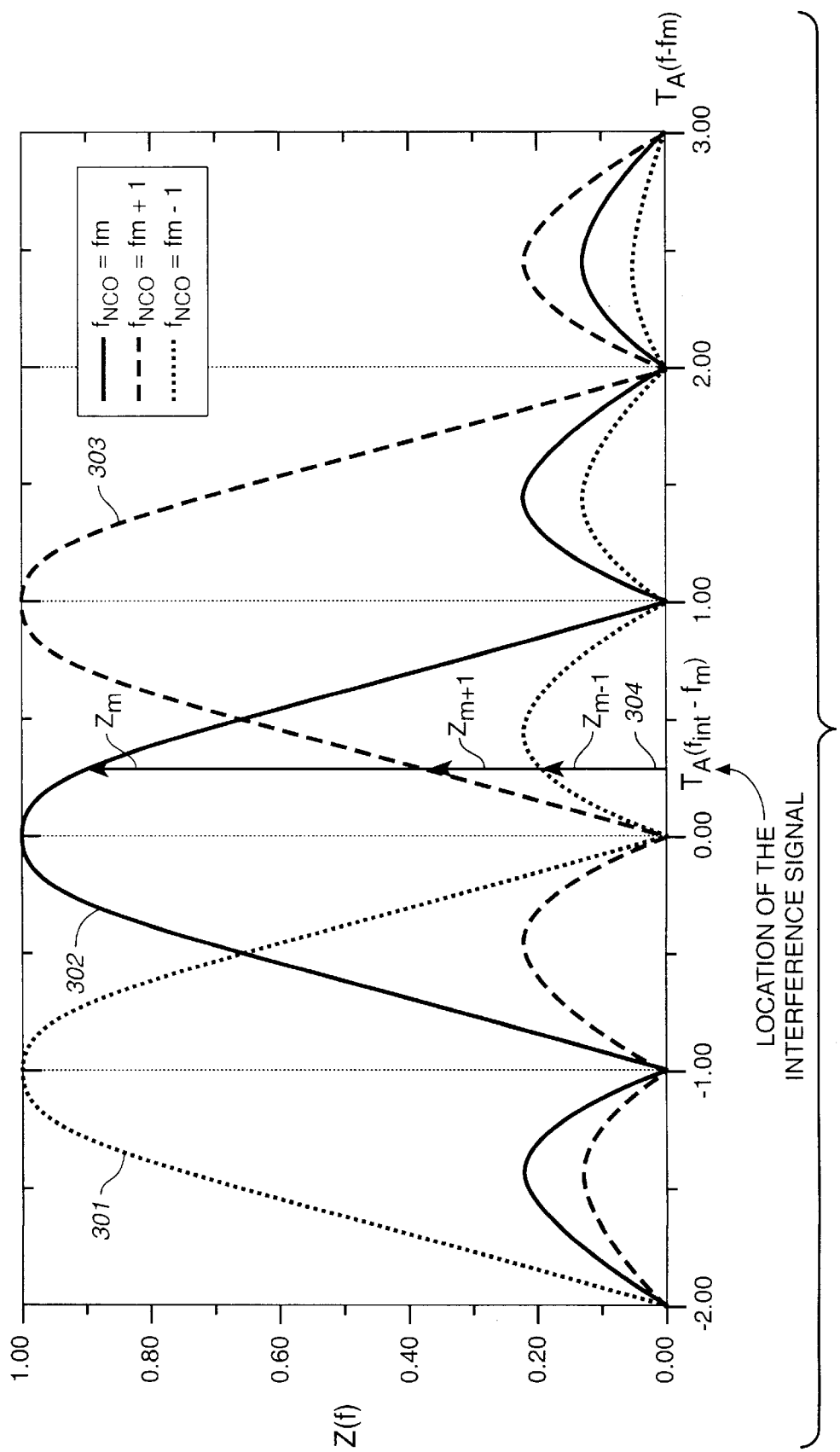
FIG._3

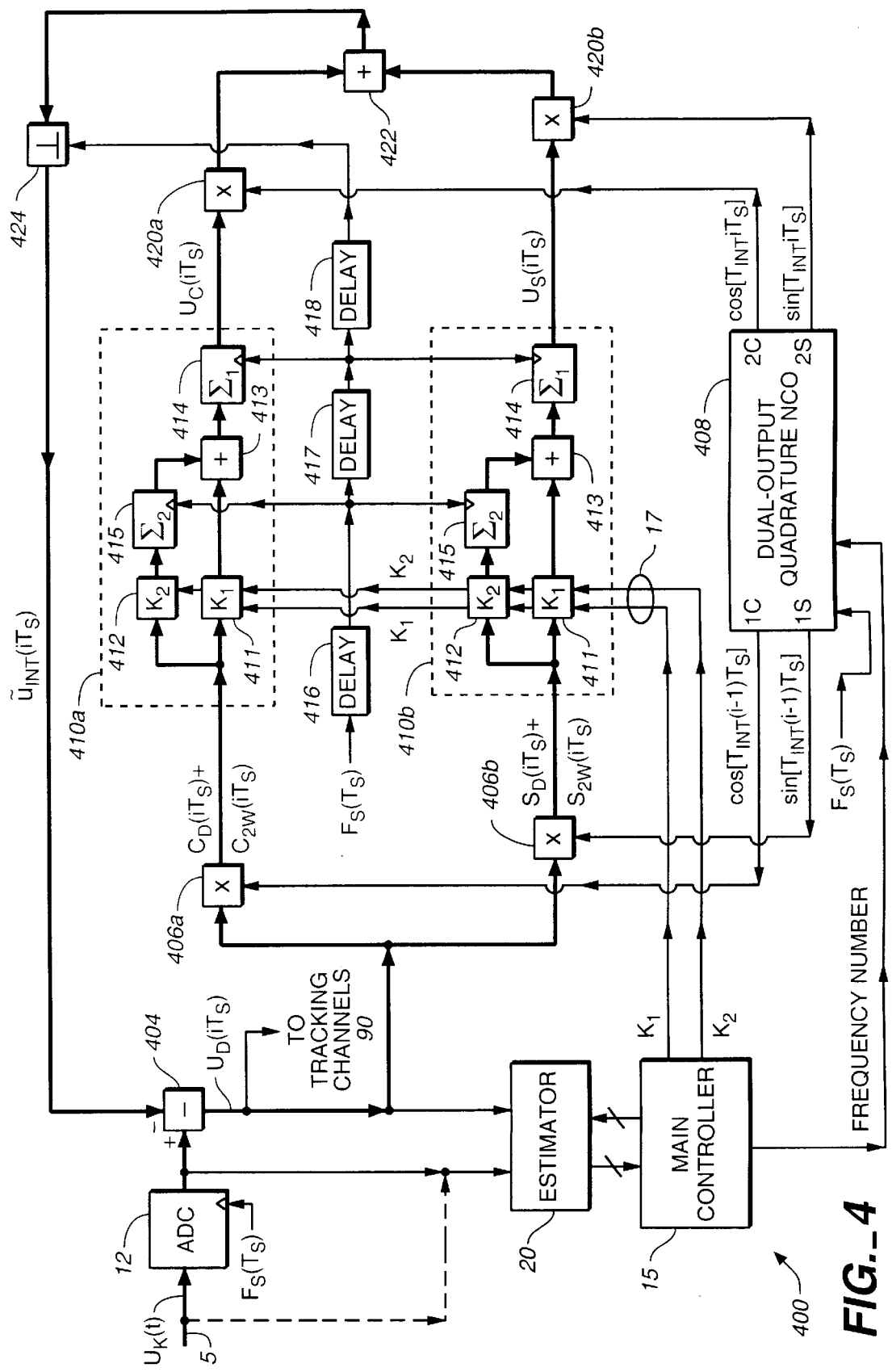
FIG._4

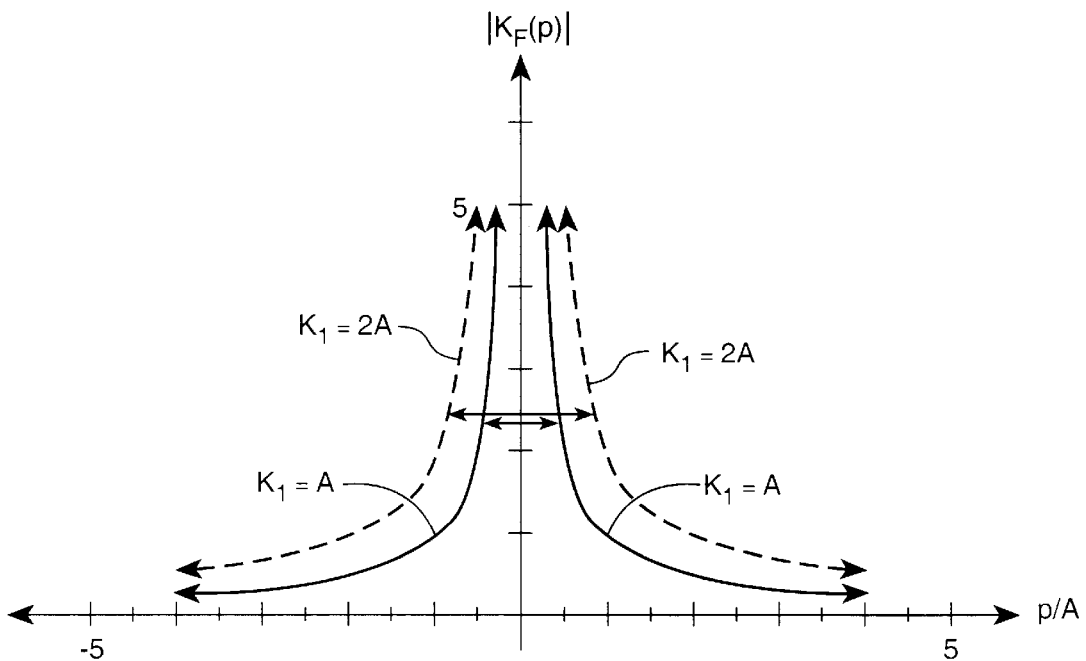
FIG._5
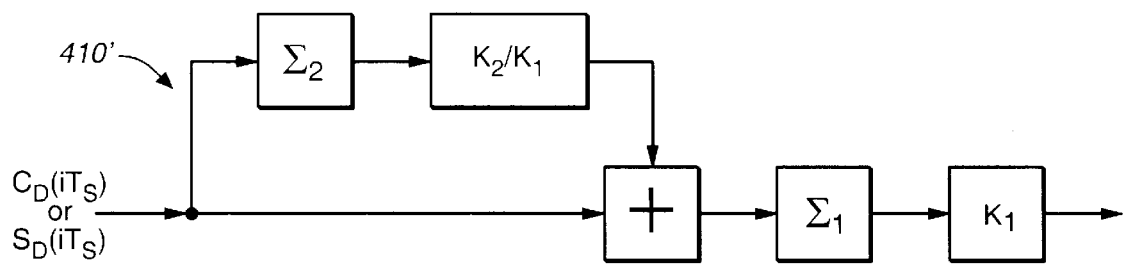
FIG._6

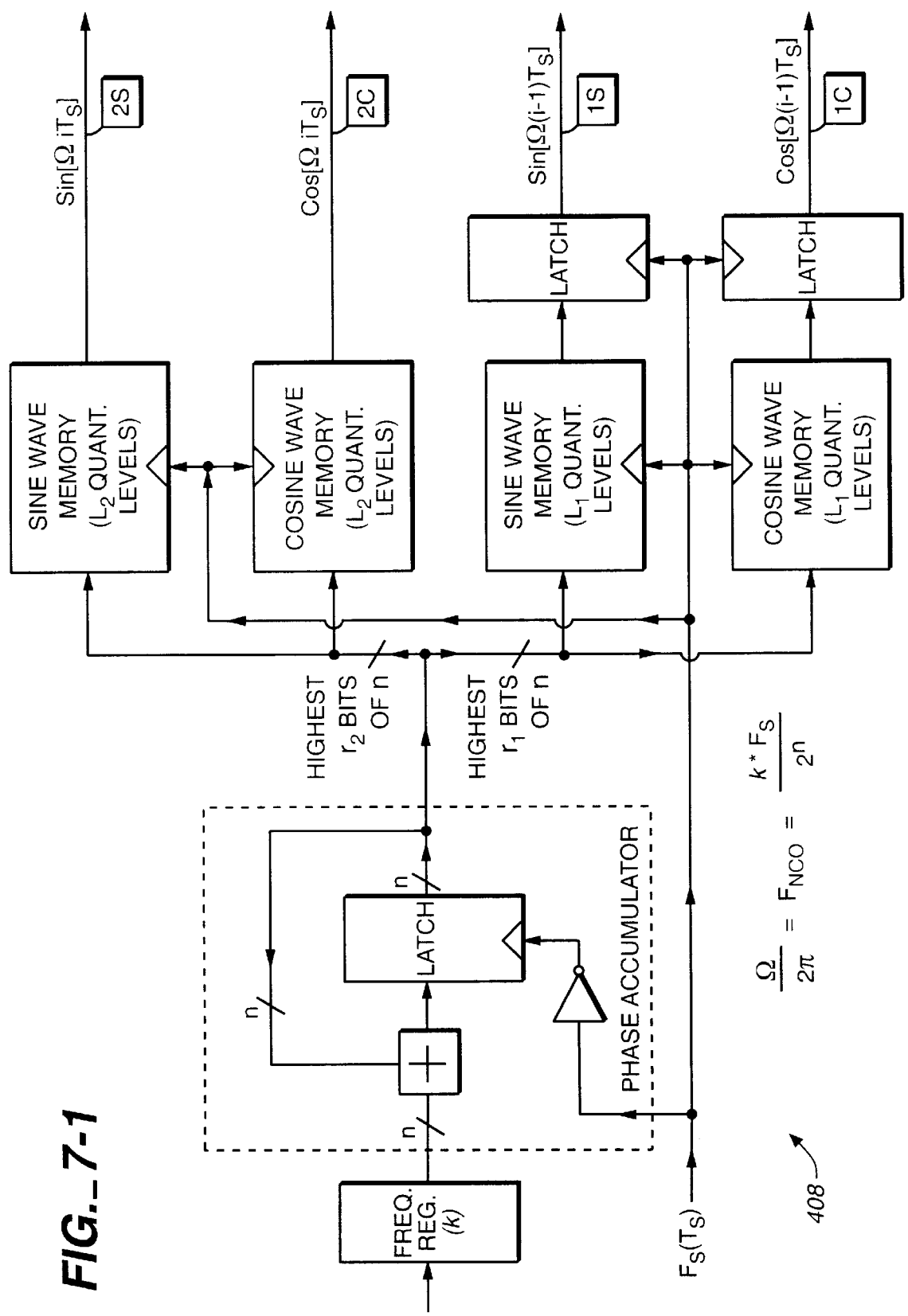
FIG._7-1

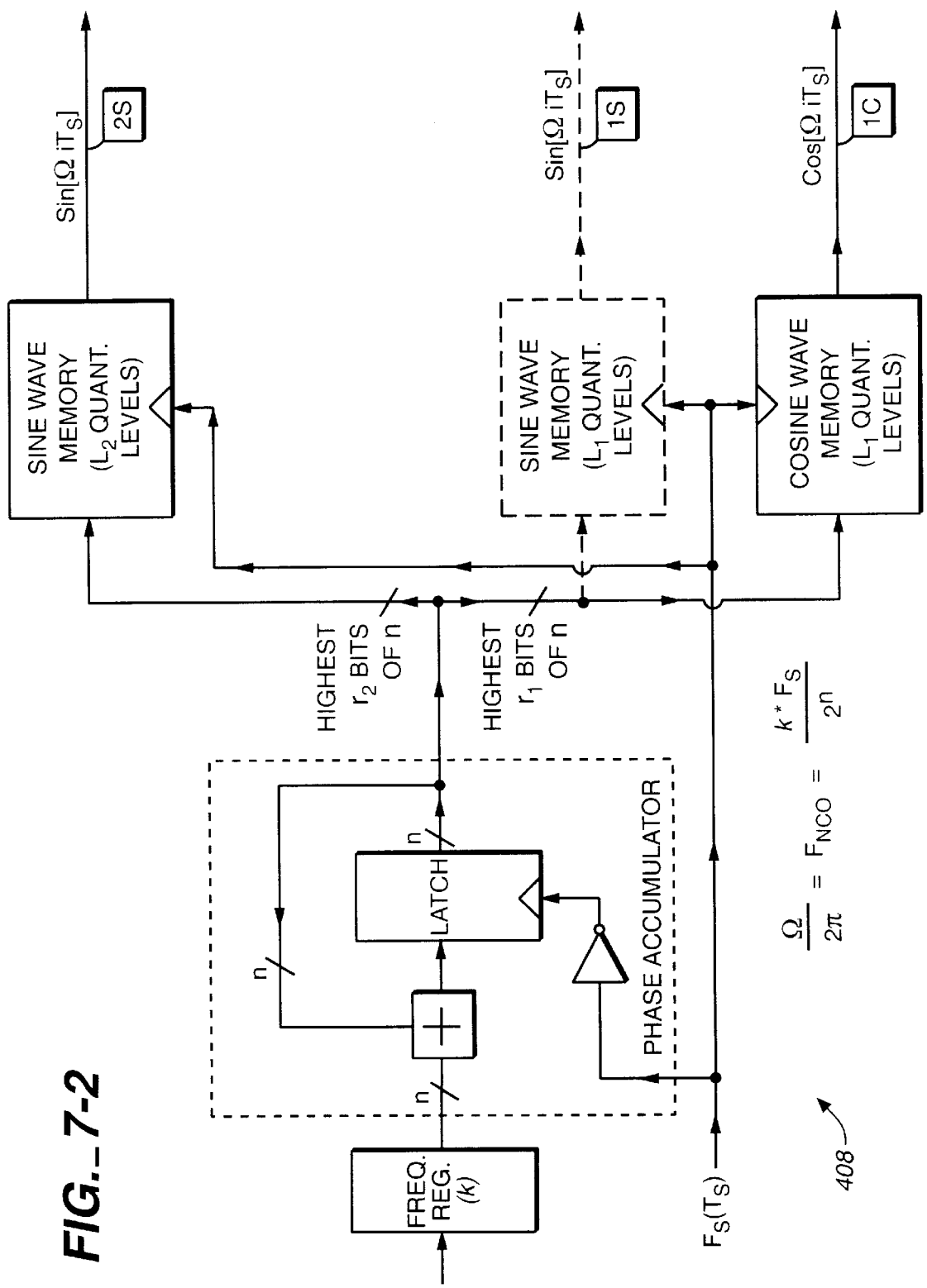
FIG._7-2

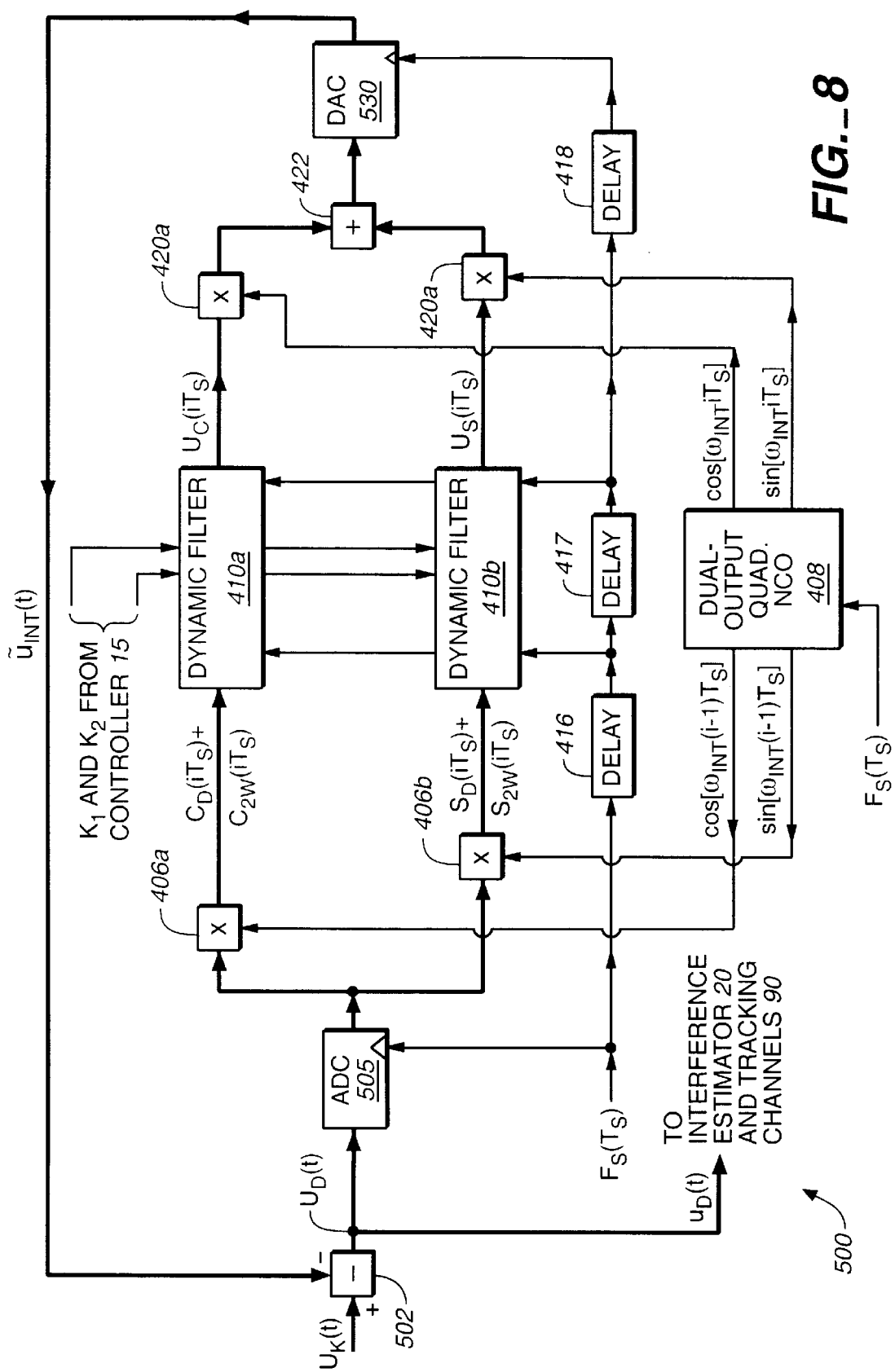
FIG._8

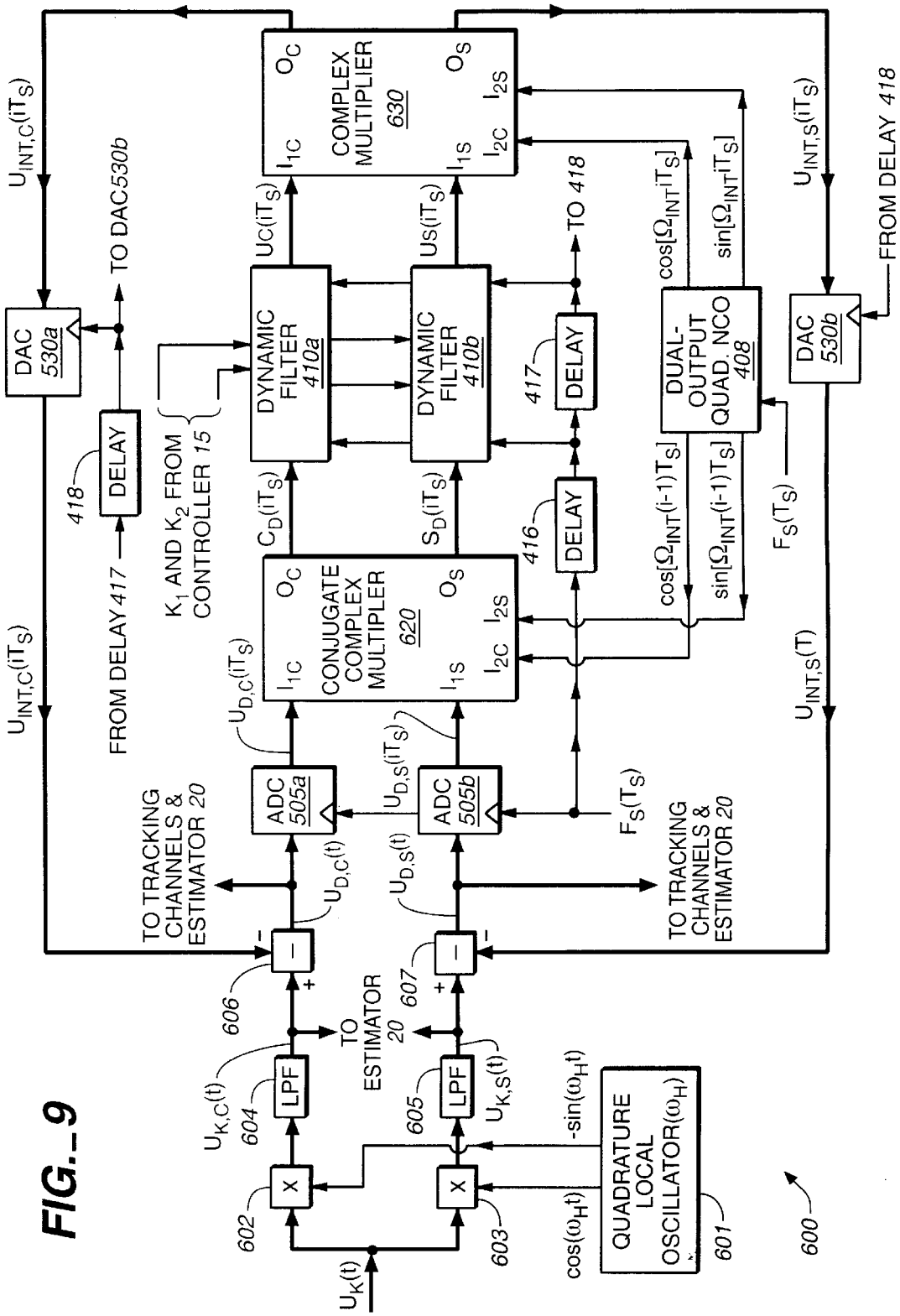
FIG._9

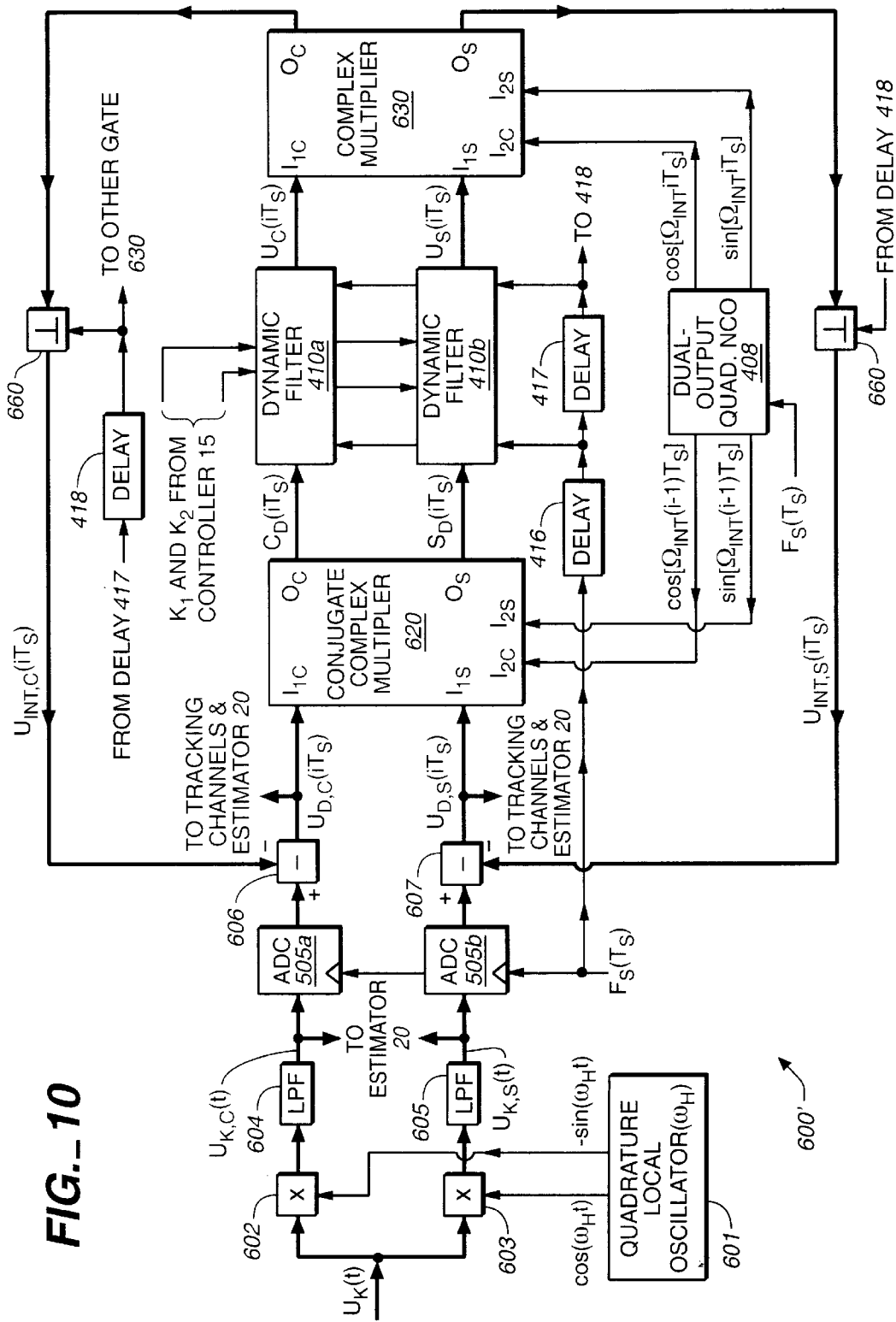
FIG._10

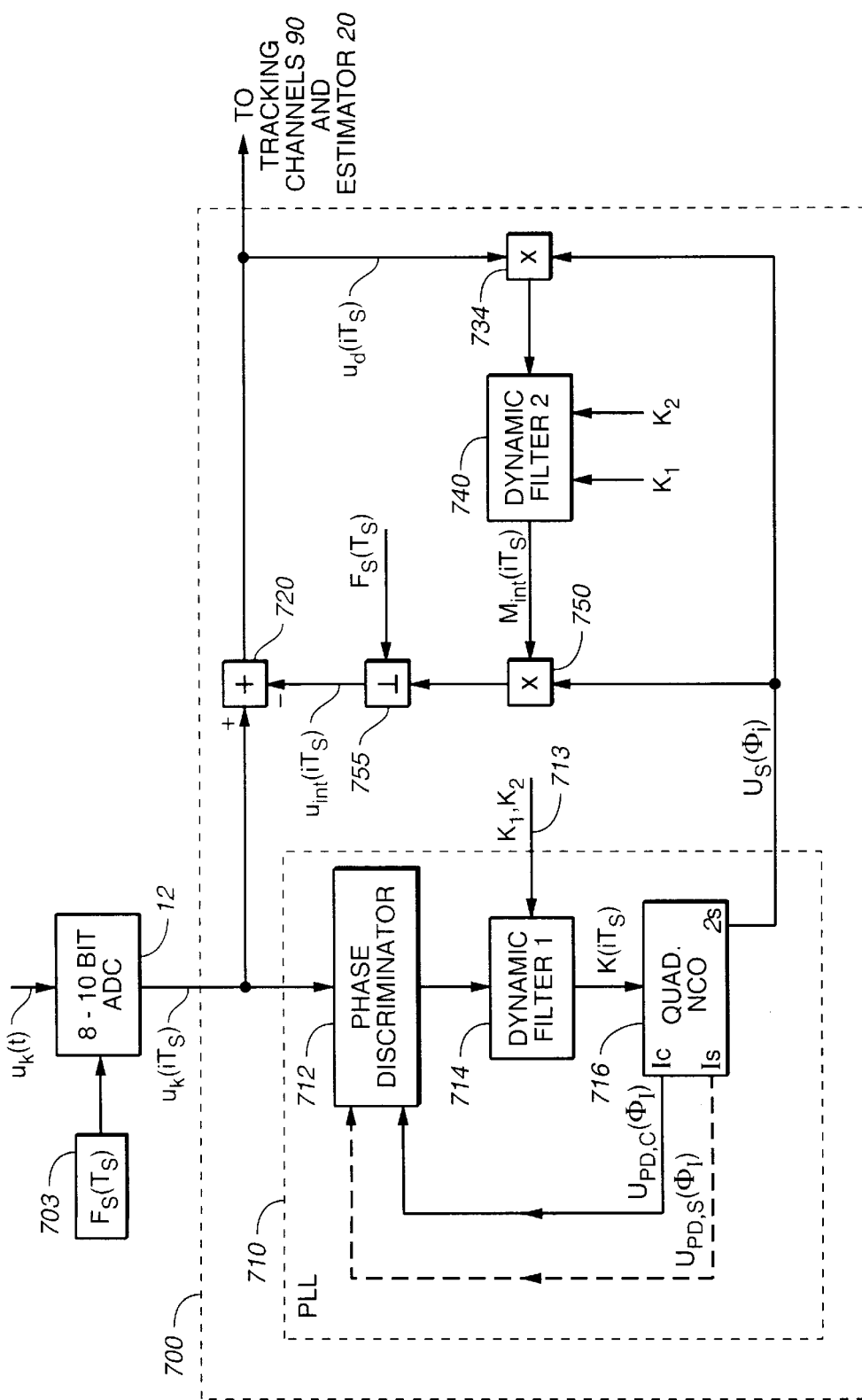
FIG._11

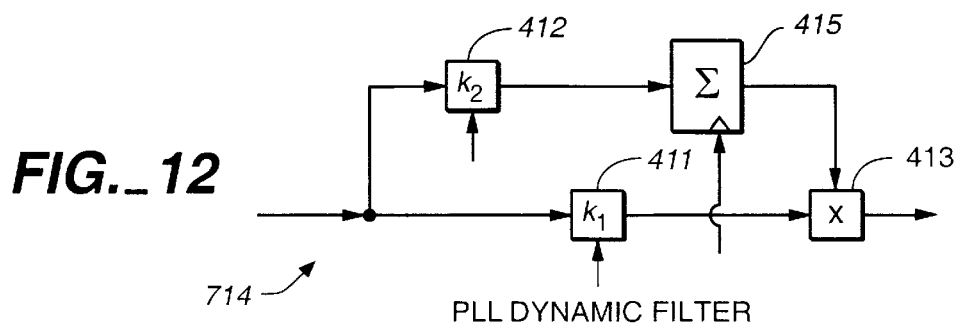
FIG._12
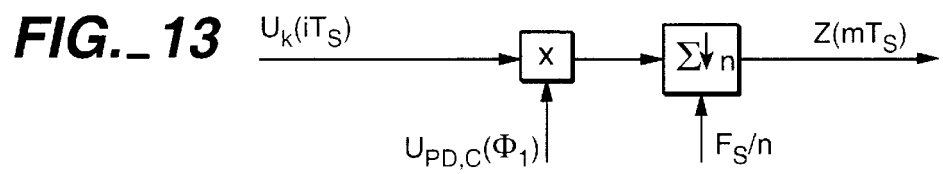
FIG._13
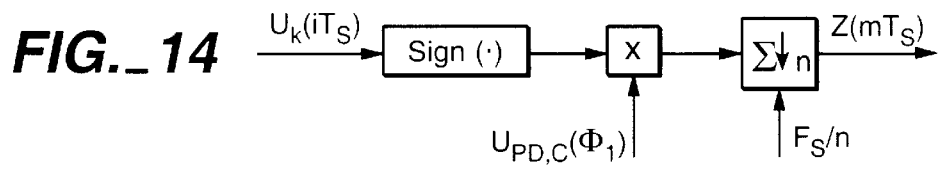
FIG._14
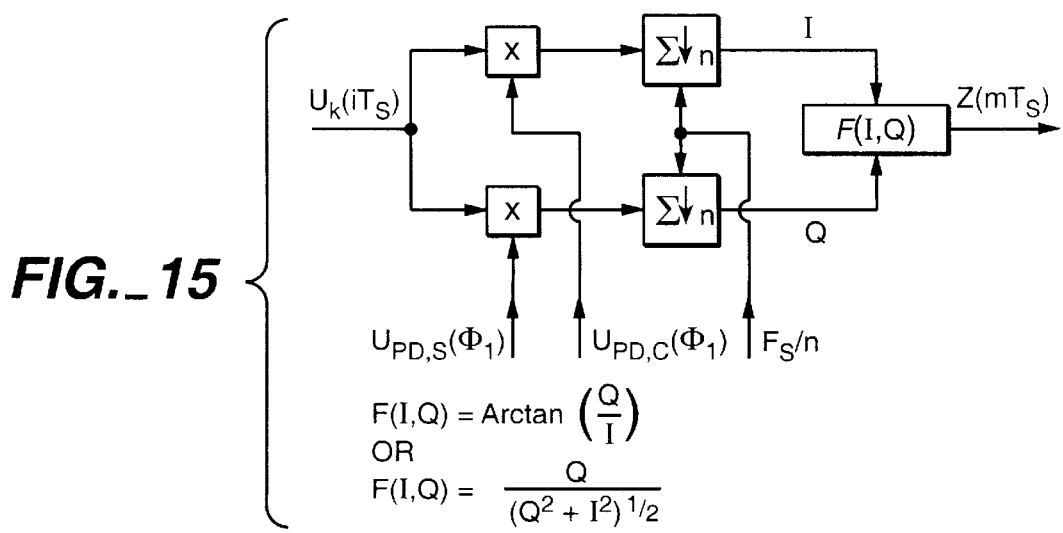
FIG._15

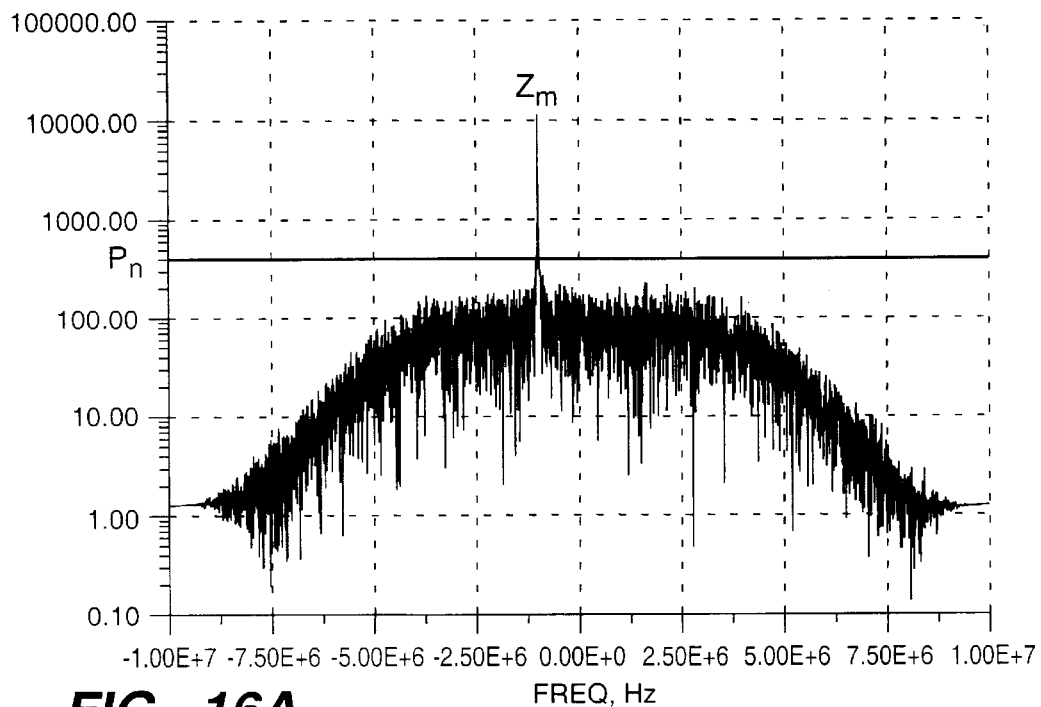
FIG._16A
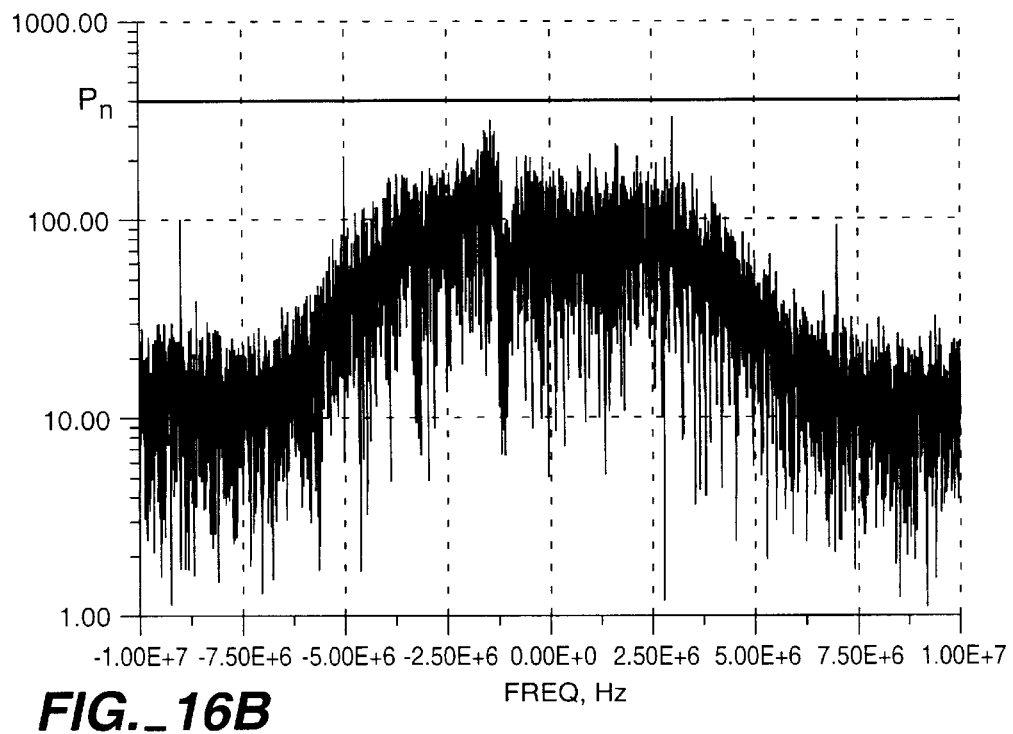
FIG._16B

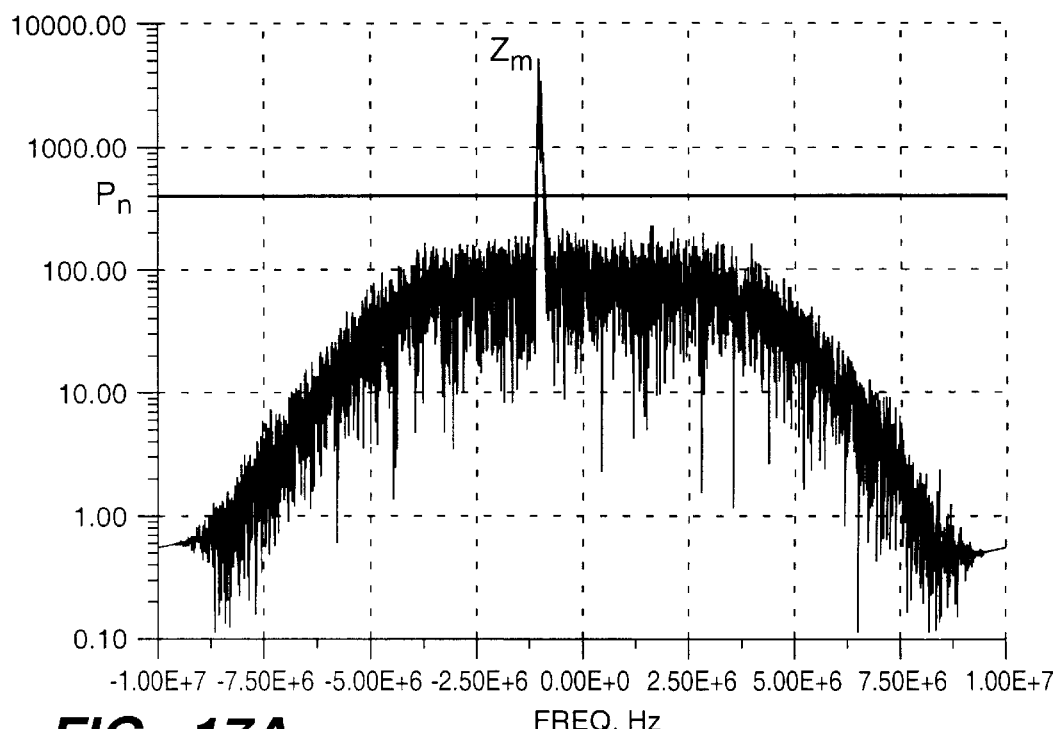
FIG._17A
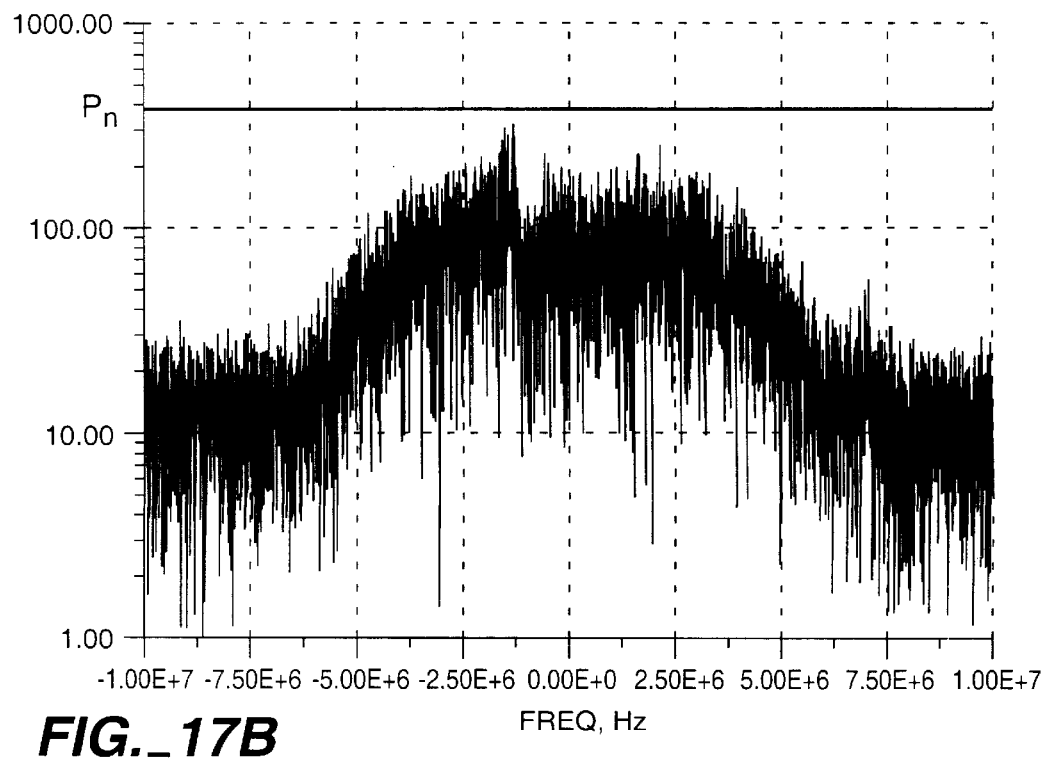
FIG._17B

APPARATUSES AND METHODS OF SUPPRESSING A NARROW-BAND INTERFERENCE WITH A COMPENSATOR AND ADJUSTMENT LOOPS

FIELD OF THE INVENTION

The invention relates to receivers of broadband and/or spread-spectrum signals in communication systems, with particular application to receivers for the signals of satellite navigation systems (NAVSTAR and GLONASS).

BACKGROUND OF THE INVENTION

Broadband signals are used in digital communication systems and navigation systems. In particular, in the satellite navigation systems of GPS (NAVASTAR) and GLONASS (GLN), a receiver processes a great number of broadband signals, each of which is radiated by a corresponding satellite. The location of the receiver and the velocity of its movement are determined as a result of processing. Broadband signals in communication systems are used to increase noise-immunity, to raise secrecy of working, and to separate communication channels in multi-channel radio links.

The typical method of generating broadband signals is based on the use of pseudo-random codes (PR-codes), which modulate the carrier. Typically, the transmitter generates a finite sequence of +1 and −1 bits, or "chips", which follow the pattern of a PR-code of finite length (called the code duration). This signal has a broad frequency spectrum due to the near random pattern of the code. The transmitter continually repeats the generation of this finite sequence, and may modulate the repeating sequence with an information signal. Such modulation may be done by multiplying a group of whole sequences by +1 or −1, as dictated by the information signal. In doing so, the relatively narrow frequency spectrum of the information signal is expanded, or "spread", out to that of the repeating PR-code sequence. The modulated broadband signal is then used to modulate a carrier signal for transmission (i.e., up-converted).

If the repeating pseudo-random signal is not modulated by an information signal, it may nonetheless be useful to a receiver. For example, each GPS satellite transmits two repeating pseudo-random signals in two different frequency bands (L1 and L2), respectively, at precise and synchronized times. Comparison of the transmission delays of the two signals enables the receiver to determine the effects of the ionosphere on the signal transmission. The comparison could be done with the L1 signal being modulated by an information signal, and with the L2 signal not being modulated by an information signal.

In a receiver, the broadband signal is down-converted and then compressed, or "de-spread", by correlating the received signal with a locally generated version of the PR-code (which is often called the reference PR-code). The local version may be an identical replica of the PR-code used by the transmitter, or it may be a derivative of the PR-code, such as a strobed version. If a narrow-band interference signal is received at the input of such receiver along with the transmitter's signal, the interference signal will be suppressed because its frequency spectrum is much less than that of the transmitter's signal. The degree of suppression depends on the base of the PR-code, which in turn is determined by the ratio of the code duration to the duration of one chip element (bit) of the code.

In many cases such suppression turns out to be insufficient. In the systems of GPS and GLN, the signal power of a useful signal at a receiver input is usually considerably less than the power level of noise signals received by the receiver input and generated by the receiver's components, and the power level of a narrow-band interference signal often considerably exceeds the noise power level. As a result, even after the correlation processing, the effect of the narrow-band interference remains too strong to be able to properly demodulate the transmitter's signal.

The suppression of the narrow-band interference may be considerably increased by using the compensation method. According to this method, two signal-processing paths and a compensator are created in a receiver. The first processing path extracts the interference signal from the received input signal, using the following two characteristics which distinguish the interference signal from the useful signal and noise: the narrow bandwidth frequency of the interference signal and its higher power. A locally generated copy of the interference is then generated at the output of the first processing path. This copy is then subtracted from the received input signal by the compensator, and the resulting difference signal is provided to the second signal processing path. The signal provided to the second path has thereby been "compensated" by the subtraction of the interference copy signal, and the second path can then proceed with the usual steps of compressing and demodulating the transmitter's signal. In the difference signal generated by the compensator, the interference signal will be suppressed, and the degree of the suppression will depend upon how close the interference copy is to the original interference signal provided to the compensator. The steps of correlation processing, compressing the useful signal, and suppressing the uncompensated interference residue are realized after the above-described compensation.

There are different known methods of separating a narrow-band interference signal from the broadband useful signal and noise so that a copy of the interference signal can be generated for the compensator. These methods are briefly described below.

One of the known methods is based on application of a band limiter, as described by J. J. Spilker, et al., "Interference Effects and Mitigation Techniques," Global Positioning System: Theory and Applications, Volume I (1996). The limiter is captured by a strong narrow-band interference signal (whose power considerably exceeds the total power of the useful signal and noise). A signal in which the interference essentially dominates is obtained after the limiter. The output signal of the limiter is considered to be a copy of the interference signal, and is subtracted from a copy of the input signal which has been passed through an amplitude regulator. As a result, interference suppression is observed with comparatively insignificant distortion of the broadband useful signal.

In another method described in U.S. Pat. No. 5,268,927, the copy of the narrow-band interference signal is obtained by means of an adaptive transversal filter. This method provides better interference suppression than the previously-described method.

This method described in U.S. Pat. No. 5,268,927 is based on the premise that the respective correlation intervals of the useful signal and of the noise in the receiver band are much less than the correlation interval of a narrow-band interference signal. Therefore, it is possible to sample the input signal at a sampling frequency which is selected to provide a weak correlation to the useful signal and noise but strongly correlated to the interference signal. This sampling enables one to predict the parameters (e.g., weight functions) of a programmable transversal filter (PTF) which can separate the interference signal from the useful signal (and noise) and generate at its output a copy of the interference signal, which in turn can be used by the compensator. The performance characteristics of the compensator are determined by the chosen algorithm of adapting the parameters of the PTF to track the changes in the interference signal. Both the algorithm and the resulting performance essentially depend upon the practical realization of the algorithm, the PTF, and the compensator on a concrete calculating device (e.g., digital signal processor). In practice, the adjustment algorithm for the adaptive programmable transversal filter turns out to be extremely complex and greatly taxes the processor of the digital receiver.

Another known method is based on the results from the Markov theory of the non-linear synthesis, and is described by G. I. Tuzov, "Statistical Theory of Reception of Compound Signals," Soviet Radio, Moscow, 1977. According to these results, it is necessary to separate a narrow-band interference having a constant amplitude from the input signal by means of a phase-lock loop (PLL) system which is locked onto the interference signal. If the amplitude of the interference signal is unknown, it is also necessary to determine the amplitude by another device, in which synchronous detection of the input signal with a reference signal generated by the PLL system is employed. The thus-found amplitude is filtered and then multiplied by the PLL reference signal, forming a copy of the interference signal. These various processing functions lead to a relatively complex receiver. If it can be assumed that the power level of the interference signal exceeds the combined power level of the useful signal and all noise sources, then some of the above processing functions can be implemented by simplified components to provide a less complex receiver. However in order to use the device in real conditions, one finds that it is necessary to match the amplitude-frequency response of the PLL system with the frequency spectrum of the interference signal, which is unknown beforehand. Unfortunately, this matching process requires another PLL system tuned on the mean frequency of the interference signal. Even when the matching process is undertaken with the additional PLL system, the degree of interference compensation degree will be comparatively small, since it is difficult to achieve good coincidence of the interference copy with its original in such circuit.

In the typical case, the result of sending the input signal through a narrow-band interference compensator is equivalent to the result of sending the input signal through a rejection filter which cuts out a frequency band of the interference signal. It is natural that the corresponding section of the signal spectrum is cut out together with the interference, which causes distortions in the useful signal. However, if the frequency spectrum of the input signal is significantly broader than that of the interference signal, the distortions are not large and, in any case, are considerably less than those seen when no compensation is used.

In order to realize effective compensation it is necessary to tune this equivalent rejection filter correctly. The adaptive transversal filter automatically realizes such tuning by continuously comparing its output to the interference signals and periodically adjusting its parameters (e.g., weights) to obtain the best tunning.

A rejection filter which is tuned up only according to the central frequency, which must coincide with the mean interference frequency, is used in simpler compensators (see, for example, J. J. Spilker, et al., "Interference Effects and Mitigation Techniques," Global Positioning System: Theory and Applications, Volume I (1996)). Different kinds of spectrum analyzers are used to estimate the mean frequency.

There is the well-known spectrum analyzer which generates and processes two mutually orthogonal signals I and Q. These signals are obtained by correlating the input signal with two reference harmonic signals $\sin \omega_0 t$ and $\cos \omega_0 t$, which are orthogonal to one another. An power signal $Z=(I^2+Q^2)$ is generated and is proportional to power of the input signal in a small frequency band around the reference frequency $\omega_0$. The bandwidth of this small frequency band is inversely proportional to the accumulation time $T_A$ in the correlators. $T_A$ may, of course, be adjusted. If the value $T_A$ is sufficiently large, it is possible to consider that signal Z is proportional to spectral density of the input signal at the frequency $\omega_0$. The frequency value of $\omega_0$ may then be swept through a desired frequency range to find the spectral density of the input signal. A narrow-band interference signal is detected in such an analyzer when a large, noticeable spike (or ejection) is seen. The frequency center of the spike provides an estimation of the mean frequency of the interference signal.

The quality of an interference suppresser is determined by many factors, which often turn out to be conflicting. The more the suppresser cuts out an interference and the less it distorts a useful signal, the better it will be. These factors are improved under the most absolute matching of the suppresser characteristics with the interference signal. However, the absolute matching, as a rule, is achieved either at the expense of complication and increase in the price of a suppresser, or at the cost of limiting the device application possibilities to only one kind of interference. Therefore, a designer is always faced with having to make compromises.

The purpose of this invention is to provide methods of narrow-band interference suppression which achieve good suppression of a wide class of narrow-band interferences with a comparatively small complication of hardware and acceptable increase of processor loading.

SUMMARY OF THE INVENTION

One invention of the present application encompasses interference compensation methods and interference compensator apparatuses which suppress one or more narrow-band interference signals from a broadband and/or spread-spectrum signal. Broadly stated, methods and apparatuses according to this present invention generate a signal related to the interference signal, which is a close replica, or substantially identical replica, of the interference signal. This replica signal may have slight differences in amplitude and/or slight differences in phase from those of the actual interference signal, and will be referred to herein as the "interference copy" or the "interference-copy signal" for the sake of using simple notation.

According to this first invention of the present application, the mean frequency of the interference signal is found, such as by estimation, and a first signal bearing the actual interference signal is formed. The first signal may simply comprise the received input signal, or may comprise the received input signal combined with one or more other signals (such as to form a difference signal). Two orthogonal components of the first signal are then generated in signal form. The orthogonal components may represent the first signal in the polar-coordinate representation, or may represent the first signal in the quadrature-coordinate representation (the latter representation is also called the rectangular-coordinate representation). Each of the orthogonal components is filtered to attenuate a portion of the component's frequency spectrum which is outside a selected frequency band. The selected frequency band includes a portion of the interference signal spectrum corresponding to the mean frequency value of the interference signal. In preferred embodiments of this present invention, substantially all of the component's frequency spectrum which is outside of the selected band is attenuated to less than 50% of its initial magnitude. Using the filtered orthogonal components, a compensated signal, or difference signal, is formed which is related to the difference between the input signal and the filtered components.

The terms polar-coordinate representation, quadrature-coordinate representation, and mean frequency are defined below in the detailed description section of the present application.

In some preferred embodiments of the first invention of the present application, the first signal comprises the difference signal (compensated signal). As the compensation signal is derived from the first signal, a feedback loop is formed which operates to automatically reduce the magnitude of the interference signal in the difference signal. Some preferred embodiments of the present invention form the difference signal in analog form, and other preferred embodiments form the difference signal in digital form. In other preferred embodiments of the present invention, the difference signal is processed, wholly in its quadrature form with separate feedback loops processing the two quadrature components of the difference signal.

A second invention of the present application encompasses methods and apparatuses for estimating the mean frequency of a narrow-band interference signal within a broadband and/or spread-spectrum signal. In the second invention, the input signal or the compensated signal, or combination thereof, is converted to a digital form at a sampling frequency of $F_S$, which has the corresponding period $T_S$. The digital form may be any number of bits. The digitized signal is then direct quadrature converted with a reference signal frequency $F_R$ to form to orthogonal components I and Q. Each of the I and Q samples are separately accumulated for N samples. After the accumulation of N samples, the quantity $Z_R=(I^2+Q^2)^{1/2}$, or approximation thereto, is computed and the accumulation quantities are cleared. $Z_R$ provides an estimation of the input's signal spectrum in a frequency band around frequency $F_R$. To find an narrowband interference signal, the reference frequency $F_R$ is stepped in increments of $i \cdot F_S/N$ for at least some i values between 1 and N/2 and the frequency step producing the highest Z value above a threshold value is found. The maximum Z value is denoted at $Z_M$, and the corresponding frequency step is denoted as $f_M$. The threshold value is a preferably at a level just above the combined power level of the useful signal and any noise sources. The Z values of the two frequency steps adjacent to $f_M$ are also found: $Z_{M-1}$ and $Z_{M+1}$. The estimate of the interference frequency is interpolated from $Z_M$, $f_M$, and the larger of $Z_{M-1}$ and $Z_{M+1}$.

In a preferred embodiment of the second invention, a band around the estimated interference frequency analyzed using a larger number N of accumulation samples and corresponding smaller frequency steps. Corresponding $Z_M$, $f_M$, $Z_{M-1}$ and $Z_{M+1}$ are found as before, and a more precise interference estimation is made.

A third invention of the present application encompasses methods and apparatuses for adjusting the rejection band of a compensator to match the bandwidth of the interference signal using a frequency-stepping interference estimator. The interference estimator is first employed to find the mean frequency of the interference signal. Thereafter, the compensator is set in operation with its rejection frequency set to the mean frequency found the estimator, and with its rejection set at starting value, preferably at or near its maximum value. The compensated signal generated by the compensator is then provided to the estimator, which scans the compensated signal in a band around the mean interference frequency. If no interference signal is detected, the compensator's rejection band is progressively narrowed in steps until the interference signal is detected. If an interference signal is detected, either initially or after a progressive narrowing, the compensator's rejection band expanded in steps until the interference signal is lost, or the rejection band reaches its maximum value.

Each of the above inventions may be used separately, or two or more of the above inventions may be used together.

BRIEF DESCRIPTION OF THE DRAWINGS

FIG. 1A is a schematic diagram of an exemplary quadrature converter.

FIG. 1B is a schematic diagram of an exemplary conjugate-complex multiplier.

FIG. 1C is a schematic diagram of an exemplary inverse quadrature converter.

FIG. 1D is a schematic diagram of an exemplary complex multiplier.

FIG. 2 is a schematic diagram of a first embodiment of an exemplary narrow band suppressor according to the present invention, particularly showing a first embodiment of an exemplary interference estimator (I.E.) according to the present invention.

FIG. 3. is a graph of exemplary amplitude-frequency responses of the filtering component of the exemplary interference estimator shown in FIG. 2.

FIG. 4 is a schematic diagram of a first exemplary embodiment of a compensator shown in FIG. 2 according to the present invention.

FIG. 5 is a graph of the filter gain of an exemplary dynamic filter according to the present invention.

FIG. 6 is a second exemplary embodiment of a dynamic filter according to the present invention.

FIG. 7-1 is a first exemplary embodiment of a dual-output, quadrature numerically-controlled oscillator which may be employed in the exemplary estimators and compensators according to the present invention.

FIG. 7-2 is a second exemplary embodiment of a dual-output, quadrature numerically-controlled oscillator which may be employed in exemplary compensators according to the present invention.

FIG. 8 is a schematic diagram of a second exemplary embodiment of a compensator shown in FIG. 2 according to the present invention.

FIG. 9 is a schematic diagram of a third exemplary embodiment of a compensator shown in FIG. 2 according to the present invention.

FIG. 10 is a schematic diagram of a fourth exemplary embodiment of a compensator shown in FIG. 2 according to the present invention.

FIG. 11 is a schematic diagram of a fifth exemplary embodiment of a compensator shown in FIG. 2 according to the present invention.

FIG. 12 shows an exemplary dynamic filter which may be employed in the compensator shown in FIG. 11 according to the present invention.

FIGS. 13 through 15 show exemplary phase discriminators which may be employed in the compensator shown in FIG. 11 according to the present invention.

FIG. 16A shows the frequency spectrum of a input signal having a harmonic interference signal therein, and FIG. 16B shows the frequency response after processing the input signal through an exemplary compensator according to the present invention.

FIG. 17A shows the frequency spectrum of a input signal having a narrow-band interference signal therein, and FIG. 17B shows the frequency response after processing the input signal through an exemplary compensator according to the present invention.

FIG. 18 shows an exemplary rejection band for an exemplary suppressor according to the present invention.

DETAILED DESCRIPTION OF THE PREFERRED EMBODIMENTS

Before turning to the overall description of the present inventions, it will be useful to define certain terms and describe certain processing blocks used by various embodiments of the present inventions. Quadrature frequency reference signals are often used in signal processing. A quadrature frequency reference signal comprises two sinusoidal signals which have the same frequency, but which are 90° out of phase. One of the sinusoidal signals is designated as the "in-phase" component and the other is designated as the "quadrature" component. Conventional practice is to assign the sinusoid $\cos(\omega_0 t)$ as the in-phase component of the reference signal, and either the sinusoid $+\sin(\omega_0 t)$ or the sinusoid $-\sin(\omega_0 t)$ as the quadrature component. If the quadrature component is $+\sin(\omega_0 t)$, the reference signal has a "positive" frequency and may be represented by the complex-number quantity: $\exp[j\omega_0 t]=\cos(\omega_0 t)+j\cdot\sin(\omega_0 t)$, where $\exp[*]$ is the exponential function, j is symbol indicator for the imaginary component of a complex number ($j=\sqrt{-1}$), $\pm\omega_0$ is the frequency value, and t is time. If the quadrature component is $-\sin(\omega_0 t)$, the reference signal has a "negative" frequency and may be represented by the complex-number quantity: $\exp[-j\omega_0 t]=\cos(\omega_0 t)-j\cdot\sin(\omega_0 t)$. As can be seen, the in-phase component corresponds to the real part of the complex number, and the quadrature component corresponds to the imaginary part.

The complex-number form $\exp[j\omega_0 t]$ is also called the polar-coordinate form, and the parameter of the function $\exp[*]$ divided by j is called the "full phase" or "polar phase" of the quadrature signal. In this case, the full phase of $\exp[j\omega_0 t]$ is $\omega_0 t$, and the full phase of $\exp[-j\omega_0 t]$ is $\omega_0 t$. The magnitudes of the full phases in each of these examples is the same: $\omega_0 t$. Both of the quadrature reference signals $\exp[+j\omega_0 t]$ and $\exp[-j\omega_0 t]$ have the same magnitude of frequency, which is $\omega_0$. Additionally, each quadrature reference signal may be offset in time by a phase angle $\phi$, which may be constant or a function of time. In this case, the quadrature reference signals are represented as $\exp[+j(\omega_0 t+\phi)]$ and $\exp[-j(\omega_0 t+\phi)]$, where $\phi$ may have positive and negative values. The full phases of these time-offset signals are $(\omega_0 t+\phi)$ and $-(\omega_0 t+\phi)$, respectively.

A quadrature reference signal may be provided in analog form or digital form. When provided in digital form, the quadrature components of the reference signal may be provided with two or more levels of quantization. It is common to refer to the quadrature reference signal as being a "sinusoidal" quadrature reference signal, whether the signal is in analog form or digital form, and regardless of the quantization level of the digital form. A square wave is a sinusoidal wave in digital form with two levels of quantization. The term "sinusoidal" refers to the fact that the quadrature components are derived from the sine waveform, and are periodic in nature (i.e., the waveform comprises a unit waveform segment which is repeated on a periodic basis). Each component of the quadrature reference signal has a form which is a replica or a quantized approximation of a cosine wave or a sine wave, as the case may be. Reference signals may be more generally described as being "periodic" since their waveforms are periodic and have periodic zero crossings. The term "periodic reference signal" encompasses analog sinusoidal reference signals and digital sinusoidal reference signals of all quantization levels, as well as such sinusoidal signals which have higher order harmonics (usually odd harmonics) added to them, such as for example a triangular wave. The frequency of a periodic signal may be measured from time delay between corresponding zero-crossings in the periodic waveform.

It should be pointed out that the negative frequency reference signal $A\cdot\exp[-j\omega_0 t]$ is the complex conjugate of the positive frequency reference signal $A\cdot\exp[j\omega_0 t]$, and likewise that the positive frequency reference signal is the complex conjugate of the negative frequency reference signal. (As is known in the art, the complex conjugate of $A+j\cdot B$ is defined to be $A-j\cdot B$). The frequency $\omega$ may also be denoted by the symbol $\Omega$. The $\Omega$ symbol is often used to denote an intermediate frequency (IF) level.

As is known in the art, a signal has a frequency spectrum which comprises the frequency components that make up the signal (e.g., the Fourier components or Fourier series components). A signal may have as few as one frequency component (such as a pure sinusoidal wave), or may have a broad range of frequency components. The frequency spectrum of a signal is often said to have a bandwidth; this is the same as saying that the signal has a bandwidth. For periodic signals, the bandwidth is conventionally defined as all of the signal's frequency components which have more than a specified amount of power (or amplitude). For more complex signals, the bandwidth is conventionally defined as the range of frequencies where the power density in the frequency components is above a specified amount. The specified amount of power or power density is usually a percentage of the highest power level (or amplitude level) or power density level within the signal's spectrum. If comparisons of the bandwidths of two or more signals is being made, then the above specified amount used is often not particularly critical since all the signals will be treated equally. Nonetheless, one is typically interested in the information content of the signal, and a specified amount is often used which sets the bandwidth to include substantially all of the information content of the signal. As a general guideline, the specific amount may be taken as approximately 1% or 2% of the highest power level or highest power density of the signal.

It is known in the art that any signal u(t), or functional process u(t) performed on a signal, may be represented or provided in the form $u(t)=C(t)+jS(t)$, which is known as the quadrature coordinate form (or rectangular coordinate form) where C(t) and S(t) are the quadrature components of u(t), and where j is defined as $j=\sqrt{-1}$. (C(t) is the real-part of u(t) and S(t) is the imaginary part of u(t).) There is no restriction on the bandwidth of u(t). Quadrature components C(t) and S(t) can be formed by multiplying u(t) by a quadrature reference signal.

It is also known in the art that any signal u(t), or functional process u(t) performed on a signal, which has frequency bandwidth much less than the mean frequency, may be represented as a complex-number function in the form of a vector U(t):

$$U(t) = u_M(t) e^{j \cdot \Phi(t)}$$

or in the form of:

$$U(t)=C(t)+jS(t);$$

where $u_M(t)$ is the amplitude of U(t) and $\Phi(t)$ is the full phase of U(t) in the polar-coordinate representation of U(t), where C(t) is the real-part and S(t) is the imaginary part of U(t) in the quadrature (or rectangular) coordinate representation of u(t), and where $j=\sqrt{-1}$. The real-part coordinate C(t) of vector U(t) is also called the in-phase component, and the imaginary-part coordinate S(t) of vector U(t) is also called the quadrature component. The above coordinate functions $u_M(t)$, $\Phi(t)$, C(t), and S(t) of U(t) are determined with respect to a reference coordinate system, whose axis direction is usually defined by the reference vector $\exp[j\cdot\Phi_0(t)]$. (Since U(t) is a vector representation of the starting signal or process u(t), the functions $u_M(t)$, $\Phi(t)$, C(t), and S(t) as also said to be coordinate functions of u(t).)

Changing the reference vector phase $\Phi_0(t)$, causes the coordinate axes to rotate and the full phase $\Phi(t)$ to change by a corresponding amount. The quadrature coordinate functions C(t) and S(t) also change by related amounts. The amplitude function $u_M(t)$ does not change. Because the quadrature components C(t) and S(t) are based on a narrow-band signal u(t) and because they are taken with respect to a prescribed reference vector (or signal) $\exp[j\cdot\Phi_0(t)]$, they are sometimes referred to as "Cartesian coordinate functions" or "Cartesian components", in addition to being referred to with the broader terms of "quadrature coordinate functions" and "quadrature components." All Cartesian components may be referred to as quadrature components.

Cartesian coordinate functions C(t) and S(t) may be obtained from the initial signal u(t) by means of special conversion, which is called direct quadrature conversion with respect to the prescribed reference vector $\exp[j\cdot\Phi_0(t)]$ (e.g., prescribed reference signal).

Direct quadrature conversion at a high (or intermediate) frequency may be realized by an exemplary circuit comprising two multipliers, a quadrature oscillator, and two low-pass filters, as shown in FIG. 1A. The input signal $u(t)=u_1(t)\sin[\omega_1 t+\phi_1(t)]$ is supplied to each multiplier, and two orthogonal harmonic reference signals (2 sin $\omega_0 t$ and 2 cos $\omega_0 t$), whose frequency $\omega_0$ is close to, or exactly coincides with, the mean frequency of the input signal $\omega_1$ ($\Delta\omega=\omega_1-\omega_0$, and $\Delta\omega\ll\omega_1$), are supplied to the multipliers by the quadrature oscillator. The low-pass filters receive the outputs of respective multipliers, and extract the low-frequency orthogonal Cartesian components as follows:

$$C(t)=u_1(t)\cos[\Delta\omega t+\phi_1(t)]$$

and $$S(t)=u_1(t)\sin[\Delta\omega t+\phi_1(t)].$$

In the above operation, two conversions have occurred. First, the input signal u(t) has been converted from standard format to quadrature format with the two orthogonal Cartesian components C(t) and S(t) being generated ($C(t)+jS(t)=U_1(t)$). Second, the mean frequency of the signal has been shifted from $\omega_1$ to $\Delta\omega=\omega_1-\omega_0$, with $\Delta\omega$ being close to zero or equal to zero. The frequency shift will be referred to herein as frequency conversion, and moves the frequency of the information-bearing signal down to baseband frequencies (i.e., the frequency band of $\phi_1(t)$). It is noted that the outputs of the multipliers, before filtering, provide the quadrature components of the multiplication process of u(t) and the quadrature reference signal. These multiplier outputs have a bandwidth which is wider than the starting narrow-band signal $u(t)=u_1(t)\sin[\omega_1 t+\phi_1(t)]$.

The same process shown in FIG. 1A may be used to quadrature convert the input signal to a lower, intermediate frequency, which is above the baseband frequency. In this case, we generally have $0\ll\Delta\omega\ll\omega_0$. The term "quadrature down-conversion" may be used to generally describe the process of converting the signal format and shifting the frequency down to an intermediate level or to the baseband level; and the circuit for doing the conversion is referred to as a "quadrature down-converter." The terms "direct quadrature conversion" and "direct quadrature converter" are more specific in that they imply that the input signal is shifted down to baseband, or near baseband.

Under unrestricted relations of the frequencies of the input signal ($\omega_1$) and reference signal ($\omega_0$), a conjugate-complex multiplier circuit realizes a frequency conversion operation which is similar to that realized by direct quadrature conversion. This circuit may also be called a conjugating-complex multiplier. A conjugate-complex multiplier receives two input signals, each of which is in quadrature format, and provides an output which is also in quadrature form. (The quadrature form provides the signals in the format of complex numbers.) The output signal $U_{OUT}(t)$ is formed by multiplying the first input signal $U_1(t)$ by the complex conjugate $U^*_2(t)$ of the second input signal $U_2(t)$, and is described by the following mathematical relationship:

$$U_{OUT}(t)=u_{M,1}(t)e^{j\cdot\Phi_1(t)}\cdot u_{M,2}(t)e^{-j\cdot\Phi_2(t)},$$

where $U_{OUT}(t)$ is the vector of the output signal, and where $u_{M,1}(t)$, $U_{M,2}(t)$, $\Phi_1(t)$, and $\Phi_2(t)$ are the amplitude and phase coordinate functions of the two input signals being multiplied. The first input signal is $U_1(t)=u_{M,1}(t)\cdot\exp[j\cdot\Phi_1(t)]$ and the second input signal is $U_2(t)=u_{M,2}(t)\cdot\exp[j\cdot\Phi_2(t)]$. To form the complex conjugate of the second input signal, the full phase $\Phi_2(t)$ of the second input signal is reversed to $-\Phi_2(t)$ before it is multiplied with the first input signal. The phase may be readily reversed by reversing the sign of the quadrature component (S(t)) of the second signal. The above relationship for $U_{OUT}(t)$ may also be written with $U_{OUT}(t)$ in polar-coordinate format as follows:

$$U_{OUT}(t)=u_{M,OUT}(t)\exp[j\cdot\Phi_{OUT}(t)]=u_{M,1}(t)\cdot e^{j\cdot\Phi_1(t)}\cdot u_{M,2}(t)\cdot e^{-j\cdot\Phi_2(t)}.$$

If the first input signal $U_1(t)=u_{M,1}(t)e^{j\cdot\Phi_1(t)}$ takes the form $U_1(t)=u_{M,1}(t)\cdot\exp[j\cdot(\omega_1 t+\phi_1(t))]$ and the second input signal $U_2(t)=u_{M,2}(t)e^{j\cdot\Phi_2(t)}$ takes the form of a reference signal $U_2(t)=\exp[j\omega_0 t]$, then the complex conjugate of the second signal will take the form of $U^*_2(t)=\exp[-j\omega_0 t]$ and the output will have the form $U_{OUT}(t)=u_{M,1}(t)\cdot\exp[j\cdot(\Delta\omega t+\phi_1(t))]$, where $\Delta\omega=\omega_1-\omega_0$. Thus, the conjugate-complex multiplier achieves frequency down conversion by an amount determined by the frequency of the reference signal provided to the second input. If, instead, a reference signal with a negative frequency, such as $\exp[-j\omega_0 t]$, is provided to the second input, the conjugate-complex multiplier will provide frequency up-conversion of the first input signal by an amount of $\omega_0$.

A conjugate-complex multiplier may be realized by the device shown in FIG. 1B, where the in-phase and quadrature components ($C_1(t)$, $S_1(t)$) of the first input signal $U_1(t)$ are received at terminals $I_{1C}$ and $I_{1S}$, respectfully; where the in-phase and quadrature components ($C_2(t)$, $S_2(t)$) of the second input signal $U_2(t)$ are received at terminals $I_{2C}$ and $I_{2S}$, respectfully; and where the in-phase and quadrature components ($C_{OUT}(t)$, $S_{OUT}(t)$) of the output signal $U_{OUT}(t)$ are provided at terminals $O_C$ and $O_S$, respectfully. If we set $u_{M,1}(t)=U_1$, $\Phi_1(t)=\omega_0 t+\phi_1(t)$, $u_{M,2}(t)=1$, and $\Phi_2(t)=\omega_0 t$ in FIG. 1B, the Cartesian coordinates (or generally the quadrature components) of $U_1(t)$ with respect to the reference vector $\exp[j \cdot \Phi_0(t)]$ will be provided at the outputs of the summers, i.e., $C(t)=U_1 \cdot \cos[\phi_1(t)]$ and $S(t)=U_1 \cdot \sin[\phi_1(t)]$. Each of the input and output signals of the conjugate-complex multiplier shown in FIG. 1B are in quadrature format; accordingly, there is no conversion in the format of the signal.

The output of a quadrature down-converter (e.g., FIG. 1A with $\Delta\omega \gg 0$) may be provided to the input of a complex quadrature multiplier (e.g., FIG. 1B) to provide for frequency conversion down to baseband in two stages, rather than in one stage, such as by a direct quadrature converter. In the two-stage case, the signal format conversion is usually done in the first stage, and a frequency conversion is performed in each stage to achieve the overall frequency conversion. This approach provides substantially the same result of a single direct quadrature conversion, and is advantageous in performing direct quadrature conversion of high-frequency input signals. The first stage is performed with a first reference harmonic signal (such as from an independent heterodyne), and results in frequency down-converting the input signal to an intermediate frequency band, which is often easier for electronic circuits to process. The second stage is performed with a second reference harmonic signal (which may be independent from the first reference signal), which converts the input signal to baseband or to a second intermediate frequency. The quadrature format of the signal provided between the first and second stages facilitates the synchronization of the phase of the second reference signal to the phase of the input signal.

After a signal has undergone direct quadrature conversion, either by one stage or multiple stages, it is possible to restore the signal from baseband to its initial form at the mean frequency $\omega_1$ from the two orthogonal components by a process called "inverse quadrature conversion". This conversion may be realized by the circuit shown by FIG. 1C, where the original reference signal at the frequency $\omega_0$ is provided by a reference generator, and is in quadrature form (sin $\omega_0 t$ and cos $\omega_0 t$). In the circuit, the first orthogonal component $C(t)$ is multiplied with the quadrature reference component sin $\omega_0 t$, the second orthogonal component $S(t)$ is multiplied with the quadrature reference component cos $\omega_0 t$, and the multiplication results are summed together, as shown in FIG. 1C. As in the case of direct quadrature conversion, the inverse quadrature conversion provides conversion in frequency and signal format (quadrature format to standard format). When the quadrature signal is converted from baseband to its original frequency level or to an intermediate frequency level, the process may be referred to as "direct inverse quadrature conversion." Of course, inverse quadrature conversion may be applied to an input signal which is at an intermediate frequency, in which case general term "inverse quadrature conversion" may be used to describe the process.

The frequency conversion provided by inverse quadrature conversion may also be provided by an operation called complex multiplication, which may be realized by the complex multiplier shown in FIG. 1D. The complex multiplier comprises two inverse quadrature converters and produces correspondingly two orthogonal (quadrature) components of the restored signal. Each of the input and output signals of the complex multiplier shown in FIG. 1D are in quadrature format, so there is no conversion in the format of the signal. The in-phase and quadrature components of the first input signal $U_1(t)$ are received at terminals $I_{1C}$ and $I_{1S}$, respectfully, and the in-phase and quadrature components of the second input signal $U_2(t)$ are received at terminals $I_{2C}$ and $I_{2S}$, respectfully. The in-phase and quadrature components of the output signal $U_{OUT}(t)$ are provided at terminals $O_C$ and $O_S$, respectfully. The process of complex multiplication is similar to the process of conjugate-complex multiplication except that the phase of the second input signal is not reversed. (In fact, conjugate-complex multiplication may be viewed as a specific form of complex multiplication—a complex multiplication in which a conjugation of one of the inputs is effected.) The output of the complex multiplier has the mathematical form of:

$$U_{OUT}(t) = u_{M,OUT}(t) \exp[j \cdot \Phi_{OUT}(t)] = u_{M,1}(t) \cdot e^{j \cdot \Phi_1(t)} \cdot u_{M,2}(t) \cdot e^{j \cdot \Phi_2(t)},$$

where the first input signal is $U_1(t) = u_{M,1}(t) \cdot \exp[j \cdot \Phi_1(t)]$ and the second input signal is $U_2(t) = u_{M,2}(t) \cdot \exp[j \cdot \Phi_2(t)]$. When a reference signal of $\exp[j\omega_0 t]$ is provided to the second input, the conjugate-complex multiplier frequency up-converts the signal at the first input by an amount equal to the frequency ($\omega_0$) of the reference signal. Thus, a baseband signal provided to the first input would be up-converted to an intermediate frequency of $\omega_0$. If, instead, a reference with a negative frequency $\exp[-j\omega_0 t]$ is provided to the second input, the complex multiplier will provide frequency down-conversion by an amount of $\omega_0$. This is the same operation as provided by the conjugate-complex multiplier (FIG. 1B), and is not unexpected since a negative frequency reference is the conjugate-complex of a positive frequency reference, as explained above.

Similarly to the case of direct quadrature conversion, the output of a complex multiplier (e.g., FIG. 1D) may be provided to the input of an inverse quadrature converter (e.g., FIG. 1C) to provide for frequency conversion and overall inverse quadrature conversion in two stages, rather than one stage.

Each of the above-described converters shown in FIGS. 1A–1D may be realized by either analog or digital devices, or by a combination of both analog and digital devices. Each may also be implemented by a digital signal processor (DSP) operating under the direction of a control program.

As indicated above, it is sometimes convenient to realize direct quadrature conversion (or inverse quadrature conversion) in separate, consecutive stages, where each stage uses a different frequency for the reference signal. Between each stage, the signal may be converted from analog form to digital form, or from digital form to analog form, as the case permits. Thus, for example, direct quadrature conversion of an analog signal at a high frequency $\omega_1$ may be realized with the first stage being an analog quadrature converter having a reference signal with a frequency $\omega_0$ that is close to $\omega_1$, which generates two analog orthogonal components at a low difference frequency of $\Delta\omega = \omega_1 - \omega_0 \gg 0$. Then, the signals from the first stage may be converted to digital form using an analog-digital converter, and provided to a second stage which comprises a digital conjugate-complex multiplier which uses $\Delta\omega$ as the reference signal frequency. The outputs of the second stage are orthogonal components of the baseband signal that was initially modulated onto the high-frequency signal at $\omega_1$. In spread-spectrum systems and global navigation systems, the baseband signal is usually in the form of digital PR-codes.

We now turn to the overall description of the present inventions. The apparatuses for narrow-band interference suppression according to the present invention generally comprise a main controller, an interference estimator (I.E.) and one or more interference compensators (I.C.'s), each interference compensator being used to suppress a respective interference signal. The controller coordinates the actions of the estimator and the compensator(s), and may be readily implemented by a conventional microprocessor or digital signal processor (DSP) running a control program. The controller may be a stand-alone unit, or may be integrated with the interference estimator or one of the interference compensators. All three systems may, of course, be integrated together, as one unit. As used herein, the true mean frequency of the interference signal will be indicated as "$f_{INT,T}$", whereas the estimated value of the interference signal, as provided by the estimators of the present invention, will be indicated simply as "$f_{INT}$".

A first embodiment of a narrow band suppressor according to the present invention is shown at 10 in FIG. 2. Suppressor 10 comprises an interference estimator 20, an interference compensator 40, and a main controller 15. Estimator 20 is described first and is shown in detailed form in FIG. 2. This embodiment is particularly suited to receivers of the global navigation signals, such as from the GPS and GLN systems.

A received input signal $u_K(t)$, which has been down-converted by conventional analog circuits (which do not form a part of the present inventions), is provided at signal line 5. The frequency band of the received input signal 5 may be at baseband level or near baseband level, or it may be at an intermediate frequency above baseband level. Compensator 40 may process the input signal 5 in either analog or digital form, and may provide an output signal which is in either analog or digital form. Additionally, compensator 40 may receive input signal 5 at an intermediate frequency and may convert it to a lower intermediate form. The compensator embodiments shown in FIGS. 4 and 8 receive signal 5 at baseband level or near baseband level, and the compensator embodiments shown in FIGS. 9 and 10 receive signal 5 at an intermediate level and perform an additional step of frequency down-conversion.

Referring to FIG. 2, estimator 20 may also receive and process the input signal 5 in either analog or digital form. If compensator 40 performs an additional step of frequency down-conversion, it will be easier for estimator 20 to provide compensator 40 with a precise estimate of the mean interference frequency if estimator 20 takes its input from the down-conversion stage in compensator 40. The approach is shown by the solid line in FIG. 2 between compensator 40 and an ADC/GATE 11 of estimator 20. If compensator 40 does not provide an additional step of frequency down-conversion, estimator 20 may take its input directly from line 5; this approach is shown by the dashed line in FIG. 2 between line 5 and the input of ADC/GATE 11.

For the purposes of describing and illustrating estimator 20, and without restricting the present inventions, estimator 20 receives and processes input signal 5 in digital form. For this purpose, signal 5 is converted to a digital value, usually in the form of one or two bits (e.g., −1 and +1 value system, or −1, 0, +1 value system) by an analog-to-digital (ADC) converter 11 before being provided to estimator 20. The sampling rate of ADC converter 11 is set by a clock 18, which outputs a clocking signal at a frequency of $F_S$, which has a corresponding period $T_S$. $F_S$ clock 18 is clocked by a time-base clock 19, which outputs a higher frequency clock signal $F_0$. The period $T_S$ is a multiple of the period $T_0$ of the $F_0$ clock, and clock 18 ($F_S$) may therefore comprise a frequency divider or a counter. The output of clock 19 ($F_0$) may be used by other components of estimator 20, compensator 40, and main controller 15. In general, 8 to 10 bits of resolution may be used in ADC 11.

ADC 11 is used in the case where estimator 20 takes the input directly from line 5 (via the dashed line) in analog form, or where estimator 20 takes the input from an analog version of the input signal provided by compensator 40 (usually after a stage of frequency down-conversion). If compensator 40 provides a digital version of the input signal, but not in sync with the $F_S$ clock, then component 11 may instead comprise a digital gate which latches the digital data in sync with the $F_S$ clock. As another configuration, if compensator 40 also processes the input 5 in digital form, it may also have an analog-to-digital converter similar to that of ADC 11 and which is synchronized to the $F_S$ clock. If this is the case, compensator 40 and estimator 20 may share a common analog-to-digital converter as the initial stage of signal processing. In this case, the output of ADC 11 may be provided to the input of compensator 40, or an equivalent ADC may be used in compensator 40 (shown as ADC 12 in FIG. 4), and the output of this ADC may be provided in place of ADC 11. (This latter case is shown by the solid line between compensator 40 and component 11, where component 11 would need only to comprise a through connection to switch 32.) In the case of using a common ADC, the common ADC would have a digitization resolution high enough to meet the needs of both estimator 20 and compensator 40. If one of these components needs a lower resolution, it may simply drop one or more of the least significant bits.

Estimator 20 analyzes input signal 5 for interference signals, and estimates the mean frequency $f_{INT,T}$ of the interference signal, if it is found. The estimated value is referred to herein as $f_{INT}$. This information is provided to main controller 15, which in turn tunes compensator 40 for an initial suppression of the interference signal. Main controller 15 preferably provides tuning parameters to the compensator 40 through a control bus 17 which enable compensator 40 to suppress the interference signal. The output of the compensator 40 generates a difference signal $u_D(t)$ which is equal to the difference between the received signal $u_K(t)$ and an approximate copy of the interference signal $\tilde{u}_{INT}(t)$ as follows: $u_D(t)=u_K(t)-\tilde{u}_{INT}(t)$. The parameters provided by main controller 15 are preferably computed by a control program running on a microprocessor or a digital signal processor, and may, for example, be computed from formulas, or found in a look-up table, or interpolated from a look-up table.

After compensator 40 is initially tuned to reject the interference signal, main controller 15 directs estimator 20 to analyze the output of compensator 40 so that the tunning of compensator 40 can be refined. The selection between the input signal 5 and the output of compensator 40 is provided by switch 32, which is under the control of main controller 15 through a control line 16. If compensator 40 processes input signal 5 in analog form, then an analog-to-digital converter (ADC) 13 may be included in the signal path from the output of compensator 40 to the input of switch 32. ADC 13 is clocked by $F_S$ clock 18, thereby providing synchronization. ADC 13 preferably has the same bit resolution as ADC 11. If compensator 40 processes signal 5 in digital form at a sampled rate of $F_S$, then it is a relatively simple matter to have the output of compensator 40 synchronized with respect to $F_S$ clock 18. In this manner, both of the digitized inputs provided to switch 32 are synchronized to the same clock. In this case, component 13 may be replaced with a through connection. If compensator 40 does provide its output in digital form, but is not synchronized to $F_S$ clock 18, then a digital sample-and-hold circuit, or gating circuit, may be used in place of ADC 13. The digitized difference signal provided to switch 32 is indicated as $u_D(iT_S)$.

If estimator 20 is able to successfully refine the estimate $f_{INT}$ of the mean frequency $f_{INT,T}$ of the interference signal, and if compensator 40 is thereafter able to suppress the interference signal to an acceptable level, then the difference signal $u_D(t)$ is provided to one or more tracking channels 90 (or baseband signal demodulators) to process the useful signal. Otherwise, a failure signal is provided to tracking channels 90 and/or the user indicating that the interference signal could not be successfully suppressed. Tracking channels 90 do not form a part of the inventions described herein, but merely use the resulting signal generated by systems 20 and 40.

Having described the interaction of compensator 40 with estimator 20, the specific operation of estimator 20 to provide the estimated mean frequency $f_{INT}$ of the interference is now described. For the purposes of illustration, and without limiting the present invention, the spectrum of input signal $u_K(t)$ and the difference signal $u_D(t)$ spans 1 MHz to 19 MHz, and the sampling frequency $F_S$ of ADC 11 is 40 MHz. The bandwidth of a typical interference signal is between 0 Hz (pure continuous wave sinusoid) and 100 kHz. The signal selected by switch 32 is coupled to the input of a direct quadrature converter formed by two multipliers 22a and 22b, a numerically-controlled oscillator (NCO) 23, and two resettable accumulators 24a and 24b. NCO 23 is a quadrature oscillator and provides a Cosine component and a Sine component which have the same frequency but which are shifted in phase by 90° ($\pi/2$). NCO 23 uses the clock $F_S$ as a time base and, an exemplary construction for NCO 23 is shown in FIG. 7-1. The desired frequency is selected by a search controller 50 and is communicated to NCO 23 through a control bus 51. In one constructed embodiment, controller 50 provides to NCO 23 a number "k" representative of the number cycles of the $F_S$ clock which are contained in one cycle of the desired frequency to be generated by NCO 23. The frequency outputs of NCO 23 need only be in one-bit digital format (two levels: −1 and +1), but may be in multi-level form.

Multiplier 22a receives the signal selected by switch 32 and the cosine component of NCO 23, and provides the multiplication of these signals to the input of accumulator 24a. Accumulator 24a samples the multiplication products of multiplier 22a at the frequency $F_S$, and accumulates a predetermined number N of the multiplication products. This accumulation forms the in-phase component signal "I" of the direct quadrature converter. In a similar manner multiplier 22b receives the signal selected by switch 32 and the sine component of NCO 23, and provides the multiplication of these signals to the input of accumulator 24b. Accumulator 24b samples the multiplication products of multiplier 22b at the frequency $F_S$, and accumulates a predetermined number N of multiplication products. This accumulation forms the quadrature-phase component signal "Q" of the direct quadrature converter. The signals I and Q are mutually orthogonal components.

The $F_S$ clock signal to accumulators 24a and 24b is delayed by delay unit 21 for a small amount of time (½$T_S$ or less) with respect to the $F_S$ clock signal provided to ADC 11. This delay accounts for propagation delays through multipliers 22a and 22b, and prevents the accumulators from adding a multiplication product before the product is generated. In preferred embodiments of the present invention, the components of estimator 20 are implemented on a digital-signal processor running under the direction of a control program (e.g., software or firmware). In this case, delay unit 21 indicates that the steps for generating the outputs of NCO 23 and multipliers 22a and 22b are performed before the steps of adding the outputs of the multipliers 22a and 22b to the accumulation sums of accumulators 24a and 24b.

With N multiplication products accumulated, each accumulators 24a and 24b realizes the function of a low-pass filter acting on the multiplication signal. The amplitude-frequency $Z_F(f)$ response of an accumulator which accumulates N samples of a signal at a sampling frequency of $F_S$ is given by the well-known formula:

$$Z_F(f) = Abs\left\{\frac{\sin(\pi f T_A)}{\pi f T_A}\right\}, \text{ where } T_A = NT_s = N/F_s, \text{ with } T_s = 1/F_s,$$

and where Abs(*) is the absolute value function. The general character of this amplitude response is shown by the solid line in FIG. 3 (with $f_M=0$ and $f=f_{INT}$). Signals having frequencies $f=f_{INT}$ greater than $0.8/T_A$ or less than $-0.8/T_A$ have their filtered magnitudes reduced to a level of 22% or less of their initial magnitudes, while signals having frequencies $f=f_{INT}$ between $-0.5/T_A$ and $0.5/T_A$ have filtered magnitudes which remain between 64% and 100% of their initial magnitudes. Thus, the range between $-0.5/T_A$ and $0.5/T_A$ will be considered to be the passband of the filter and, as can be seen, the bandwidth of the passband is inversely proportional to the accumulation time $T_A$: passband=$1/T_A$. The above amplitude response is applied to both signals I and Q. The effect of NCO 23 is to shift the frequency spectrum of the input signal being analyzed (either $u_K(t)$ or $u_D(t)$) by the current programmed frequency $f_{NCO}$. Thus, for example, if the spectrum of the input signal ranges between 0 and $20/T_A$, and if $f_{NCO}$ is set to a value of $10/T_A$, then the spectrum from $9.5/T_A$ to $10.5/T_A$ of the input signal will be shifted into the passband from $-0.5/T_A$ to $0.5/T_A$ of the filter. The effect is as though the center frequency of the filter has been shifted by a frequency of $10/T_A$. The frequency shift of NCO 23 may be accounted for by setting $f_M=f_{NCO}$ for the solid curve in FIG. 3.

With the frequency shift provided by NCO 23 and the filtering provided by accumulators 24a and 24b, the signals I and Q are mutually orthogonal components which represent the amplitude Z of the signal's frequency components in a narrow frequency band centered around the programmed frequency of NCO 23. The bandwidth of this narrow band is inversely proportional to the accumulation time $T_A$. A longer accumulation time produces a more narrow band, and vice-versa. The amplitude Z in this narrow band is generated from I and Q by Z-generator 26, which may generate Z by summing together the squares of I and Q and then taking the square-root of the sum (i.e., $Z=[I^2+Q^2]^{1/2}$). This form of generating Z is somewhat time consuming since the square root operation requires more arithmetic computation steps than a multiplication or a division operation. Instead of using the form of $Z=[I^2+Q^2]^{1/2}$, one may use the approximate form of $$Z \approx [\text{Max}\{\text{Abs}(I)+2\cdot\text{Abs}(Q), 2\cdot\text{Abs}(I)+\text{Abs}(Q)\}]/(2.11803)$$

in Z-generator 26, where Abs(*) function is the absolute value function, and where the Max(A,B) function is the maximum one of its two parameters A and B. The maximum error in this approximation is ±5.6%. This approximation form can be generated more quickly since the multiplication by 2 may be done by a simple bit shift operation, and the division by 2.11803 may be implemented as a multiplication by the quantity 0.472137=1/(2.11803). Oftentimes, a relative comparison is made between different values of Z at different frequencies; in such cases, the division by 2.11803 may be omitted as it does not affect the outcome of a relative comparison.

After N multiplication products have been accumulated in accumulators 24a and 24b, search controller 50 issues a control signal on a control line 52 to Z-generator 26 which causes Z-generator 26 to generate the current value of Z, which is then provided to search controller 50 on a data bus 53. A short time after generating the current value of Z, accumulators 24a and 24b are reset to zero in preparation for the next accumulation of multiplication products. This synchronization of the reset operation may be readily accomplished by using the control signal on line 52 and delaying the signal by a short amount of time. This delay may be accomplished by delay unit 25. In preferred embodiments, accumulators 24a and 24b and Z-generator 26 are implemented by a digital-signal processor running under the direction of a control program (e.g., software or firmware) which emulates the operations of these components. In this case, delay unit 25 indicates that the steps of generating Z are performed before the step of resetting accumulators 24a and 24b.

By sweeping the frequency of NCO 23 and measuring Z at each step, one can find the frequency spectrum of the signal. From this, one can then determine if any interference signals exist by observing whether there are any peaks in the spectrum that rise above the level normally expected from the combination of the useful signal and the noise sources. These actions are performed by main controller 15 and search controller 50 in the following manner. In a preferred embodiment of estimator 20, search controller 50 operates NCO 23 in the following two modes of operation:

(a) Course frequency sweep mode, which steps the programmed frequency $f_{NCO}$ through rough frequency increments $\Delta F_R = F_S/256$ (where $F_S$ is the above-noted sampling frequency of ADC 11) starting from $6 \cdot F_S/256$ and ending at $122 \cdot F_S/256$. This may be stated as:

$$f_m = \frac{(m+6) * F_S}{256}, \text{ where } m = 0, 1, \ldots, 116.$$

With $F_S=40$ MHz, the increments cover a span of a little more than 18 MHz. At each course step, N=256 products are accumulated.

(b) Fine frequency sweep mode which steps the programmed frequency $f_{NCO}$ through more precise frequency increments of $\Delta F_N = F_S/2048$. At each fine step, N=2048 products are accumulated.

(It may be appreciated that additional modes may be used.) In each of the above course and fine sweep modes, the size of the frequency step is equal to $F_S/N$, where N is either 256 or 2048. As indicated above, the number N of accumulation products sets the passband of the accumulation filter to $1/T_A = F_S/N$, where $T_A = N/F_S$. Setting the frequency step to $F_S/N$, causes the frequency step to be equal to $1/T_A$, which is the passband of the accumulation filter. According, no part of the signal's frequency spectrum is missed or duplicated when the band is scanned by search controller 50.

In this preferred embodiment, controller 50 undertakes the following stages of searching for an interference signal:

Stage 1

Step (1a). The general step of spectral analyzing in the band 1–19 MHz in the course frequency step mode with the step $\Delta F_R$ is undertaken. Search controller 50 causes accumulators 24a and 24b to take N=256 samples at each course frequency step to generate I and Q. Magnitude Z is generated at each frequency step using the relationship $Z=[I^2+Q^2]^{1/2}$, or the above approximation for Z. At $F_S=40$ MHz, the accumulation time at each frequency step is $T_A=256/40$ MHz$=256 \cdot 25$ ns$=6.4$ μs. With 117 frequency steps, the scan of the band requires an amount of time $T_{AN1}=117 \cdot T_A=748.8$ μs.

Prior to scanning the band and performing the above steps, a threshold amplitude level $P_N$ for $Z=[I^2+Q^2]^{1/2}$ is set, or pre-computed, and is stored in register 54. This threshold level $P_n$ is an amplitude level for Z which is just above the maximum expected amplitude level of the useful signal plus the noise sources. It may be found by scanning the band and computing the average or median amplitude response, which may be done by controller 50 beforehand. If there is an interference signal, the value of $Z=[I^2+Q^2]^{1/2}$, or the above approximation form for Z, will rise above the threshold level $P_N$ in two or more of the frequency steps around the mean frequency $f_{INT,T}$ of the interference signal. The two frequency steps which have the highest amplitude level above the threshold level will be used to generate the estimate $f_{INT}$ of the mean interference frequency $f_{INT,T}$ in steps (1b)–(1d) below.

FIG. 3 shows how the interference signal is filtered by NCO 23 and accumulators 24a and 24b in the three frequency steps nearest the interference signal $f_{INT,T}$. These three frequency steps are, for the purposes of generality, are denoted as M−1, M, and M+1 and have the corresponding frequencies $f_{M-1}$, $f_M$, and $f_{M+1}$, respectively, which are generated by the above relationship for the course frequency steps ($f_m$). The solid curve 302 in FIG. 3 is the accumulation filter response at the frequency $f_M$, the dotted curve 301 is the accumulation filter response at the frequency $f_{M-1}$, and the dashed curve 303 is the accumulation filter response at the frequency $f_{M+1}$. The interference frequency, which is indicated at 304, will be filtered by a different amount by each of the three responses 301–303. The filtered amounts are denoted as $Z_{M-1}$, $Z_M$, and $Z_{M+1}$ for the three curves 301–303, respectively, and their relative amount with respect to one another is illustrated by corresponding arrows which extend upward from the horizontal axis to met their corresponding curves. For the purposes of illustration, the maximum amplitude is taken as $Z_M$, and it has been encountered at the $M^{th}$ frequency step $f_{NCO}=f_M$. To simplify matters, the frequency axis in FIG. 3 has been normalized to frequency $f_M$ and the accumulation time $T_A$ as follows: $T_A(f-f_M)$. Note that $Z_{M-1}$ is less than $Z_{M+1}$. Also note that response curve 303 ($f_{M+1}$) is above response curve 301 ($f_{M-1}$) for frequencies $f > f_M$ (e.g., $T_A(f-f_M) > 0$), and that response curve 301 ($f_{M-1}$) is above response curve 303 ($f_{M+1}$) for frequencies $f < f_M$ (e.g., $T_A(f-f_M) < 0$). Thus, if the true mean interference frequency $f_{INT,T}$ is greater than $f_M$, then $Z_{M+1}$ will be greater than $Z_{M-1}$. Similarly, if the true mean interference frequency $f_{INT,T}$ is less than $f_M$, then $Z_{M-1}$ will be greater than $Z_{M+1}$.

If the mean interference frequency $f_{INT,T}$ occurs between two frequency steps, maximal loss in each of the two closest filter responses is equal to:

$$\chi = 20 \cdot \log|\pi/2| = 3.9 \text{ dB}.$$

However, this loss does not hinder the certain detection of the interference signal, even when interference power is equal to the noise power.

Step (1b). As the band is scanned, search controller 50 performs the step of recording the highest amplitude response $Z_M$ above threshold $P_N$ it encounters as it scans. The highest amplitude is recorded in a register identified as "Buffer 2" in FIG. 2. Each amplitude above threshold $P_N$ is tested against the value of Buffer 2, which may be initially set to the threshold value $P_N$, and Buffer 2 is updated with the value of the current amplitude if the current amplitude is greater than the present value of Buffer 2. Whenever Buffer 2 is set with a value above threshold $P_N$, "Flag 1" is set.

Step (1c). Whenever Buffer 2 is updated, the contents of a register "Buffer 1" is updated with the current frequency of NCO 23 (e.g., frequency $f_M$), and the content of a register "Buffer 4" is updated with the amplitude $Z_{M-1}$ response at the previous frequency step. These steps are performed by controller 50. In this regard, search controller 50 can easily save the previously measured amplitude response in a temporary internal register in case it should need to be copied to Buffer 4. Also, the amplitude response $Z_{M+1}$ of the next frequency step is saved to register Buffer 3.

Step (1d). At the end of the course frequency scan, if the threshold value was not exceeded (i.e., Flag 1 was not set), then the steps of the first stage process are repeated starting from the step (1a) to continually look for an interference signal. If the threshold was exceeded (Flag 1 was set), search controller 50 notifies main controller 15 on control bus 55. Main controller 15 reads the values of the Buffers 1–4, and then performs the steps of generating an initial (rough) estimation $f_{INT}$ of the mean interference frequency $f_{INT,T}$ in the following form:

$$f_{INT} = f_M + \frac{1}{T_A} \frac{Z_{M+1}}{Z_M + Z_{M+1}}, \text{ if } Z_{M+1} > Z_{M-1},$$

$$f_{INT} = f_M - \frac{1}{T_A} \frac{Z_{M-1}}{Z_M + Z_{M-1}}, \text{ if } Z_{M+1} > Z_{M-1}.$$

FIG. 3 shows the two highest points being $Z_M$ at $f_M$ and $Z_{M+1}$ at $f_{M+1}$. The above form is based upon an interpolation between the two frequency steps having the highest amplitudes based on the weighting of their respective amplitude values. The interpolation works well due to fact that both the filter response curves have quasi-linear slopes in the region where $f_{INT,T}$ is located. In this regard, the selection of the filter characteristics is advantageous.

Modeling of various interference signals processed by the above filtering topology shows that the maximum error in the estimated mean interference frequency $f_{INT}$ (with a typical bandwidth of 25 kHz) does not exceed 50 kHz for a course frequency step of 156 kHz ($F_S/N=40$ MHz/256).

All of the above comparisons and computations using magnitudes $Z_M$, $Z_{M+1}$, $Z_{M-1}$ are based on the relative values of these parameters. Therefore, multiplying or dividing each of these parameters by a constant γ would not change the computation of $f_{INT}$. Thus, in place of the above approximation form:

$Z \approx [\text{Max}\{\text{Abs}(I)+2\cdot\text{Abs}(Q), 2\cdot\text{Abs}(I)+\text{Abs}(Q)\}]/(2.11803)$ one may use the relative form:

$Z' \approx [\max\{\text{abs}(I)+2\cdot\text{abs}(Q), 2\cdot\text{abs}(I)+\text{abs}(Q)\}]$, which removes the division operation, and thereby simplifies and speeds the generation of the Z values. When using the relative form Z', the following threshold value should be used: $P_N'=2.11803 \cdot P_N$ in place of $P_N$.

Of course, the above steps of generating $f_{INT}$ may be carried out by search controller 50, and the results thereof provided to main controller 15. In preferred embodiments, controller 50 is implemented by a digital-signal processor running under the direction of a control program (e.g., software or firmware) which emulates the control operations of controller 15.

Step (1e). As an optional step, main controller 15 may provide the estimated mean frequency $f_{INT}$ to compensator 40 to enable it to start a rough compensation operation with its rejection band set at maximum bandwidth.

Stage 2

Step (2a). By way of control bus 55, main controller 15 instructs search controller 50 to scan the frequencies of the input signal in a ±100 kHz band around the rough estimation of the mean interference frequency using the fine frequency step mode (step $\Delta F_n$). At every frequency step, N=2048 samples are accumulated to generate the components I, Q. As in the course step case, FIG. 3 shows how the interference signal is filtered by NCO 23 and accumulators 24a and 24b at the refined step, except $T_A=N \cdot T_S=2048 \cdot T_S=51.2$ µs in this case.

For scanning the whole 200 kHz band, 12 frequency steps are used. Thus, the analysis time is $T_{AN2}=12 \cdot T_A=614.4$ µs.

Step (2b). From the scan, the maximum spectral component $Z_M$ is determined, in the manner described above.

Step (2c). The contents of buffers 1–4 are updated with the frequency $f_M$ of the maximal spectral component, its value $Z_M$ and values of the two neighboring spectral components ($Z_{M+1}$, $Z_{M-1}$).

Step (2d). Main controller 15 reads the values of the buffers 1–4 and generates a more precise estimated mean interference frequency $f_{INT}$ according to the above-described equations which use $f_M$, $Z_M$, $Z_{M+1}$, $Z_{M-1}$, and $T_A$. The maximal error in the estimation of the frequency of a harmonic or narrow-band (25 kHz) interference in this case does not exceed 5 kHz (the result of simulation modeling).

Step (2e). Controller 15 provides the more precise estimate $f_{INT}$ of the mean interference frequency $f_{INT,T}$ to interference compensator 40.

Stage 3

Step (3a). The spectral analysis as performed in stage 2 is repeated again in the neighborhood of the interference frequency, but with compensator 40 in operation and with estimator 20 using the difference signal $U_D(t)$ generated by compensator 40 (as selected by main controller 15 through switch 32). The rejection band of compensator 40, which is described in greater detail below, is initially set to its maximum value, which is normally wider than the bandwidth of the interference signal. Thus, compensator removes a large band of frequencies (which corresponds to the rejection band) around the precise estimate $f_{INT}$ of the mean interference frequency $f_{INT,T}$. The width of this removed band is narrowed by the following subsequent steps so as to preserve as much of the useful signal as possible. If the compensator's rejection band is narrowed too much, a portion of the interference band will show up in the spectral analysis.

Step (3b). Search controller 50 prefers the steps of scanning a ±100 kHz frequency band around the precise estimated mean interference frequency $f_{INT}$ for the maximum residual spectral component $Z_{RES}$ which is above the threshold value $P_N$ using the steps described above in stage 2. If the threshold value is exceeded during the scan, a flag 2 is set to indicate that a portion of interference band is present. Before the scan is begun, flag 2 is reset.

Step (3c). Controller 15 checks the state of flag 2. If flag 2 has not been set, then controller 15 instructs compensator 40 to narrow the rejection band. As described below in greater detail, the narrowing of the band may be done by updating the parameters of the compensator's filters. The updated parameters may be provided by controller 15 on control bus 17. If flag 2 has been set, indicating that the current rejection band is too narrow, then controller instruct compensator 40 to revert back to the previous setting of the rejection band (e.g., by using the previous set of filter parameters.)

Step (3d). Steps (3b) and (3c) are repeated until the rejection band reaches its minimum setting, or until flag 2 value is set, in which case the rejection band is set to the state it had in the previous iteration.

Stage 4 (Optional Steps)

If the interference suppression 10 comprises two or more compensators 40, each being able to suppress a respective narrow-band interference signal, then the steps in stage 4 may be performed. If there are multiple compensators 40, they may be coupled in series, with each compensator processing the input signal before passing it on to the next compensator, or they may be coupled in parallel by a common subtractor block. Each compensator is adjusted one at a time with the steps detailed above in stages 1–3. Once a compensator has been adjusted, it remains on while the next compensator is adjusted, as so on. From the steps in stage 1, the first compensator to be adjusted will compensate the strongest interference signal, and the second compensator to be adjusted will compensate the second strongest interference signal, and so on.

In the suppressor embodiments to be described next, it will be more convenient to refer to the estimated mean interference frequency $f_{INT,T}$ in terms of its value in radians, rather than its value in terms of Hertz. The radian value of the mean interference frequency will be designated as $\omega_{INT,T}$, which is related to $f_{INT,T}$ by the well known relationship: $\omega_{INT,T}=2\pi f_{INT,T}$. The same may be said of the estimated mean interference frequency $f_{INT}$ having a radian form $\omega_{INT}=2\pi f_{INT}$. Some of the suppressor embodiments to be described will include a stage of frequency down-conversion in their signal paths, whereby the mean interference frequency is down-converted from a level of $\omega_{INT,T}$ to a lower level of $\Omega_{INT,T}$. Of course, $\Omega_{INT,T}$ has a corresponding representation $F_{INT,T}$ in Hertz, with $\Omega_{INT,T}=2\pi F_{INT,T}$. The same may be said of the estimated mean interference frequency $F_{INT}$ having a radian form $\Omega_{INT}=2\pi F_{INT}$. In these down-conversion embodiments, it is usually more preferable to estimate the value $\Omega_{INT,T}$ rather than the value of $\omega_{INT,T}$. Estimator 20 can be readily configured to estimate $\Omega_{INT,T}$ in such a suppressor by coupling the estimator's input to the outputs of down-conversion stage in the suppressor. In such a configuration, the above discussion of the operation of estimator 20 applies if one replaces $f_{INT,T}$ with $F_{INT,T}$ and replaces $f_{INT}$ with $F_{INT}$.

A first embodiment of compensator 40 is shown at 400 in FIG. 4, which also shows estimator 20 and main controller 15 in block form. The compensators according to the present invention may be implemented wholly by analog circuits, or wholly by digital circuits, or by a combination of both analog and digital circuits. Compensator 400 is a wholly digital implementation, which may be implemented wholly by digital circuits, or by a digital signal processor running under the direction of a control program, or by a combination of both approaches. The input signal $u_K(t)$ from the receiver's intermediate frequency amplifier is provided to compensator 400 at signal line 5 and is converted into a sequence of digital samples $u_K(iT_S)$ (i=1, 2 . . . ) by a multi-level analog-to-digital converter (ADC) 12 with the quantization period $T_S$, as previously described above with respect to FIG. 2. The difference signal $u_D(iT_S)$ is formed in a digital subtractor 404 by the step of subtracting the digital samples of the interference copy $\tilde{u}_{INT}(iT_S)$ from the digital samples of the sampled input signal $u_K(iT_S)$.

As is known in the art, an analog-to-digital converter like ADC 12 performs the step of generating a quantized version of its input signal, the quantized version having a plurality M of quantization levels. The number M of quantization levels of a typical ADC is generally related to the bit resolution R of the ADC as follows: $M=2^R$ or $M=(2^R-1)$. ADC 12 has at least one bit of resolution (i.e., at least two quantization levels), and preferably has between 8 to 10 bits of resolution (i.e., between M=255 and M=1024 quantization levels). In typical embodiments, ADC 12 has at least 6 bits of resolution (i.e., at least M=63 quantization levels).

The difference signal $u_D(iT_S)$ is used by the remaining components of compensator 400 to generate the interference copy $\tilde{u}_{INT}(iT_S)$. Before describing these components in detail, the processing that is performed on the difference signal $u_D(t)$ is first summarized as follows. The difference signal $u_D(t)$, which contains at least a small replica of the interference signal within it, undergoes the step of a first frequency-shift conversion (such as by direct quadrature conversion or an equivalent thereof) where it is converted to its quadrature components with respect to the estimated mean frequency $\omega_{INT}$ vector of the interference signal (the frequency being found by estimator 20 as $\omega_{INT}=2\pi f_{INT}$). (In some implementations, these quadrature components are narrow band, in which case they may be referred to as Cartesian components.) In both of these quadrature components, the interference band has been shifted in frequency such that the interference band is very near zero frequency ($\omega=0$), with the frequency peak of the interference signal typically being within ±1.5 kHz of zero Hertz. Because the NCO used in each of the estimator and the suppressor has its frequency adjusted in discrete increments of $\Delta f$ ($\Delta\omega=2\pi\Delta f$), the difference between estimated mean frequency $\omega_{INT}$ and the actual mean frequency is typically less than $\Delta f/2$, as measured in Hertz, which is less than $2\pi\Delta f/2=\Delta\omega/2$ as measured in radians. (For GPS applications of the present suppressor invention, the difference $\Delta f/2$ may be less than 2.44 kHz for an implementation of $\Delta f=F_S/2^{14}$, with $F_S=40$ MHz).

Each of the quadrature components then undergo a step of filtering by respective low-pass filters whose filter characteristics are adjusted by main controller 15, as described-above, to substantially remove the frequency components of the useful signal and noise which lie outside the band of the interference signal. This leaves the interference signal in the form of its quadrature components (or Cartesian components when applicable) with respect to the estimated mean frequency $\omega_{INT}$ vector. After this filtering step, the quadrature components undergo a step of reverse frequency-shift conversion (such as by inverse quadrature conversion) to construct the interference copy $\tilde{u}_{INT}(iT_S)$. In the reverse conversion step, the signal bands of the quadrature components (or Cartesian components when applicable) are frequency shifted up by an amount substantially equal to the estimated mean interference frequency $\omega_{INT}$, and then combined, as described below. The interference copy $\tilde{u}_{INT}(iT_S)$ then undergoes the step of being fed back to digital subtractor 404 to form the difference signal $u_D(t)$, which creates a negative feedback loop (also called a servo control loop).

Turning to the details of compensator 400, the quadrature components $C_D$ and $S_D$ of the difference signal are obtained after the steps of frequency-shift and quadrature conversion of the difference signal $u_D(iT_S)$ by a quadrature frequency converter. The frequency converter comprises two multipliers 406a and 406b, and a dual-output quadrature numerically controlled oscillator (NCO) 408. NCO 408 performs the step of generating two sets of quadrature frequency signals at the estimated mean interference frequency $\omega_{INT}$ as follows:

1. a first digital Cosine signal $\cos[\omega_{INT}(i-1)T_S]$ and a first digital Sine signal $\sin[\omega_{INT}(i-1)T_S]$, and
2. a second digital Cosine signal $\cos[\omega_{INT} iT_S]$ and a second digital Sine signal $\sin[\omega_{INT} iT_S]$, The notations "$iT_S$" and "$(i-1)T_S$" indicate that the normal time parameter "t" is digitized at discrete time points which are synchronized to the $F_S$ clock, which has period $T_S$. "$iT_S$" indicates the current time point, whereas "$(i-1)T_S$" represents the previous time point, which is delayed by one $T_S$ period from $iT_S$. The frequency $\omega_{INT}$ of the signals from NCO 408 is found by estimator 20. Multiplier 406a receives the different signal $u_D(iT_S)$ and the Cosine signal $\cos[\omega_{INT}(i-1)T_S]$ from NCO 408, and performs the step of generating quadrature component $C_D(iT_S)$ at its output. Multiplier 406a receives the different signal $u_D(iT_S)$ and the Sine signal $\sin[\omega_{INT}(i-1)T_S]$ from NCO 408, and performs the step of generating quadrature component $S_D(iT_S)$ at its output. As a result of the conversion, the interference band has been shifted in frequency such that the interference band in signals $C_D$ and $S_D$ is substantially centered around zero frequency ($\omega=0$). The other set of quadrature signals from NCO 408, $\cos[\omega_{INT}iT_S]$ and $\sin[\omega_{INT}iT_S]$, is provided to a second frequency-shift converter (an inverse quadrature converter), which is described in greater detail below. An exemplary implementation of NCO 408 and the use of the one $T_S$-period phase shift between the two sets of quadrature signals are also described below.

The number $L_1$ of quantization levels provided in each of reference signals $\cos[\omega_{INT}(i-1)T_S]$ and $\sin[\omega_{INT}(i-1)T_S]$ is generally related to the number M of quantization levels used by ADC 12 to generate $u_K(iT_S)$. $L_1$ is always at least 2, and is generally in the range of M/16 to 16*M. The number $L_1$ of quantization levels is generally equal to $2^R$ where R is the number of bits used in representing each of $\cos[\omega_{INT}(i-1)T_S]$ and $\sin[\omega_{INT}(i-1)T_S]$.

As part of their operations, the outputs of multipliers 406a and 406b also produce one or more harmonic replicas of the interference signal in $C_D$ and $S_D$ at one or more corresponding higher frequencies. These harmonics are shown in FIG. 4 as $C_{2W}(iT_S)$ and $S_{2W}(iT_S)$. However, these harmonic signals $C_{2W}(iT_S)$ and $S_{2W}(iT_S)$ are subsequently removed by the filters 410 which follow multipliers 406a and 406b. Additional harmonic replicas may be created in the output of the multipliers if the Sine and Cosine signals from quadrature NCO 408 are digitized at low bit-resolution levels. However, these additional harmonic replicas would also be removed by filters 410.

It may be appreciated that the combination of filters 410 with multipliers 406 and NCO 408 provide the function of a direct quadrature converter. However, as described below in greater detail, filters 410 not only provide the filtering of a direct quadrature converter (by removing harmonic signals $C_{2W}(iT_S)$ and $S_{2W}(iT_S)$), but also filter portions of the frequency bands of $C_D(iT_S)$ and $S_D(iT_S)$, which would not be done by a conventional direct quadrature converter.

The step of filtering the quadrature components $C_D$ and $S_D$ is performed by two respective dynamic low-pass filters 410a and 410b, which results in generating two control signals $U_C$ and $U_S$, respectively. The dynamic filters are preferably identical for each of the $C_D$ and $S_D$ signals, and each preferably comprises a first gain block 411 ($K_1$), a second gain block 412 ($K_2$), a summator 413 (+), a first accumulator 414 ($\Sigma_1$), and a second accumulator 415 ($\Sigma_2$). (A summator is also called a summer, adder, or "summation node" in the art.) Each quadrature component is split to two parallel processing paths, and then recombined at summator 413. In the first parallel path, the quadrature component is multiplied by gain factor $K_1$ at gain block 411; in the second parallel path, the quadrature component is multiplied by gain factor $K_2$ at gain block 412 and then accumulated by second accumulator 415 ($\Sigma_2$). From summator 413, the combined signals are accumulated by first accumulator 414 ($\Sigma_1$) to provide the final filtered output (control signals $U_C$ and $U_S$). Each of accumulators 414 and 415 is preferably operated as a serial digital integrator which is not cleared during operation. The negative feedback loop formed in the compensator, as briefly described above and more fully described below, prevents each of accumulators 414 and 415 from exceeding their computation ranges (i.e., prevents numerical underflow and numerical overflow).

Each accumulator 414 and 415 are clocked by delayed versions of the $F_S$ clock to account for signal propagation delays that occur from the output of ADC 12 to their inputs. This clocking prevents each accumulator from adding its input signal to its accumulation total before its input signal has been properly processed by the preceding signal-processing components. Each accumulator 415 is clocked by a clock signal generated by coupling clock $F_S$ to a delay unit 416. The delay provided by unit 416 accounts for the signal delay through components 12, 404, 406a, 406b, 411, and 412 (and their respective processing steps) so that input to accumulator 415 is at the proper value before it is added to the accumulation total of accumulator 415. Each accumulator 414 is clocked by a clock signal generated by a second delay unit 417 which is driven by the output of the first delay unit 416. The delay provided by unit 416 accounts for the signal delay through accumulator 415 and summator 413 so that the input to accumulator 414 is at the proper value before it is added to the accumulation total of accumulator 414. In some implementations, and in the preferred implementations of compensator 400, components 404–417 are implemented by a digital-signal processor running under the direction of a control program (e.g., software or firmware) which emulates processing steps provided by these components. In these cases, delay unit 416 may be implemented by ordering the program code such that the code which implements the processing steps of components 404–412 is executed before the code which implements the accumulation step of accumulator 415, at every time point $iT_S$. In a similar manner, delay unit 417 may be implemented by ordering the program code such that the code which implements the processing steps of components 404–413 and 415 is executed before the code which implements the accumulation step of accumulator 414, at every time point $iT_S$.

The amplitude-frequency transfer function $K_F(*)$ of each lowpass filter 410 is controlled by the values of gain factors $K_1$ and $K_2$, which in turn are set by main controller 15 through control bus 17. In the frequency band around zero where the interference frequency has been shifted, such as generally between $-F_S/20$ and $+F_S/20$, the amplitude-frequency transfer function $K_F(*)$ of each filter 410 can be well approximated by the following equation:

$$K_F(p) = \frac{K_1}{p} + \frac{K_2}{p^2}; \text{ where } p = j2\pi\left(\frac{f}{F_S}\right) = j\left(\frac{\omega}{\omega_S}\right),$$

where $F_S$ is the sampling frequency ($\omega_S = 2\pi F_S$), and where f is the frequency of the component being filtered ($\omega = 2\pi f$). The above approximate equation may be placed in rationalized form as follows:

$$K_F(p) = \frac{\frac{K_1}{K_2}p + 1}{\frac{1}{K_2}p^2}.$$

where it is apparent that there is one zero in the numerator and two-poles in the denominator (a double pole at zero frequency). The number of poles is one greater than the number of zeros. The approximate formula is valid in at least the range of ±2 MHz, which is sufficient to encompass the bandwidths of most interference signals in the L1 and L2 bands. In a preferred implementation, the response characteristic $K_F(p)$ is varied by changing the gain factor $K_1$ and by adjusting $K_2$ such that the following ratio of the gain factors is kept constant: $(K_1)^2/K_2 = \alpha =$ constant. Exemplary and preferred ranges for $\alpha$ are provided below after describing the overall response of the suppressor loops. The above equation may be converted to a specific form using $(K_1)^2/K_2 = \alpha$ as follows:

$$K_F(p) = \frac{K_1}{p} + \frac{K_1^2}{\alpha p^2} = \frac{1}{\left(\frac{p}{K_1}\right)} + \frac{1}{\alpha\left(\frac{p}{K_1}\right)^2}$$

The magnitude of $K_F(p)$ is plotted in FIG. 5 for two values of $K_1$ (with $\alpha=4$) to show the corresponding variation in the values of $K_F(p)$. The response is symmetric about zero frequency ($K_F(p)=K_F(-p)$), and has hyperbolic-like curves on either side of the zero-frequency axis. The response characteristic has an infinite gain for zero frequency ($p=0$), but has finite gains for all other frequencies. (The infinite gain is due to the fact that accumulators 414 and 415 are not cleared during operation, and since the two gain branches $K_1$ and $K_2$ are added by a summator.) Such infinite gain is usually not desirable for non-feedback systems because it can cause instability. However, such infinite gain at $p=0$ does not cause instability in negative feedback systems, such as the one in which filters 410 are placed.

If $K_1$ is increased by a factor of 2, the right and left curves of the $K_F(p)$ response (FIG. 5) move apart from one another by a factor of 2. Likewise, if $K_1$ is decreased by a factor of 2, the curves move toward one another by a factor of two. In general, the frequency separation between the right and left curves changes in proportion to the value $K_1$, as measured at any value of $K_F(p)=K_F(-p)$, $p\neq 0$. Since filters 410 have infinite gain at zero frequency ($p=0$), one cannot define a conventional filter bandwidth for them (such as by a −3 dB break point or by an equivalent noise band calculation). However, the above definition of frequency separation in the right and left curves can provide a person with an intuitive feel for the filtering characteristics of filters 410. Moreover, it should be pointed out that placing a single filter 410 in a negative feedback loop, by itself, does produce a negative feedback loop which has a transfer function that can be described by a conventional measure of bandwidth. Such is generally true when filter 410 is placed in more complex negative feedback loops having other signal-processing components, as long as the other components are well behaved. In this case, the transfer function of the filter and the transfer functions of the other components will collectively determine the bandwidth characteristics of the feedback loop.

In the negative feedback loop of compensator 400 (FIG. 4), the transfer functions of filters 410 combine with the transfer functions of the other components in the negative feedback loop to define the overall bandwidth of the compensator's rejection band. Controller 15 performs the step of adjusting the value of $K_1$ (and correspondingly the value of $K_2$) of filters 410 to cause the overall bandwidth of the rejection band to substantially coincide with the bandwidth of the interference signal. In this adjustment process, the separation between the right and left curves of each filter 410 is reduced in steps until a portion of the interference signal is found by estimator 20. The separation distance is then increased by one step. Controller 15 preferably performs these steps.

In some preferred embodiments of the present invention, gain factors $K_1$ and $K_2$ are selected from the following set of discrete binary-factor values: 1, 2, 4, 8, 16, . . . and ½, ¼, ⅛, 1/16, . . . With this set of values, the gain blocks 411 and 412 may be implemented as simple bit shifters. For example, $K_1=2$ would be implemented by shifting the bits of the input signal of block 411 to the left by one bit and $K_1=4$ would be implemented by shifting the bits of the input signal to the left by two bits. Shifting the input bits to the right by one bit implements $K_1=½$, and by two bits implements $K_1=¼$. No shifting implements $K_1=1$. Using this selected set of gain factors enables a simple digital circuit implementation for components 411 and 412 which has little signal delay. The selected set also enables a digital-signal processor implementation to be simple and computationally fast since components 411 and 412 can be implemented by a few lines of program code which copy the input signal and then perform a specified number of right or left bit shifts on the copy.

In constructed embodiments, $K_1$ is typically less than 1, and usually less than 1/32. In some less-preferred implementations of compensator 400, the bit resolution from the outputs of multipliers 406 is relatively low because the quadrature Sine and Cosine signals provided by NCO 408 are in low-bit resolution. (It is also possible to lower the bit resolution at the inputs of multipliers 406 by dropping some of the least-significant bits; such action also lowers the bit resolution of the multiplier outputs). For these low-bit resolution implementations, it may be cumbersome to implement the multiplication operation by shifting bits (right bit shifts), and it may be more convenient to use the filter topology 410' shown in FIG. 6 for such purposes. Filter topology 410' provides an equivalent output response to that provided by the filter topology 410 shown in FIG. 4, but performs the gain multiplications $K_1$ and $K_2$ after the accumulations $\Sigma_1$ and $\Sigma_2$. The accumulators have more bit resolution than the outputs of multipliers 406, and therefore it is relatively easy to shift bits to the right to implement multiplication by binary fractions (e.g., ½, ¼, ⅛, . . . ).

It may be appreciated that many other filter topologies may be used to implement filters 410a and 410b, and that many different types of filter topologies are known to the art. Some of these filter topologies do not have infinite gain for DC signals ($\omega=0$), but such filters are still of use in the compensators according to the present invention. In general embodiments of compensators according to the present application, filters 410a and 410b have gains at $\omega=0$ which are greater than 1, and which are preferably greater than 10. More preferably, the gains of filters 410a and 410b are greater than 100. These gains are in contrast to the filter gains of a conventional direct quadrature converter, which have a value of 1 at $\omega=0$. The filter topology of filter 410 is currently preferred because it can be easily implemented and because the double-pole at zero-frequency provides enhanced separation of the interference signal from the useful signal, and therefore good suppression characteristics for compensator 400.

From filters 410, the control signals $U_C$, $U_S$ undergo the step of inverse quadrature conversion by an inverse converter formed by two multipliers 420a and 420b, NCO 408, and a summator 422. As a result, the interference copy $\tilde{u}_{INT}(iT_S)$ is formed at the output of summator 422. NCO 408 provides Cosine signal $\cos[\omega_{INT} iT_S]$ to multiplier 420a and Sine signal $\sin[\omega_{INT} iT_S]$ to multiplier 420b. These signals have the same frequency $\omega_{INT}$, which is the same frequency provided to multipliers 406a and 406b, which are part of the first frequency-shift converter previously described. With these signals, multipliers 420a and 420b and summator 422 shift the interference bands of the filtered quadrature components $U_C$ and $U_S$ up in frequency by an amount equal to the estimated mean interference frequency $\omega_{INT}$ and combine them to form the interference copy $\tilde{u}_{INT}(iT_S)$.

The interference copy signal $\tilde{u}_{INT}(iT_S)$ is then provided to a gating circuit 424 (e.g., a D-type register latch), which synchronizes the signal to the $F_S$ clock. The output of gating circuit 424 is then provided to subtractor 404, which performs the step of subtracting $\tilde{u}_{INT}(iT_S)$ from the input signal $u_K(iT_S)$ to form the difference signal $u_D(iT_S)$. Gating circuit 424 and ADC 12 are both clocked by the $F_S$ clock, and are therefore synchronized to one another.

The number N of quantization levels provided in signal $\tilde{u}_{INT}(iT_S)$ is generally related to the number M of quantization levels used by ADC 12 to generate $u_K(iT_S)$. N is always at least 2, and is generally in the range of M/16 to 16*M, and preferably in the range of M/2 to 2*M, and more preferably in the range of M to 2*M. The number N of quantization levels is generally equal to $2^R$ where R is the number of bits used to represent $\tilde{u}_{INT}(iT_S)$.

The quadrature signals $\cos[\omega_{INT}iT_S]$ and $\sin[\omega_{INT}iT_S]$ provided to multipliers 406 are preferably in multiple-bit form with a bit-resolution which is close to, or equal to, the bit resolution provided by ADC 12 for $u_K(iT_S)$. This ensures that the bit resolution of $\tilde{u}_{INT}(iT_S)$ is comparable to that of $u_K(iT_S)$. More specifically, the number $L_2$ of quantization levels provided in each of reference signals $\cos[\omega_{INT}iT_S]$ and $\sin[\omega_{INT}iT_S]$ is generally related to the number M of quantization levels used by ADC 12 to generate $u_K(iT_S)$. $L_2$ is always at least 2, and is generally in the range of M/16 to 16*M, more preferably in the range of M/2 to 2*M. The number $L_2$ of quantization levels is generally equal to $2^R$ where R is the number of bits used in representing each of $\cos[\omega_{INT}iT_S]$ and $\sin[\omega_{INT}iT_S]$. In the case where M is between 255 and 1024 (corresponding to 8–10 bits on ADC 12), the quadrature reference signals $\cos[\omega_{INT}iT_S]$ and $\sin[\omega_{INT}iT_S]$ preferably have $L_2$ between 255 and 1024 (corresponding to a bit resolution which is between 8 and 10 bits.)

In preferred constructed embodiments of the present invention, $u_K(iT_S)$ has a bit resolution of 8 bits and a numerical range of $-2^7$ to $+2^7$, each of quadrature signals $\cos[\omega_{INT}iT_S]$ and $\sin[\omega_{INT}iT_S]$ have a bit resolution of 7 bits and a numerical range of $-2^6$ to $+2^6$ (that is the amplitude of the digital reference signal equals $2^6$), and each of control signals $U_C(iT_S)$ and $U_S(iT_S)$ have a bit resolution of 9 bits and a range of $-2^8$ to $+2^8$. The multiplication product of each multiplier 420 in this case has a bit resolution of 15 bits and range $-2^{14}$ to $+2^{14}$. The six (6) least significant bits of the multiplier outputs are discarded (or not computed) to effect a division by $2^6$, which leaves these signals with 9 bits of resolution and a range of $-2^8$ to $+2^8$. The outputs of multipliers 420 are added by summator 422. Summator 422 can have the same bit resolution and range as multipliers 420 (instead of having one more bit of resolution). This is because the outputs of multipliers 420 are derived from the processing of orthogonal components $C_D$ and $S_D$, they are orthogonal and do not attain their maximum values at the same time. Moreover, one output is at near zero when the other output is at its maximum. Accordingly, $\tilde{u}_{INT}(iT_S)$ from the output of summator 422 thereby has a bit resolution of 9 bits and a numerical range of $-2^8$ to $+2^8$. The numerical range for $\tilde{u}_{INT}(iT_S)$ is one factor of 2 larger than the range for $u_K(iT_S)$, which enables the feedback signal $\tilde{u}_{INT}(iT_S)$ to move above $u_K(iT_S)$ so that a negative difference signal $u_D(iT_S)$ can be generated, when such is needed to provide appropriate negative feedback. (This same effect can be achieved with a lower bit resolution for $\tilde{u}_{INT}(iT_S)$ if the bits of $\tilde{u}_{INT}(iT_S)$ are left-shifted by one or more times before being subtracted from $u_K(iT_S)$).

It takes a finite amount of time for the signals to propagate through the signal-processing components 404 through 422 since it takes a finite amount of time for these components to perform their corresponding processing steps. The propagation time is less than one clock cycle of $F_S$ (period $T_S$). Accordingly, one purpose of gating circuit 424 is to hold the current value of $\tilde{u}_{INT}$ for subtractor 404 while the next value of $\tilde{u}_{INT}$ is being generated. Another purpose of gating circuit 424 is to quantize the propagation delay through components 404–422 to one clock period $T_S$. In some implementations, and in the preferred implementations, all of components 404–424 may be implemented by a digital-signal processor running under the direction of a control program (e.g., software or firmware) which emulates the processing steps provided by components 404–424. In this case, each of the components 404–424 may be implemented by a respective block of code which performs the respective processing steps, and each signal ($u_K$, $\tilde{u}_{INT}$, $u_D$, $C_D$, $S_D$, $U_C$, $U_S$), each gain factor ($K_1$, $K_2$), and each accumulation total ($\Sigma_1$, $\Sigma_2$) may by kept in a respective memory register. Upon receiving an indication that ADC 12 had updated the value of $u_K$ with the current value, the processor executes the code block for component 404 using the current value of $\tilde{u}_{INT}$. The processor then executes the code blocks for the following components in the following sequential order: 408, 406a and 406b, 410a and 410b, 420a and 420b, and 422. The function of gating circuit 424 is implemented by the processor storing the result of component 422 into the memory register for $\tilde{u}_{INT}$ after the code for component 404 has been executed, and by the processor waiting for the next indication that ADC 12 has an updated value of $u_K$ before repeating the processing steps of the code blocks.

In preferred implementations of compensator 400, dual-output quadrature NCO 408 accounts for the one $T_S$ period propagation delay through components 404–424 in the following manner. NCO 408 generates Cosine and Sine components to the inverse quadrature converter (multipliers 420) which are one $T_S$ period ahead of the Cosine and Sine components it provides to the direct quadrature converter (multipliers 406). This has the effect of generating a version of $\tilde{u}_{INT}$ which is advanced in time by one $T_S$ period, which then compensates for the one $T_S$ period of delay set by gating circuit 424. The advancement of the phase in time by one $T_S$ period can be readily measured by the time difference between zero crossings in the two sine (or cosine) signals, or between corresponding points in the waveforms. The advancement is less than one-half period of the NCO signal frequency (corresponding to $\pi$ phase radians). An exemplary implementation of NCO 408 is described in greater detail below with reference to FIG. 7-1.

Of course, the delay for the signals to propagate through the components 404 through 422 may be longer than the clocking period $T_S$, in which case the time difference between the two quadrature outputs of NCO 408 would be set to the next higher integer amount of $T_S$, such as $2T_S$ or $3T_S$. In such a case, additional gating circuits, such as circuit 424, would be incorporated into the propagation path at the appropriate points. As an example, gating circuits may be placed on signals $C_D$ and $S_D$ between multipliers 406 and filters 410, and on signals $U_C$ and $U_S$ between filters 410 and multipliers 420, and the time difference between the two quadrature outputs of NCO 408 would be $3T_S$. This 3-stage topology may be used to advantage in a wholly digital circuit implementation, or in a wholly DSP processor implementation, or in an implementation which combines both approaches. The 3-stage topology would enable a digital circuit implementation to operate at higher sampling frequencies, thereby enabling interference suppression over a wider frequency band of the useful signal. Or it may enable a digital circuit implementation to be constructed with slower digital components. The 3-stage topology would enable a wholly DSP processor implementation to use multiple processors, such as one for each stage of computation, thereby enabling suppression over a wider frequency band, or enabling the same amount of suppression with slower and less expensive DSP processors. The amount of delay that can be tolerated through components 404–422 is limited by the bandwidth of the interference signal, not the sampling frequency $F_S$. As the interference bandwidth decreases, more delay may be tolerated. The sampling frequency is generally 50 times the bandwidth (or more) of the interference signal. Therefore, multi-stage delays of $2T_S$ to $5T_S$ are readily tolerated.

As indicated above, $\hat{u}_{INT}(iT_S)$ is used by subtractor 404 to form $u_D(t)$, thereby creating a negative feedback adjustment loop. The open-loop signal gain of the feedback loop is defined as $G_T(p)$, and is equal to the filter transfer function $K_F(p)$ times the transfer functions for the frequency-shift converters, and any gain (or attenuation) blocks that are inserted in the feedback loop (such gain blocks may be inserted at any point in the feedback loop). The additional gain (or attenuation) blocks are rarely used separately since it is more convenient and cost-effective to incorporate their scaling function into the operation of frequency-shift converters. Over the bandwidth of interest, each of the transfer functions of the converters may be approximated by a constant gain (or attenuation) factor, such as $\beta_1$ and $\beta_2$, respectfully. The gain (or attenuation) blocks, if present, may be approximated by respective constant gain (or attenuation) factors $\beta_{A1}, \beta_{A2}, \ldots, \beta_{AN}$. The total transfer function $\beta_T$ of these components may be represented as $\beta_T = \beta_1 \cdot \beta_2$ if there are no additional gain (or attenuation) blocks; or as $\beta_T = \beta_1 \cdot \beta_2 \cdot (\beta_{A1} \cdot \beta_{A2} \cdot \ldots \cdot \beta_{AN})$ if the additional blocks are present. Accordingly, $G_T(p) = \beta_T \cdot K_F(p)$. If the frequency spectrum of the interference signal is represented by $S_I(\hat{\omega})$, where $\hat{\omega} = \omega/\omega_S$, then the magnitude of the interference signal in the output is reduced by the amount:

Output Interference Spectrum = $K_T(\hat{\omega} - \hat{\omega}_{INT}) \cdot S_I(\hat{\omega})$, where $$\hat{\omega} = \frac{\omega_{INT}}{\omega_S}, \text{ and where}$$

$$K_T(\hat{\omega}) = \left|\frac{1}{1 + G_T(p)}\right|, \text{ where } p = j2\pi\hat{\omega}$$

By the adjustment method described above using estimator 20, the constants $K_1$ and $K_2$ are automatically adjusted to provide $G_T(p) \gg 1$ over the bandwidth of the interference signal. Accordingly, suppression of the interference signal is achieved. The gain (or attenuation) factors $\beta_1$ and $\beta_2$ may be measured by applying a test signal to the signal input of each converter (not the reference signal input), measuring the polar magnitudes of the input and output signals, and then determining the factor as the ratio of the output magnitude to the input magnitude. Polar magnitudes are used here since at least one of the signals will be in quadrature format $(C+j*S)$, in which case the polar magnitude is defined as $M = \sqrt{C^2 + S^2}$. In this embodiment, the factor $\beta_1$ represent the amplification gain (or attenuation) between the different signal and the quadrature components of the difference signal, and the factor $\beta_2$ represent the amplification gain (or attenuation) between the filtered quadrature components and the interference copy signal. Each $\beta$ may be less than 1 (attenuation) or equal to 1 or greater than 1 (gain).

FIG. 18 shows the rejection band response H(f) of suppressor 400 under laboratory test conditions, which is equivalent to $K_T(f)$. Other suppressor embodiments of the present invention have substantially identical rejection bands. Under the test conditions, a sinusoidal input signal $V_0 \cdot \sin(\omega t)$ of constant and known magnitude $V_0$ is applied to the input of the suppressor and the resulting output is measured. The frequency of the input sinusoid is scanned across the frequency range of interest and H(f) is determined as the ratio of the signal magnitude of the suppressor's output $|u_D(t)|$ to $V_0$: $H(f) = |u_D(t)|/V_0$. For a significant portion of H(f) at either side of the estimated interference frequency $f_{INT}$, the magnitude of the output is the same as $V_0$, and H(f) has a value of 0 dB (i.e., no attenuation). There is a rejection notch centered around $f_{INT}$, which in theory can be infinitely deep but which in practice has a finite depth due to the effects of noise in the system. The rejection bandwidth may be defined as the distance between the −3 dB points on either side of the notch, and is referred to herein as $\Delta_{SUP,-3\,dB}$. As the value of $K_1$ in filters 410 is decreased in value, the rejection band $\Delta_{SUP,-3\,dB}$ narrows; and the value of $K_1$ in filters 410 is increased in value, the rejection band $\Delta_{SUP,-3\,dB}$ expands. To measure H(f), $V_0$ is set at a level above the noise level, and the scan rate $V_\omega$ of the input test frequency is kept below a value of $2\pi(\Delta_{SUP,-3\,dB})^2$, as measured in radian per second ($V_\omega \ll 2\pi(\Delta_{SUP,-3\,dB})^2$).

The location of the true mean interference frequency $f_{INT,T}$ is shown in FIG. 18 as being a distance δ away from the estimated mean interference frequency $f_{INT}$. In preferred suppressor embodiments of the present invention, including those described below, the difference δ between the true mean interference frequency $f_{INT,T}$ and the estimated value $f_{INT}$ is not more than one-half the value of the rejection bandwidth $\Delta_{SUP,-3\,dB}$. As indicated above, the reference signals used in the suppressors have frequency magnitudes equal to $f_{INT}$. Of course, the rejection bandwidth $\Delta_{SUP,-3\,dB}$ and the estimated and true mean interference frequencies may be given in radian values (which is a simple scaling by $2\pi$).

As indicated above, the response characteristic $K_F(p)$ of each filter 410 is varied by changing the gain factor $K_1$ and by adjusting $K_2$ such that the following ratio of the gain factors is kept constant: $(K_1)^2/K_2 = \alpha = \text{constant}$. The constant α is preferably in a range of between approximately $0.5/\beta_T$ and approximately $16/\beta_T$, and more preferably in a range of between approximately $1/\beta_T$ and approximately $4/\beta_T$, where $\beta_T$ is the total transfer function of the frequency converters as previously described ($\beta_T = \beta_1 \cdot \beta_2$ or $\beta_T = \beta_1 \cdot \beta_2 \cdot (\beta_{A1} \cdot \beta_{A2} \cdot \ldots \cdot \beta_{AN})$). This may be stated in the equivalent form that the quantity $R = \beta_T \cdot (K_1)^2/K_2$ is preferably in the range of approximately 0.5 to approximately 16, and more preferably in the range of approximately 1 to approximately 4. In some embodiments, $\beta_T$ is near or at a value of 1, so that the quantity α may be in the above state ranges for these embodiments.

Although each of the above components of compensator 400 has been implemented in digital form, the circuit may be implemented with analog equivalents.

FIG. 7-1 shows an exemplary embodiment of dual-output quadrature NCO 408, which is described herein. Many constructions of numerically controlled oscillators are well known, many of which may be used with the present invention. The heart of the NCO are two memories which are stored with a digital representation of one period of a Sine wave and one period of a Cosine wave, respectively. In the exemplary embodiment shown in FIG. 7-1, two sets of Cosine/Sine memories are used to provide a generalized manner of generating the two quadrature reference signals which have different number of quantization levels $L_1$ and $L_2$. The first set of memories is used in generating the first quadrature reference signal ($\cos[\Omega(i-1)T_S]$, $\sin[\Omega(i-1)T_S]$) at a first number of quantization levels $L_1$, and the second set of memories is used in generating the second quadrature reference signal ($\cos[\Omega iT_S]$, $\sin[\Omega iT_S]$) at a second number of quantization levels $L_2$. In FIG. 7-1, the outputs of the first reference signal are designated as 1c and 1s, and the outputs of the second reference signal are designated as 2c and 2s. The variable "$\Omega$" has been used to designate the output frequency of the NCO. During operation in the suppressors according to the invention, the frequency "$\Omega$" will be set to the estimated mean frequency, either in the direct level $\omega_{INT}$ or the down-converted level $\Omega_{INT}$, depending upon the suppressor embodiment.

The number of quantization levels is implemented by selecting the number of data bits b each address location holds, with the number of quantization levels L being equal to $2^b$, which is the maximum amount of distinct digital number that can be represented by b bits. As an optional step, the number of quantization levels L may be reduced from the amount $2^b$ by restricting the values that the address locations may hold to a subset of the possible digital numbers.

Each set of two memories preferably has $2^r$ address locations which are addressed, or selected, by r address bits. The r address bits are generated by a phase accumulator, and are provided on an address bus, as is well known in the art. As an example, each of the memories may have $2,048=2^{11}$ addresses, and eleven (11) address bits. For the Sine memory, the contents of the array addresses may be set as follows: Contents of the $m^{th}$ address=$\sin(2\pi \cdot m/2^r)$ for m=0 to ($2^r-1$). In a similar manner, the contents of the Cosine memory addresses may be set as follows: Contents of the $m^{th}$ address=$\cos(2\pi \cdot m/2^r)$ for m=0 to ($2^r-1$). In the particular embodiment shown in FIG. 7-1, the bottom set of memories uses $r_1$ address bits, which are taken as the $r_1$ highest address bits produced by the phase accumulator. Similarly, the top set of memories uses $r_2$ address bits, which are taken as the $r_2$ highest address bits produced by the phase accumulator. The phase accumulator provides n address bits, with $n \geq r_1$ and $n \geq r_2$. Typically, n is two to four more than the largest of $r_1$ and $r_2$ (i.e., n=r+2 through n=r+4). Using a value of n which is greater than $r_1$ (or $r_2$) enables the NCO to achieve greater frequency resolution for a given number of address locations in the waveform memories. The values of $r_1$ and $r_2$ do not affect the quantization levels $L_1$ and $L_2$ of the reference signals, but rather the timing resolutions of the signals.

At the beginning of operation, the contents of the phase accumulator is set to any initial value. Since the PLL loop adjusts to the lock point as part of its operation, the initial phase setting of the NCO, as set by the initial contents of the phase accumulator, is not critical for the suppressor embodiments or the estimator embodiments of the present invention. Next, during each clock period of clock $F_S$, the phase accumulator increments the value of its n-bit address bus by a predetermined amount, as provided by main controller 15, to provide the selected program frequency of the NCO. The phase accumulator comprises a D-type register latch which is n-bits wide. The n-bit latch is incremented by a number k, which is provided by main controller 15. The number k is referred to as the frequency number, and it may range between 1 and $2^{n-1}$. With this incrementing, the output of each Sine memory and each Cosine memory generates a signal which has a frequency determined by k as follows: $F_{NCO}=k \cdot F_S/(2^n)$. The incrementing of the address bus may be accomplished by the latch and summator of the phase accumulator shown in FIG. 7-1. With each $F_S$ clock period, the value of the latch is updated by the sum of its current value plus k, which is held in a memory register. The latch only maintains the lowest n significant bits of the accumulation. When the latch is incremented past an address value of ($2^n-1$), the latch and summator overflow and effectively subtracts $2^n$ from the contents of the latch. For example, suppose the latch is at ($2^n-8$) and k=50, then the next increment sets the value of the latch to [($2^n-8$)+50$-2^n$]=42, which sets the incrementing back to near the beginning of the memory array to repeat another cycle of the sinusoid wave, presuming that k is small compared to $2^n$. (If k is close to its maximum of value of $2^{n-1}$, then the latch would be set to a value which is in the lower half of the memory array).

The inverter of the phase accumulator causes the accumulator latch to be clocked one-half period of $T_S$ before the Sine and Cosine memories are clocked, thereby ensuring stable address inputs to the memories and preventing data glitches. The phase delay in the delayed quadrature reference signal ($\cos[\Omega(i-1)T_S]$, $\sin[\Omega(i-1)T_S]$) may be generated by two D-type register latches which have their inputs coupled to the respective outputs of the first set of memories (with the number of quantization levels $L_1$). These latches are clocked at the same time as the Sine and Cosine memories are clocked, and thereby lock in the present values of these memories just before the memories are updated with new values.

Various modifications to the structure of the NCO shown in FIG. 7-1 may be made. If the number of quantization levels $L_1$ and $L_2$ are the same, then one set of waveform memories may be used instead of two sets. As another modification, if the quadrature signals $\cos[\Omega(i-1)T_S]$ and $\sin[\Omega(i-1)T_S]$ are to have lower resolutions than the quadrature signals $\cos[\Omega iT_S]$ and $\sin[\Omega iT_S]$ by an integer factor of 2, then the output latches may be coupled to the most significant bits of the memories (including the sign information) of the second set of memories, and the first set of memories may be omitted. As yet a further modification, the frequency number k may be subtracted from the accumulator latch instead of being added. This action generates quadrature reference signals which have a negative frequency. When the accumulator latch is decremented to a value below zero, it underflows and sets the address value near the upper end of the address space of the memories. The negative frequencies may be used in some embodiments of the present invention, which are described below. Of course, a quadrature signal having a negative frequency can be readily converted to a positive frequency by inverting the sign of its Sine component.

The numerically controlled oscillator may be readily implemented with a microprocessor or digital signal processor under the direction of a control program. In this implementation, the Sine and Cosine memories are implemented as data tables in the code, and the following exemplary program instructions could be used, along with the following six memory registers: Address, k, Present_Sine, Present_Cosine, Past_Sine, and Past_Cosine:

1. Set Address=0; receive value for k; set Present_Sine= 0, and Present_Cosine=1.

2. Wait for $F_S$ transition (can be provided by interrupt signal or countdown timer).
3. Set Past_Sine=Current_Sine; and Past_Cosine=Present_Cosine.
4. If Address<($2^n$-k), then set Address to a value which is equal to the current value of Address plus k; otherwise set Address to a value which is equal to the current value of Address minus $2^n$ plus k.
5. Use the newly computed Address value to select the corresponding contents of the Sine and Cosine memories and set the registers Present_Sine and Present_Cosine to these selected contents. If r is less than n, then the r more significant bits of Address are used.
6. At this point, $\sin[\Omega i T_S]$ is provided by Present_Sine, $\cos[\Omega i T_S]$ is provided by Present_Cosine, $\sin[\Omega(i-1)T_S]$ is provided by Past$_1$_Sine, and $\cos[\Omega(i-1)T_S]$ is provided by Past_Cosine.
7. Return to step #2.

In this example, the number of quantization levels $L_1$ and $L_2$ are the same value since the past Sine and Cosine registers are updated with the full values of the present Sine and Cosine registers, respectively. However, the past Sine and Cosine registers may be updated with truncated values of the present Sine and Cosine registers, respectively, to provide a level $L_2$ which is less than $L_1$. Also in this example, the number of effective address locations $r_1$ and $r_2$ are the same (r). If different values of $r_1$ and $r_2$ are desired, then the above process can be augmented to include a second set of waveform memories and additional registers.

The dual-output quadrature NCO shown by FIG. 7-1 may also be used to implement the quadrature NCO 23 of estimator 20 (FIG. 2). In this case, the first set of memories (at quantization level $L_1$) and the two output latches providing the first quadrature reference signal (1c, 1s) would not be needed.

As another implementation of NCO 408, the two output latches which provide the first quadrature reference signal ($\cos[\Omega(i-1)T_S]$ and $\sin[\Omega(i-1)T_S]$) may be omitted and the first set of Cosine and Sine waveform memories (at $L_1$ quantization) may be addressed by a delayed version of the address from the phase accumulator. This delayed address may be retained in a latch which has its input coupled to output of the phase accumulator, and its outputs coupled to the inputs of the first set of memories; this latch would be clocked by the inverter of the phase accumulator. This implementation may be advantageous where quadrature signals $\cos[\Omega(i-1)T_S]$ and $\sin[\Omega(i-1)T_S]$ are implemented in low-bit resolution (e.g., 1-bit or 2-bit resolution).

In preferred embodiments of the NCOs shown in FIGS. 7-1 and 7-2, the sine and cosine values in the waveform memories are selected to provide quantized signals which have a very high level of power in the first harmonic (i.e., the fundamental) in comparison to the power in the remaining harmonics. Oftentimes, the highest possible power in the first harmonic is desirable. For a given number of address bits r, the contents of the waveform memories may be set to the values provided below to provide signals with a high level of power in the first harmonic:

Contents of the $m^{th}$ address of the Sine Memory=ROUND$\{[(2^{r-1}-1.5)/\pi]*\sin(2\pi m/2^r)\}$, and Contents of the $m^{th}$ address of the Cosine Memory=ROUND$\{[(2^{r-1}-1.5)/\pi]*\cos(2\pi m/2^r)\}$, where the function ROUND $\{*\}$ is the rounding function to the nearest integer. In this case, the number of quantization levels L increases with the value of r due to the term $2^{r-1}$ in the factor $[(2^{r-1}-1.5)/\pi]$. For the example of r=4, the above forms provide L=5 quantization levels $\{-2, -1, 0, 1, 2\}$ in the memories, with each memory having 16 addresses. The contents of the memories for r=4 is provided by TABLE I.

TABLE I

| Address | Contents of Sine Mem. | Contents of Cosine Mem. |
|---|---|---|
| 0 | 0 | 2 |
| 1 | 1 | 2 |
| 2 | 1 | 1 |
| 3 | 2 | 1 |
| 4 | 2 | 0 |
| 5 | 2 | −1 |
| 6 | 1 | −1 |
| 7 | 1 | −2 |
| 8 | 0 | −2 |
| 9 | −1 | −2 |
| 10 | −1 | −1 |
| 11 | −2 | −1 |
| 12 | −2 | 0 |
| 13 | −2 | 1 |
| 14 | −1 | 1 |
| 15 | −1 | 2 |

A second implementation of compensator 40 is shown at 500 in FIG. 8. Compensator 500 is implemented with both analog and digital circuits, and with the difference signal $u_D(t)$ and the interference copy $\tilde{u}_{INT}(t)$ being in analog form. The general flow of signal processing steps of compensator 500 follows that of compensator 400: frequency-shift and quadrature conversion to quadrature components, followed by filtering, followed by inverse quadrature conversion, and then feeding back the processed signal. The input signal $u_R(t)$ from the intermediate frequency amplifier of the receiver is provided to the positive input of an analog subtractor 502, and the interference copy $\tilde{u}_{INT}(t)$ is provided to the negative input of subtractor 502. Analog subtracting device 502 performs the step of subtracting these signals to generate the difference signal $u_D(t)$ at its output.

The difference signal $u_D(t)$ is provided to an analog-to-digital converter (ADC) 505 which performs the step of generating a quantized version of the difference signal having a plurality M of quantization levels. The number of quantization levels M of a typical ADC is generally related to the bit resolution R of the ADC as follows: M=$2^R$ or M=($2^R$−1). ADC 505 has at least one bit of resolution (i.e., at least two quantization levels), and which preferably has between 8 to 10 bits of resolution (i.e., between 255 and 1024 quantization levels). In typical embodiments, ADC 505 has at least 6 bits of resolution (i.e., at least 63 quantization levels). ADC 505 is clocked at a periodic rate of $F_S$ (period of $T_S$) by the $F_S(T_S)$ clock. From ADC 505, the digitized signal is processed in similar fashion as done in FIG. 4, including the steps of frequency-shift/quadrature conversion and the step of inverse quadrature conversion using the mean interference frequency ($\omega_{INT}$) as the reference signal, and including the step of dynamic filtering as controlled by controller 15. Components 406a, 406b, 408, 410a, 410b, 416, 417, 420a, 420b, and 422 of compensator 500 are the same as those employed by compensator 400 shown in FIG. 4, are configured in the same matter, and perform the same steps. From summator 422, the digital form of the interference copy is provided to a digital-analog converter (DAC) 530, which performs the step of generating an analog form of the interference copy. The analog form is fed back to subtractor 502 to be used in forming the difference signal.

The number of quantization levels N of a typical DAC is generally related to the bit resolution R of the DAC as follows: $N=2^R$ or $N=(2^R-1)$. 8 to 10 bits of resolution can therefore provide between 255 and 1024 quantization levels. The number N of quantization levels used by DAC 530 is generally related to the number M of quantization levels used by ADC 505. N is always at least 2, and is generally in the range of M/16 to 16*M, and preferably in the range of M/2 to 2*M, and more preferably in the range of M to 2*M. In the case where M is between 255 and 1024 (corresponding to 8–10 bits on ADC 505), N is preferably between 255 and 1024. To enable the feedback loop to operate in the positive and negative directions, the maximum output voltage of DAC 530 is scaled to be larger than the maximum voltage of $u_K(t)$ (so that subtractor 502 may generate positive and negative outputs). The scaling may be readily accomplished by adjustment of the reference voltage of DAC 530, as is well known in the art.

The number $L_1$ of quantization levels provided in each of reference signals $\cos[\omega_{INT}(i-1)T_S]$ and $\sin[\omega_{INT}(i-1)T_S]$ is generally related to the number M of quantization levels used by ADC 505 to generate $u_D(iT_S)$. $L_1$ is always at least 2, and is generally in the range of M/16 to 16*M. The number $L_1$ of quantization levels is generally equal to $2^R$ where R is the number of bits used in representing each of $\cos[\omega_{INT}(i-1)T_S]$ and $\sin[\omega_{INT}(i-1)T_S]$.

The number $L_2$ of quantization levels provided in each of reference signals $\cos[\omega_{INT}iT_S]$ and $\sin[\omega_{INT}iT_S]$ is also generally related to the number M of quantization levels. $L_2$ is always at least 2, and is generally in the range of M/16 to 16*M, more preferably in the range of M/2 to 2*M. The number $L_2$ of quantization levels is generally equal to $2^R$ where R is the number of bits used in representing each of $\cos[\omega_{INT}iT_S]$ and $\sin[\omega_{INT}iT_S]$. In the case where M is between 255 and 1024 (corresponding to 8–10 bits on ADC 505), the quadrature reference signals $\cos[\omega_{INT}iT_S]$ and $\sin[\omega_{INT}iT_S]$ preferably have $L_2$ between 255 and 1024 (corresponding to a bit resolution which is between 8 and 10 bits.)

As is conventional in the art, the digital input of DAC 530 is first clocked into an internal latch before being used to generate the analog output. The digital input is clocked into DAC 530 after summator 422 has received updated values from multipliers 420 and after it has finished its addition operation. A delay unit 418, which is driven by the output of the second delay unit 417 provides the clocking signal to DAC 530 and the delay provided by unit 418 accounts for the signal delay through multipliers 420 and summator 422.

In some implementations, and in the preferred implementations of compensator 500, components 505 and 406–422 are implemented by a digital-signal processor running under the direction of a control program (e.g., software or firmware) which emulates the processing steps provided by these components. In these cases, the digital-signal processor provides the output of summator 422 to DAC 530 and then generates a clocking signal to DAC 530, which causes DAC 530 to latch in the digital data and generate the corresponding analog value. Delay unit 418 may be implemented by ordering the program code such that the code which implements the steps of components 505 and 406–422 is executed before the digital signal processor is instructed to provide the output of summator 422 to DAC 530.

In other embodiments of compensator 500, an analog sample-and-hold (S/H) circuit may be added to the output of DAC 530, and the internal input latch for the digital data may be omitted. In this case, the output of summator 422 directly drives the digital-to-analog conversion process. The sample-and-hold may be gated by the $F_S$ clock signal, or a delayed version of it. If both DAC 530 and ADC 505 are directly clocked by the $F_S$ clock signal, there will be a $2T_S$ delay through the feedback loop: one $T_S$ delay due to the signal propagation through components 530 and 502, and a second $T_S$ delay due to the signal propagation through components 505 and 406–422. (The propagation delay represents the time it takes for these components to perform their corresponding processing steps.) However, the $2T_S$ delay is easily accommodated by changing the phase separation between the quadrature outputs of NCO 408 to $2T_S$. As another approach, DAC 530 may be clocked by the $F_S$ clock signal and ADC 505 may be clocked by a slightly-delayed version of the $F_S$ clock signal, with the slight delay accounting for the delay through component 502.

A third implementation of compensator 40 is shown at 600 in FIG. 9. In this implementation, the input signal $u_K(t)$, which may be at an intermediate frequency, is direct-quadrature converted to baseband level by an independent heterodyne frequency $(\omega_H)$ by a corresponding processing step, and is presented in the form of two quadrature signal components $U_{K,C}(t)$ and $U_{K,S}(t)$, with $U_K(t)=U_{K,C}(t)+j \cdot U_{K,S}(t)$. Two feedback adjustment loops are formed, with each feedback loop using one of the quadrature components $U_{K,C}(t)$ and $U_{K,S}(t)$ as an input and generating one of the quadrature components of the interference copy. The quadrature components of the interference copy are designated as $U_{INT,C}(t)$ and $U_{INT,S}(t)$ in this embodiment, with $U_{INT}(t)=U_{INT,C}(t)+j \cdot U_{INT,S}(t)$. Each feedback adjustment loop includes the step of dynamic filtering, as in the previous implementations. It will become apparent to the reader that the construction of each feedback loop in compensator 600 shares similar features with the feedback loop of compensator 500 (FIG. 8).

Turning to the details of FIG. 9, the input signal $u_K(t)$, which may be the high-frequency signal as received by the antenna (and amplified) or may be an intermediate frequency version thereof, is provided to a conventional direct quadrature converter formed by a quadrature-phase local oscillator 601, two multipliers 602 and 603, and two low-pass filters 604 and 605. The operation of a conventional quadrature converter was previously described above with reference to FIG. 1A. Local oscillator 601 provides the quadrature sinusoids $\cos(\omega_H t)$ and $\pm \sin(\omega_H t)$, in accordance with the description of the direct quadrature converter shown in FIG. 1A. FIG. 9 shows the use of the quadrature sinusoids $\cos(\omega_H t)$ and $-\sin(\omega_H t)$, but the pair $\cos(\omega_H t)$ and $+\sin(\omega_H t)$ may be used. As a result of the conversion, the first quadrature component $U_{K,C}(t)$ is generated at the output of low-pass filter 604 and second quadrature component $U_{K,S}(t)$ is generated at the output of low-pass filter 605, with both of the quadrature components being at baseband.

The quadrature components $U_{K,C}(t)$ and $U_{K,S}(t)$ are provided to respective subtractors 606 and 607, respectively. Subtractors 606 and 607 perform the steps of subtracting the corresponding quadrature component of the interference copy, $U_{INT,C}(t)$ and $U_{INT,S}(t)$, from $U_{K,C}(t)$ and $U_{K,S}(t)$. As a result, a first difference signal $U_{D,C}(t)$ is generated at the output of subtractor 606, and a second difference signal $U_{D,S}(t)$ is generated at the output of subtractor 607, with $U_{D,C}(t)=U_{K,C}(t)-U_{INT,C}(t)$ and $U_{D,S}(t)=U_{K,S}(t)-U_{INT,S}(t)$. The first and second difference signals are the quadrature components of the difference signal $U_D(t)=U_K(t)-U_{INT}(t)$ (vector form), where $U_D(t)$ may be represented by quadrature components as follows: $U_D(t)=U_{D,C}(t)+j \cdot U_{D,S}(t)$.

From subtractors 606 and 607, difference components $U_{D,C}(t)$ and $U_{D,S}(t)$ are provided to respective analog-todigital converters (ADC) 505a and 505b, which perform the step of quantizing and digitizing the signals. The digitized difference components are provided as $U_{D,C}(iT_S)$ and $U_{D,S}(iT_S)$. Each of ADCs 505a and 505b has at least one bit of resolution (i.e., at least two quantization levels), and preferably has between 8 to 10 bits of resolution (i.e., between M=255 and M=1024 quantization levels). In typical embodiments, each has at least 6 bits of resolution (i.e., at least M=63 quantization levels).

Next, the digitized difference components $U_{D,C}(iT_S)$ and $U_{D,S}(iT_S)$ are frequency down-converted by the estimated mean interference frequency $\Omega_{INT}=\omega_{INT}-\omega_H$ to generate the quadrature components $C_D(iT_S)$ and $S_D(iT_S)$ of the difference signal $U_D(t)$ with respect to frequency $\Omega_{INT}$. This conversion frequency shifts the interference band to zero, so that the low-pass dynamic filters 410a and 410b may generate the control signals $U_S$ and $U_C$ from $C_D$ and $S_D$. This processing step of down-conversion is preferably performed by a conjugate-complex multiplier (CCM) 620, which receives the difference signals $U_{D,C}(iT_S)$ and $U_{D,S}(iT_S)$ at its first input (terminals $I_{1C}$ and $I_{1S}$, respectively), and which receives a quadrature reference signal having a frequency equal to the estimated mean interference frequency $\Omega_{INT}$ at its second input (terminals $I_{2C}$ and $I_{2S}$). The reference signal at the second input is digital and takes the form of:

$$\exp[j \cdot \Omega_{INT}(i-1)T_S] = \cos[\Omega_{INT}(i-1)T_S] + j \cdot \sin[\Omega_{INT}(i-1)T_S],$$

with $\cos[\Omega_{INT}(i-1)T_S]$ being provided to terminal $I_{2C}$ and $\sin[\Omega_{INT}(i-1)T_S]$ being provided to terminal $I_{2S}$. (As with previous compensator embodiments, the delay of one $T_S$ period in the parameter $(i-1)T_S$ is to account for the finite signal propagation delay through the signal-processing components of the feedback loop.) As described above with respect to FIG. 1B, a CCM multiplier frequency down-converts the quadrature signal at the first input (terminals $I_{1C}$ and $I_{1S}$) by an amount equal to the reference frequency provided at the second input (terminals $I_{2C}$ and $I_{2S}$), which in this case is at the estimated mean interference frequency $\Omega_{INT}$. As a result, quadrature component $C_D(iT_S)$ of the difference signal $U_D$ is produced at the $O_S$ output terminal of multiplier 620, and quadrature component $C_S(iT_S)$ of the difference signal $U_D$ is produced at the $O_C$ output terminal. The number $L_1$ of quantization levels provided in each of reference signals $\cos[\Omega_{INT}(i-1)T_S]$ and $\sin[\Omega_{INT}(i-1)T_S]$ is generally related to the number M of quantization levels used by ADCs 505 to generate $U_{D,C}(iT_S)$ and $U_{D,S}(iT_S)$. $L_1$ is always at least 2, and is generally in the range of M/16 to 16*M. The number $L_1$ of quantization levels is generally equal to $2^R$ where R is the number of bits used in representing each of $\cos[\Omega_{INT}(i-1)T_S]$ and $\sin[\Omega_{INT}(i-1)T_S]$.

The frequency down-conversion performed by CCM multiplier 620 may be performed by using a complex multiplier (CM) in place of CCM multiplier 620 in combination with providing a negative frequency reference signal, such as $\exp[-j \cdot \Omega_{INT}(i-1)T_S] = \cos[\Omega_{INT}(i-1)T_S] - j \cdot \sin[\Omega_{INT}(i-1)T_S]$, to the second input of the CM multiplier, with the Cosine components being provided to terminal $I_{2C}$ and Sine component being provided to terminal $I_{2S}$. The negative frequency reference can easily be generated by shifting the phase of the Sine component by 180° (a simple sign reversal).

The quadrature components $C_D(iT_S)$ and $S_D(iT_S)$ are provided to respective filters 410a and 410b, and are filtered in the same manner as in compensators 400 and 500. The same delay components 416, 417 and 418 are used for the same purposes as described in compensators 400 and 500. The filter parameters $K_1$ and $K_2$ may be provided to filters 410 by controller 15 in the same manner, and adjusted in the same manner. As a result of filtering, control signal $U_C(iT_S)$ is generated at the output of filter 410a, and control signal $U_S(iT_S)$ is generated at the output of filter 410b. As was the case in compensators 400 and 500, control signals $U_C$ and $U_S$ represent the quadrature components (or Cartesian components) of the interference copy $U_{INT}$ with respect to the mean interference frequency $\Omega_{INT}$.

From filters 410, the control signals $U_C(iT_S)$ and $U_S(iT_S)$ undergo the step of frequency up-conversion by the mean interference frequency $\Omega_{INT}$ to generate the quadrature components $U_{INT,C}(iT_S)$ and $U_{INT,S}(iT_S)$ of the interference copy $U_{INT}(iT_S)$. The up-conversion step is preferably performed with a complex multiplier (CM) 630, which receives the control signals $U_C(iT_S)$ and $U_S(iT_S)$ at its first input (terminals $I_{1C}$ and $I_{1S}$, respectively), and which receives a quadrature reference signal having a frequency equal to the estimated mean frequency $\Omega_{INT}$ at its second input (terminals $I_{2C}$ and $I_{2S}$). The reference signal at the second input is digital and takes the form of $\exp[j \cdot \Omega_{INT} iT_S] = \cos[\Omega_{INT} iT_S] + j \cdot \sin[\Omega_{INT} iT_S]$, with $\cos[\Omega_{INT} iT_S]$ being provided to terminal $I_{2C}$ and $\sin[\Omega_{INT} iT_S]$ being provided to terminal $I_{2S}$. As described above with respect to FIG. 1D, a CM multiplier frequency up-converts the quadrature signal at the first input (terminals $I_{1C}$ and $I_{1S}$) by an amount equal to the reference frequency provided at the second input (terminals $I_{2C}$ and $I_{2S}$), which in this case is at the estimated mean interference frequency $\Omega_{INT}$. As a result, the quadrature component $U_{INT,C}(iT_S)$ of the interference signal is produced at the $O_C$ output terminal of multiplier 630, and quadrature component $U_{INT,S}(iT_S)$ of the interference signal is produced at the $O_S$ output terminal.

The number $L_2$ of quantization levels provided in each of reference signals $\cos[\Omega_{INT} iT_S]$ and $\sin[\Omega_{INT} iT_S]$ is generally related to the number M of quantization levels used by ADCs 505 to generate $U_{D,C}(iT_S)$ and $U_{D,S}(iT_S)$. $L_2$ is always at least 2, and is generally in the range of M/16 to 16*M, more preferably in the range of M/2 to 2*M. The number $L_2$ of quantization levels is generally equal to $2^R$ where R is the number of bits used in representing each of $\cos[\Omega_{INT} iT_S]$ and $\sin[\Omega_{INT} iT_S]$. In the case where M is between 255 and 1024 (corresponding to 8–10 bits on ADCs 505), the quadrature reference signals $\cos[\Omega_{INT} iT_S]$ and $\sin[\Omega_{INT} iT_S]$ preferably have $L_2$ between 255 and 1024 (corresponding to a bit resolution which is between 8 and 10 bits.)

From CM multiplier 630, the quadrature components $U_{INT,C}(iT_S)$ and $U_{INT,S}(iT_S)$ of the interference copy are provided to respective DAC converters 530 and converted to corresponding analog forms: $U_{INT,C}(t)$ and $U_{INT,S}(t)$. The analog forms are then provided to subtractors 606 and 607 to complete the two negative feedback loops and generate $U_{D,C}(t)$ and $U_{D,S}(t)$. Thus, the steps of converting the components to analog form and feeding the signals back have been performed. To enable the feedback loop to operate in the positive and negative directions, the maximum output voltage of DAC 530 is scaled to be larger than the maximum voltage of $u_R(t)$ (so that subtractors 606 and 607 may generate positive and negative outputs). The scaling may be readily accomplished by adjustment of the reference voltage of DAC 530, as is well known in the art. The number N of quantization levels used by DAC 530 is generally related to the number M of quantization levels used by ADC 505. N is always at least 2, and is generally in the range of M/16 to 16*M, and preferably in the range of M/2 to 2*M, and more preferably in the range of M to 2*M. In the case where M is between 255 and 1024 (corresponding to 8–10 bits on ADCs 505), each DAC 530 preferably has a bit-resolution of between 8 and 10 bits.

Many satellite tracking channels 90 and estimators may be designed to directly use the difference signal in quadrature form (e.g., $U_{D,C}(t)$ and $U_{D,S}(t)$). Estimator 20 shown in FIG. 2 is designed to directly use the signals $U_{D,C}(t)$ and $U_{D,S}(t)$. In this case, the quadrature converter formed by multipliers 22a and 22b in FIG. 2 are replaced with a conjugate-complex multiplier (CCM), and the quantized versions of $U_{D,C}(t)$ and $U_{D,S}(t)$ at the outputs of ADCs 505a and 505b (FIG. 9) are fed to the first input of the CCM multiplier through switch 32, and the outputs of NCO 23 are fed to the second input of the CCM multiplier. (As another approach, the outputs of subtractors 606 and 607 may be provided to duplicate versions of ADC 13 (FIG. 2), and then on to switch 32.) These modification are readily accomplished in digital implementations and DSP implementations. The quadrature outputs of the CCM multiplier are then provided to accumulators 24a and 24b. In a similar manner, estimator 20 may use the down-converted quadrature signals $U_{K,C}(t)$ and $U_{K,S}(t)$ to analyze the frequency spectrum of the incoming input signal (before compensation) for interference signals. In this case, a conjugate-complex multiplier is also used in place of multipliers 22, and the quadrature signals $U_{K,C}(t)$ and $U_{K,S}(t)$ are fed to the first input of the CCM multiplier through switch 32, and the outputs of NCO 23 are fed to the second input of the CCM multiplier. Duplicate versions of ADC 11 shown in FIG. 2 may be used to digitize signals $U_{K,C}(t)$ and $U_{K,S}(t)$. Of course, a complex multiplier may be used in place of a conjugate-complex multiplier if the frequency of NCO 23 (FIG. 2) is reversed to a negative one by inverting the sign of the Sine component.

The frequency up-conversion step provided by CM multiplier 630 may be achieved by using a conjugate-complex multiplier (CCM) in place of CM multiplier 630 in combination with providing a negative frequency quadrature reference signal, such as $\exp[-j \cdot \Omega_{INT} i T_S] = \cos[\Omega_{INT} i T_S] - j \cdot \sin[\Omega_{INT} i T_S]$, to the second input of the CCM multiplier, with the Cosine components being provided to terminal $I_{2C}$ and Sine component being provided to terminal $I_{2S}$. The negative frequency reference can easily be generated by shifting the phase of the Sine component by 180° (a simple sign reversal). As indicated in Table II, there are four possible arrangements of the multipliers 620 and 630 and the complex frequencies of their references signals (the negative frequency value $-\Omega_{INT}$ represents the conjugate frequency of $\Omega_{INT}$).

TABLE II

| Arrangement Number | Type of Multiplier 620 | Reference frequency for Multiplier 620 | Type of Multiplier 630 | Reference frequency for Multiplier 630 |
|---|---|---|---|---|
| #1 | Conjugate-Complex | $\Omega_{INT}$ | Complex | $\Omega_{INT}$ |
| #2 | Complex | $-\Omega_{INT}$ | Complex | $\Omega_{INT}$ |
| #3 | Conjugate-Complex | $\Omega_{INT}$ | Conjugate-Complex | $-\Omega_{INT}$ |
| #4 | Complex | $-\Omega_{INT}$ | Conjugate-Complex | $-\Omega_{INT}$ |

Each of multipliers 620 and 630 may be implemented with digital circuits or by a DSP processor running under the direction of a control program. A complex multiplier may be implemented with the following code equations for the DSP processor:

$$O_C = I_{1C} \cdot I_{2C} - I_{1S} \cdot I_{2S}$$

$$O_S = I_{1C} \cdot I_{2S} + I_{1S} \cdot I_{2C}.$$

A conjugate-complex multiplier may be implemented with the following equations:

$$O_C = I_{1C} \cdot I_{2C} - I_{1S} \cdot (-I_{2S}) = I_{1C} \cdot I_{2C} + I_{1S} \cdot I_{2S}$$

$$O_S = I_{1C} \cdot (-I_{2S}) + I_{1S} \cdot I_{2C} = I_{1S} \cdot I_{2C} - I_{1C} \cdot I_{2S}.$$

A fourth embodiment of compensator 40 is shown at 600' in FIG. 10. Compensator 600' is similar to compensator 600 except that relative positions of ADC's 505 have been exchanged with the positions of subtractors 606 and 607, and that subtractors 606 and 607 are digital components instead of analog components, and that the interference copy signal is maintained in digital form. In the latter aspect, DACs 530 are no longer needed, and have been replaced by corresponding gating circuits 660 for the purposes of synchronizing the digital signals provided to subtractors 606 and 607. Such synchronization has been previously explained with respect to compensator 600 and other compensator embodiments. The advantage of Compensator 600' with respect to compensator 600 is that DAC 530 can be removed, which can be a source of noise. The components of Compensator 600' which are common to compensator 600 operate in the same manner, and have values chosen in the same manner.

For compensators 600 and 600', multiplier 620 has a gain (or attenuation) factor $\beta_1$ and multiplier 630 has a gain (or attenuation) $\beta_2$. These factors correspond to the gain factors of the frequency converters previously described, and may be used in the same way to select the ratio a of the filter parameters $K_1$ and $K_2$ of filters 410, as previously described. For each multiplier 620 and 630, regardless of type, the factor $\beta_X$ (X=1,2) may be measured by applying a test signal to the first input ($I_{1C}$, $I_{1S}$) of the multiplier while applying the reference signal to the second input ($I_{2C}$, $I_{2S}$), measuring the polar magnitudes of the first input signal and the output signal ($O_C$, $O_S$), and then determining the factor $\beta_X$ as the ratio of the output magnitude to the input magnitude, as described above. The factor $\beta_1$ represent the amplification gain (or attenuation) between the different signal and the quadrature components of the difference signal, and the factor $\beta_2$ represent the amplification gain (or attenuation) between the filtered quadrature components and the interference copy signal. Each $\beta$ may be less than 1 (attenuation) or equal to 1 or greater than 1 (gain). For compensator 600 (FIG. 9), the DACs 530 and ADCs 505 may provide addition gain (or attenuation) factors $\beta_{AN}$ to the feedback loop. It is convenient to determined the combined gain (or attenuation) of a pair of a DAC 530 and an ADC 505 because the input of the pair and the output of the pair are both in digital form. The gain may be readily determined by one of ordinary skill in the art (e.g., apply test signal to input of DAC 530a, set the output of component 604 to zero, measure output of ADC 505a).

As a common note to suppressors 400, 500, 600, and 600', the difference signals $u_D(iT_S)$, $u_D(t)$, $U_{D,C}(iT_S)$ and $U_{D,C}(iT_S)$ are preferably not filtered between the time that they are generated by their corresponding subtractors 404, 502, 606, and 607 and the time they are provided to multipliers 406 or 620. Such filtering is not needed in the present invention, and it can introduce unwanted phase delays in the signals. In the unfiltered state, each difference signal has a frequency spectrum which contains both the narrow band interference signal and the useful signal, which of course has a larger bandwidth than the interference signal. Additionally, the interference copy signal $u_{INT}(iT_S)$ is preferably not filtered between the time it is generated by summator 422 or multiplier 630 and the time that it is provided to subtractors 404, 502, 606, and 607.

A fifth embodiment of compensator 40 is shown at 700 in FIG. 11. Compensator 700 processes the interference signal in its polar coordinate representation, and is illustrated in FIG. 11 with a digital implementation. The digital implementation may be done wholly with digital circuits, wholly with a DSP processor running under the direction of a control program, or with a combination of both approaches (analog circuits, and a combination of analog and digital circuits is also possible.) A digital implementation is currently preferred as it enables the incorporation of components which provide enhanced suppression of the interference signal over a wide frequency range. As a brief summary of the operation of compensator 700, the phase coordinate of the interference signal is generated from the input signal with a phase-lock loop. The difference signal $u_D(iT_S)$ between the input signal and the interference copy is generated, and the magnitude coordinate of interference signal is generated from the difference signal and the phase coordinate by synchronous detection and filtering. The interference copy is then formed by multiplying the two polar coordinates (magnitude and phase) together.

Turning to the details, the input signal $u_K(t)$ from an intermediate frequency amplifier of the receiver is provided to the input of analog-to-digital (A/D) converter 12, which preferably has at least 8 to 10 bits of resolution. A/D converter 12 performs the step of quantizing and digitizing the input signal $u_K(t)$ to generated the digital samples $u_K(iT_S)$. A/D converter 12 is clocked by clock 703, which sets the sampling (digitizing) period to $T_S$ and the sampling (digitizing) frequency to $F_S$. This signal is provided to a phase-lock loop (PLL) system 710, which performs the step of generating the phase coordinate of the interference signal. PLL system 710 comprises a phase discriminator 712, a dynamic filter 714, and a quadrature NCO 716 which generates two orthogonal (quadrature) reference signals: $U_{PD,C}(\Phi_i)=\cos(\omega_{INT}iT_S+\phi_i)$ and $U_S(\Phi_i)=\sin(\omega_{INT}iT_S+\phi_i)$, where the mean frequency $\omega_{INT}$ and the instantaneous phase $\phi_i$ substantially correspond to the mean frequency and instantaneous phase, respectively, of the narrow-band interference signal. In locked operation of the PLL, $U_S(\Phi_i)$ follows the frequency and phase of the interference signal, and is used in the synchronous detection section. $U_{PD,C}(\Phi_i)$ is the quadrature component of $U_S(\Phi_i)$, and feed to discriminator 712 as the feedback signal of PLL 710. $U_{PD,C}(\Phi_i)$ and $U_S(\Phi_i)$ may have different numbers of quantization levels (i.e., different resolutions), and NCO 716 may optionally provide a sine signal $U_{PD,S}(\Phi_i)=\sin(\omega_{INT}iT_S+\phi_i)$ to discriminator 712, in addition to cosine signal $U_{PD,C}(\Phi_i)$, depending upon the implementation of discriminator 712. Because the use of $U_{PD,S}(\Phi_i)$ is optional, it is shown by a dashed line in FIG. 11. The feedback loop of the PLL may be either inverting or non-inverting. For the purposes of illustration, and without loss of generality, the non-inverting feedback loop is used to illustrate compensator 700.

NCO 716 may have the structure shown in FIG. 7-2, which is analogous to the structure of the NCO shown in FIG. 7-1, which may be used in suppressors 400, 500, 600, and 600'. Output 2s provides the signal $U_S(\Phi_i)$, output 1c provides the signal $U_{PD,C}(\Phi_i)$, and output 1s provides the optional signal $U_{PD,S}(\Phi_i)$. However, as one difference with the NCO shown in FIG. 7-1, output 2c is not needed for suppressor 700. As another difference, the NCO shown in FIG. 7-2 does not introduce a phase offset ($T_S$) in the first quadrature outputs 1c and 1s with respect to output 2s, (and does not have the corresponding output latches which generate the phase offset). Outputs 1c and 1s may have a different quantization-level resolution than output 2s.

Discriminator 712 generates an output signal which is a function of the phase difference between the input signal and the discriminator reference signal ($U_{PD,C}(\Phi_i)$, and optionally $U_{PD,S}(\Phi_i)$). Many ways of constructing phase discriminators are well known to the art, and virtually all may be used for discriminator 712. Exemplary constructions which may be used for discriminator 712 are shown in FIGS. 13–15, each of which has a multiplier which multiplies the input signal $U_K(iT_S)$ with the $U_{PD,C}(\Phi_i)$ signal of NCO 716, and an accumulator which accumulates the multiplication products. The discriminator shown in FIG. 15 has a second multiplier and second accumulator for processing the $U_{PD,S}(\Phi_i)$ signal in a similar manner. In each of the exemplary discriminators, each accumulator is preferably reset to zero after n accumulations of the multiplication products. The discriminator outputs are provided at a lower frequency than $F_S$ at a rate of $mT_S$ instead of $iT_S$ (m equals the integer value of (i/n)). The accumulators in FIGS. 13 and 14 may be omitted (n=1), in which case the output is provided at a rate of: $iT_S$ ($F_S$). As an advantage over the discriminator shown in FIG. 13, the discriminators of FIGS. 14–15 have outputs which do not depend upon the input signal strength. As an advantage over the discriminator shown in FIG. 14, the discriminators of FIGS. 13 and 15 are more resistant to losing PLL lock in the presence of two or more strong interference signals. The discriminator shown in FIG. 14 is the simplest since it multiplies the $U_{PD,C}(\Phi_i)$ reference signal by only the sign of the input signal rather than a multi-level representation of the input signal. The discriminator shown in FIG. 15 provides the best performance, but is more complex and uses both the cosine reference signal $U_{PD,C}(\Phi_i)$ from NCO output 1c and the sine reference signal $U_{PD,S}(\Phi_i)$ from NCO output 1s. The discriminator shown in FIG. 13 represents a balance between performance and complexity. The number of quantization levels $L_1$ for reference signals $U_{PD,C}(\Phi_i)$ and $U_{PD,S}(\Phi_i)$ may be equal to $L_1=2$ or greater. Suppressor performance increases with increasing values of $L_1$. The choice of which discriminator to use is largely based upon the quality and cost of the suppressor that one wishes to build, and the choice is not essential to practicing the present invention.

The output of discriminator 712 is filtered by dynamic filter 714, which preferably has the structure shown in FIG. 12. This construction is identical to the construction of filter 410 (FIG. 4) previously described above except that it does not have the last accumulator 414 ($\Sigma_1$). The latter accumulation is effectively provided in compensator 700 by the phase accumulator of NCO 716 (see FIG. 7-2). The filter characteristics of filter 714 are set by controller 15 on control lines 713 (e.g., setting parameters $K_1$ and $K_2$ as previously described) to substantially match the bandwidth of the interference signal.

When the $U_S(\Phi_i)$ signal is synchronized to the true interference signal, the $U_{PD,C}(\Phi_i)$ signal is 90° out of phase with the $U_S(\Phi_i)$ signal, and therefore, the true interference signal. When so synchronized, the output of discriminator 712 integrates to a value of zero because the $U_{PD,C}(\Phi_i)$ signal is 90° out of phase with the true interference signal, and because the useful signal and the noise have substantially zero correlation with the cosine component because they are substantially random, and therefore do not accumulate in the accumulator of discriminator 712. Under the synchronization condition, the non-inertial path of filter 714 (i.e., the $K_1$ path) has a value of zero, and the inertial path of filter 714 (i.e. the $K_1$ path) has its accumulator ($\Sigma$) set with the steady-state frequency number k for NCO 716. If the phase of the $U_S(\Phi_i)$ signal lags the phase of the interference signal, the output of discriminator 712 integrates to a net positive value. If the phase of the $U_S(\Phi_i)$ signal leads the phase of the interference signal, the output of discriminator 712 integrates to a net negative value. These net values are integrated and filtered by dynamic filter 714, and are provided to NCO 716 as an indication of whether the NCO phase needs to be advanced (net positive value) or needs to be delayed (net negative value).

As indicated above, NCO 716 preferably comprises the construction shown in FIG. 7-2. At the beginning of operation, the frequency register (k) and the accumulator in filter 714 are loaded with the frequency number for the mean interference frequency $\omega_{INT}$. Then, at periodic intervals, the output value of filter 714 is provided to the frequency register k of NCO 716. When the phase of NCO 716 lags the phase of the interference signal, the output of discriminator 712 has a net positive value, and this positive value increases the current frequency number k to temporarily speed-up the output of NCO 716. (Increasing the frequency number k increases the NCO frequency, and thereby advances the phase.) On the other hand, when NCO 716 is ahead of the interference signal, the output of discriminator 712 has a net negative value, and this negative number reduces the current frequency number k to temporarily slow-down the output of NCO 716. The frequency number is periodically updated at a rate which is between $10 \cdot B_L$ and $F_S$, where $B_L$ is the equivalent noise bandwidth of the feedback loop for the PLL. Additionally, in preferred embodiments, the update period $T_K$ of the frequency number k is chosen in relation to the frequency step resolution $\Delta F_{NCO}$. The product of $T_K$ and $\Delta F_{NCO}$ preferably follow the following relationship:

$$T_K \cdot \Delta F_{NCO} < \frac{1°, 2°, \text{ or } 3°}{360°}$$

where the numbers 1°, 2°, 3°, and 360° are in degrees and the resulting ratio is unitless. For example, if $\Delta F_{NCO}=F_S/(2,048)=19.5$ kHz, then $T_K<0.427$ $\mu$s (for 3°/360°), with the corresponding update frequency for k being $1/T_K>2.34$ MHz.

As a result of the PLL operation, the $U_S(\Phi_i)$ signal of NCO 716 follows the frequency and phase of the interference signal. Form the above processing steps, phase-lock loop (PLL) system 710 performs the overall step of generating the phase coordinate of the interference signal. The magnitude component of the interference signal is generated by the remaining components of compensator 700.

Finally, it may be appreciated that an inverting feedback loop may instead be used. In this implementation, the negative of the $U_S(\Phi_i)$ signal is synchronized to the true interference signal, but the output of discriminator 712 still integrates to a value of zero because the $U_{PD,C}(\Phi_i)$ signal is still 90° out of phase with the true interference signal. However, if the phase of the $U_S(\Phi_i)$ signal lags the phase of the interference signal, the output of discriminator 712 integrates to a net negative value, rather than a positive value. And if the phase of the $U_S(\Phi_i)$ signal leads the phase of the interference signal, the output of discriminator 712 integrates to a net positive value, rather than a negative value. The net values are integrated and filtered by dynamic filter 714 as before, but the output of filter 714 has its polarity reversed (e.g., it is subtracted from zero) before being provided to NCO 716. This polarity reversal compensates for the reverse orientation of the output of discriminator 712.

The remaining components of compensator 700 generate the interference signal by the following steps. First, the difference signal $u_D(iT_S)$ between the input signal $u_K(iT_S)$ and the interference copy $u_{INT}(iT_S)$ is formed by a subtractor 720, as in previous embodiments. The difference signal $u_D(iT_S)$ then undergoes the step of synchronously detection using the $U_S(\Phi_i)$ signal of NCO 716 to generate magnitude coordinate $M_{INT}(iT_S)$ of the the interference copy $u_{INT}(iT_S)$ with respect to interference signal vector. The interference copy is then constructed by multiplying the two polar coordinates together.

The step of synchronous detection is performed by a synchronous detector comprises a multiplier 734 and a filter 740. The $U_S(\Phi_i)$ signal of NCO 716 is provided to multiplier 734 as a first input, and the difference signal $u_D(iT_S)$ is provided to multiplier 734 as a second input. The difference signal $u_D(iT_S)$ is preferably provided to multiplier 734 in an unfiltered state, and therefore its frequency spectrum contains both the narrow band interference signal and the useful signal, which has a larger bandwidth than the interference signal. Multiplier 734 multiplies these two inputs together. The multiplication has the effect of taking the absolute value of the interference signal present within the difference signal $u_D(iT_S)$. Thus, the negative half-waves of the interference signal are converted to positive half-waves, and are filtered by filter 740 to form the magnitude coordinate. Filter 740 has the same structure as filter 410 shown in FIG. 4 (two gain blocks $K_1$ and $K_2$, and two accumulators $\Sigma_1$ and $\Sigma_2$). Because $u_D(iT_S)$ also contains the useful signal and noise, multiplier 734 also multiplies the useful signal and noise by the $U_S(\Phi_i)$ signal of NCO 716. However, these multiplication products accumulate to substantially zero since the useful signal and noise are substantially random, and therefore have a low correlation with the periodicity of $U_S(\Phi_i)$. Thus, dynamic filter 740 performs the step of removing the useful signal and noise that lie outside of the interference band, thus leaving just the interference signal in the magnitude coordinate. The output of filter 740 thereby generates the magnitude coordinate $M_{INT}(iT_S)$ of the interference signal. The magnitude coordinate $M_{INT}(iT_S)$ is generated in standard form, or non-quadrature form (meaning that it is not in quadrature format), and it is generated from only one of the quadrature components ($U_S(\Phi_i)$) of NCO 716.

To generate the interference copy $u_{INT}(iT_S)$, the magnitude coordinate $M_{INT}(iT_S)$ is multiplied by a copy of the $U_S(\Phi_i)$ signal from NCO 716 by multiplier 750. The output of multiplier 750 is provided to a gating circuit 755 (e.g., latch), which is clocked by the $F_S(T_S)$ clock to synchronize with the input signal $u_K(iT_S)$ at subtractor 720. From gating circuit 755, $u_{INT}(iT_S)$ is provided to subtractor 720, preferably without any intervening filters. The steps of providing $u_{INT}(iT_S)$ to subtractor 720, and the steps performed by subtractor 720, forms a feedback loop around filter 740 through components 750, 755, 720, and 734. The feedback loop is set in a balanced condition (steady-state condition) when the integrated output of multiplier 734 (the error signal) is equal to zero. In the balanced state, the $\Sigma_1$ accumulator of filter 740 holds the appropriate magnitude value for the interference signal, and consequently the interference copy generated at the output of multiplier 750 substantially coincides with the true interference signal. That provides a high degree of interference suppression.

The number N of quantization levels used to represent $u_{INT}(iT_S)$ is generally related to the number M of quantization levels used by ADC 12 to generate $u_K(iT_S)$. N is always at least 2, and is generally in the range of M/16 to 16*M, and preferably in the range of M/2 to 2*M, and more preferably in the range of M to 2*M. In the case where M is between 255 and 1024 (corresponding to 8–10 bits on ADC 12), N is preferably between 255 and 1024. To enable the feedback loop to operate in the positive and negative directions, the maximum value of $u_{INT}(iT_S)$ is preferably scaled to be larger than the maximum value of $u_K(iT_S)$ (so that subtractor 720 may generate positive and negative outputs). The scaling may be readily accomplished by generating $u_{INT}(iT_S)$ with a higher bit resolution than $u_K(iT_S)$, or by left-shifting the bits of $u_{INT}(iT_S)$ by an appropriate amount if $u_{INT}(iT_S)$ has a lower bit resolution than $u_K(iT_S)$.

The copy of the $U_S(\Phi_i)$ signal provided to multiplier is preferably in multiple-bit form with a bit-resolution which is close to, or equal to, the bit resolution provided by ADC 12 for $u_K(iT_S)$. This ensures that the bit resolution of $u_{INT}(iT_S)$ is comparable to that of $u_K(iT_S)$. More specifically, the number $L_2$ of quantization levels provided in $U_S(\Phi_i)$ is generally related to the number M of quantization levels used by ADC 12 to generate $u_K(iT_S)$. $L_2$ is always at least 2, and is generally in the range of M/16 to 16*M, more preferably in the range of M/2 to 2*M. The number $L_2$ of quantization levels is generally equal to $2^R$ where R is the number of bits used in representing $U_S(\Phi_i)$. In the case where M is between 255 and 1024 (corresponding to 8–10 bits on ADC 12), $L_2$ is preferably between 255 and 1024 (corresponding to a bit resolution is between 8 and 10 bits.) These same ranges of values may be in the copy of $U_S(\Phi_i)$ which is provided to multiplier 734 of the synchronous detector.

In general, the filter characteristics of filters 714 and 740 may be different from one another (e.g., they may have different $K_1$ and $K_2$ values). The characteristics of filter 714 are selected to cause the bandwidth of the PLL to substantially match the bandwidth of the phase modulation of the interference signal, while the characteristics of filter 740 are selected to cause the bandwidth of the feedback loop around filter 740 to substantially match the bandwidth of the amplitude modulation of the interference signal. In all of the suppressor embodiments of the present invention where $K_1$ and $K_2$ take values from the selected sets of (1, 2, 4, 8, 16, . . . ) and (½, ¼, ⅛, 1/16, . . . ), the above bandwidths are substantially matched within a factor of 2, with the use of estimator 20 measuring the difference signal. If the interference signal is a frequency modulated signal with nearly constant amplitude, then the characteristics of filter 740 may be selected to cause the bandwidth of the feedback loop around filter 740 to be more narrow than the bandwidth of the PLL. At the other extreme of an example, if the interference signal is an amplitude modulated signal with nearly constant frequency, then the characteristics of filter 714 may be selected to cause the bandwidth of the PLL loop to be more narrow than the bandwidth of the feedback loop around filter 740. The spectrums of typical interference signals may be readily analyzed to determine a relative ratio for the $K_1$ parameters between filters 714 and 740, and a relative ratio for the $K_2$ parameters between filters 714 and 740. Additionally, the interference signal may be first suppressed by an initial set of relative ratios between the $K_1$ and $K_2$ parameters, and the ratios may be varied to test whether the actual interference signal has more frequency-modulation character or more amplitude-modulation character. The actual values of $K_1$ and $K_2$ may be found by using estimator 20 to test the degree of suppression that is obtained with each set of $K_1$ and $K_2$ values, as previously described above with respect to estimator 20 and the other suppressor embodiments. In view of the teachings of the present specification, the above analysis and variation would be well within the ordinary skill of the art.

In some embodiments of compensator 700, the gain factor $K_1$ and $K_2$ for filter 740 may be adjusted such that the following ratio of the gain factors is kept constant: $(K_1)^2/K_2=\alpha=$constant, as is the case for filters 410 described previously. The constant $\alpha$ is preferably in a range of between approximately $0.5/\beta_T$ and approximately $16/\beta_T$, and more preferably in a range of between approximately $1/\beta_T$ and approximately $4/\beta_T$, where $\beta_T$ is the product of the gain (or attenuation) $\beta_1$ for the synchronous detection process (multiplier 734) and the gain (or attenuation) $\beta_2$ of the polar coordinate reconstruction process (multiplier 750) ($\beta_T = \beta_1 \cdot \beta_2$). $\beta_1$ is the ratio of magnitude of the output signal of multiplier 734 divided by the magnitude of $u_D(iT_S)$. $\beta_2$ is the ratio of the magnitude of the output of multiplier 750 divided by the magnitude of the magnitude coordinate $M_{INT}(iT_S)$. The above ranges may be stated in the equivalent form that the quantity $R=\beta_T \cdot (K_1)^2/K_2$ is preferably in the range of approximately 0.5 to approximately 16, and more preferably in the range of approximately 1 to approximately 4. In some embodiments, $\beta_T$ may be near or at a value of 1, so that the quantity $\alpha$ may be in the above state ranges for these embodiments.

While compensator 700 processes the signals in digital form, it may be appreciated that it may process the signals in a combination of analog and digital forms. For example, the difference signal may be kept in analog form, and summator 720 may be an analog component. PLL 710 would process a quantized version of the input signal, and the output of multiplier 755 would be provided to a digital-to-analog converter before being provided to summator 720.

FIGS. 16A, 16B, 17A, and 17B show the suppression achieved by compensator 600 shown in FIG. 9 under the condition of two different interference signals. FIGS. 16A and 17A show the spectrum of the input signal, and FIGS. 16B and 17B show the spectrum of the difference signal $u_D(t)$ after suppression. To simplify the measurements, the useful GPS signal and the noise are modeled by an additive mixture of noise passed through a second-order Butterworth band-pass filter with a bandwidth band of approximately 15 MHz. This bandpass filter simulates the frequency selectivity of the typical, front-end analog circuit of the receiver. The interference signal was set with a mean frequency at 1 MHz from the center frequency of the filter. The ratio of the interference power to the noise power in the filter band was set to 20 dB. FIG. 16A shows the spectrum of the input signal with the interference signal being a pure harmonic (no modulation), and FIG. 17A shows the spectrum of the input signal with the interference signal having an effective bandwidth of 0.1 MHz. FIGS. 16B and 17B show the spectrums of the difference signals after interference compensation. It is apparent from these graphs that the narrow-band interference is effectively suppressed.

The estimation of influence of the suppressor of narrow-band interferences on precision characteristics of a receiver of the navigation systems GPS and GLN was examined under the fixed rejection band of 500 kHz. A configuration of two receivers (separated by a distance) and two satellites was used for the estimation. The estimation processed examined the between-receiver signal differences (both code and phase), the between-satellite single differences (both code and phase), and the receiver-satellite double differences (both code and phase). These differences were computed under the condition that the compensator is turned on for the measurement of the first satellite signal but is turned off for the measurement of the second satellite signal. The computations show that the interference suppresser has the greatest influence on code and phase measurements in the situation where the interference frequency, and consequently the frequency of the compensator rejection filter, coincides with the center frequency of the useful signal of the first satellite. In other words, the greatest influence occurs when the mean frequency of the interference signal, before down-conversion, substantially coincides with the carrier frequency of the first satellite, as received by the receivers (i.e., accounting for Doppler shift).

Let us study the systems of GPS and GLN separately.

GPS Systems

Signals of all the satellites in the GPS system have the same carrier frequency. Consequently, the influence of the suppresser on the code and phase measurements is substantially the same over all the satellites, and therefore disappears when the above difference quantities are computed. There is one exception, however, and that is when the rejection filter frequency of the suppresser coincides with the signal frequency and the rejection band is comparable with the bandwidth of the C/A-code spectrum. In this case the suppresser cuts out not only the interference, but also a large part of the useful signal spectrum, which sharply lowers the energy potential and may lead to failure of the signal tracking (the energy potential is the ratio of the GPS signal power to the single-sided noise spectral density). The bandwidth of the P-code spectrum is roughly ten times the width of the C/A-code spectrum, and accordingly the interference signal does not cut out a large part of the P-code spectrum.

GLN Systems

Satellite signals in the GLN system have difference frequencies for different satellites. Consequently, the influence of the suppresser on code and phase measurements depends on the satellite number. For the C/A-code, the influence of the suppresser on the measurement precision is present only if the difference between frequencies of the satellite carrier frequency and mean interference frequency is less than the bandwidth of the C/A-code spectrum. In such case it is necessary to refuse the use of satellites whose carrier frequencies are situated in the neighborhood (±0.5 MHz) of the interference frequency. For the P-code, there are no such critical frequencies (even for those frequencies which are situated in the neighborhood of the interference frequency, suppresser influence does not exceed permissible limits). The deviations in the receiver-satellite phase double-differences for the P-code of GLN do not exceed ±5°, and the phase measurement for P-code is sufficiently accurate.

While the present invention has been particularly described with respect to the illustrated embodiments, it will be appreciated that various alterations, modifications and adaptations may be made based on the present disclosure, and are intended to be within the scope of the present inventions. While the inventions have been described in connection with what is presently considered to be the most practical and preferred embodiments, it is to be understood that the present inventions are not limited to the disclosed embodiments but, on the contrary, are intended to cover various modifications and equivalent arrangements included within the scope of the appended claims.

What is claimed is:

1. A method of suppressing an interference signal from an input signal which includes a useful signal and the interference signal, the interference signal having a bandwidth more narrow than the bandwidth of the useful signal and having a mean frequency value $\omega_{INT,T}$, said method comprising the steps of:

(a) generating a first signal as a function of the input signal;

(b) generating a first quadrature component and a second quadrature component of said first signal with respect to a first periodic reference signal, said quadrature components being orthogonal to one another, each said quadrature component having a frequency spectrum;

(c) filtering each of said first and second quadrature components in time using at least one accumulator to attenuate a portion of said component's frequency spectrum which is outside a selected frequency band, said selected frequency band including a portion of the interference signal spectrum corresponding to the mean frequency value of the interference signal, said filtering step generating a first filtered component and a second filtered component; and (d) generating a difference signal which is related to the difference between said input signal and said filtered components.

2. The method of claim 1 wherein said first reference signal used in generating said quadrature components in step (b) comprises a sinusoidal signal having a substantially constant frequency.

3. The method of claim 1 wherein said selected frequency band of said step (c) includes the peak of the interference signal and substantially all of the frequency components of the interference signal which have power levels above the power level of the useful signal.

4. A method of suppressing an interference signal from an input signal which includes a useful signal and the interference signal, the interference signal having a bandwidth more narrow than the bandwidth of the useful signal and having a mean frequency value $\omega_{INT,T}$, said method comprising the steps of:

(a) generating a first signal as a function of the input signal;

(b) generating a first quadrature component and a second quadrature component of said first signal with respect to a first periodic reference signal, said quadrature components being orthogonal to one another, each said quadrature component having a frequency spectrum;

(c) filtering each of said first and second quadrature components to attenuate a portion of said component's frequency spectrum which is outside a selected frequency band, said selected frequency band including a portion of the interference signal spectrum corresponding to the mean frequency value of the interference signal, said filtering step generating a first filtered component and a second filtered component; and (d) generating a difference signal which is related to the difference between said input signal and said filtered components; and wherein step (a) comprises the step of providing the difference signal as said first signal, said step thereby forming a feedback loop which continuously conveys a feedback signal around the sequence of processing steps included by steps (a)–(d).

5. The method of claim 2 wherein said step (c) comprises the step of filtering each of said quadrature components with a respective filter having two serially coupled integrators.

6. The method of claim 2 wherein said step (c) comprises the step of filtering each of said quadrature components with a respective filter having a double pole at zero frequency.

7. The method of claim 2 wherein said step (c) comprises the step of filtering each of said quadrature components with a respective filter, said filter providing a structure which is equivalent to two parallel signal processing paths which receive the signal to be filtered and separately process the signal, the outputs of said paths being combined by a summator and provided to a first integrating accumulator ($\Sigma_1$), said first path multiplying the signal by a first gain factor ($K_1$), said second path multiplying the signal by a second gain factor ($K_2$) and integrating the signal with a second integrating accumulator($\Sigma_2$).

8. The method of claim 7 further comprising the step of measuring the frequency spectrum of the difference signal in a frequency band around the mean interference frequency value $\omega_{INT,T}$, and the step of adjusting said first and second gain factors ($K_1, K_2$) from a set of values where the interference signal is detected in said frequency band to a set of values where the interference signal disappears from said frequency band.

9. The method of claim 7 further comprising the step of measuring the frequency spectrum of the difference signal in a frequency band around the mean interference frequency value $\omega_{INT,T}$, and the step of adjusting said first and second gain factors ($K_1, K_2$) from a set of values where the interference signal is not detected in said frequency band to a set of values where the interference signal is detected in said frequency band.

10. The method of claim 7 wherein the ratio $\alpha$ of the square of said first gain factor ($K_1^2$) divided by the second gain factor ($K_2$) is in a range between approximately 0.5 and approximately 16 ($\alpha = K_1^2/K_2$).

11. The method of claim 10 wherein the quantity $\alpha$ is in a range between approximately 1 and approximately 4.

12. The method of claim 2 wherein said step (c) comprises the step of filtering each of said quadrature components with a respective digital filter which receives sampled signal values at a rate of $F_S$, said filter having a frequency transfer function $K_F(f)$ as a function of frequency f comprising the terms $$\frac{K_1}{p} + \frac{K_2}{p^2}, \text{ where } p = j2\pi\left(\frac{f}{F_S}\right),$$

in a frequency band between approximately $-F_S/20$ and approximately $+F_S/20$.

13. The method of claim 2 wherein said step (c) comprises the step of filtering each of said quadrature components with a respective filter, said filter providing a structure which is equivalent to two parallel signal processing paths which receive the signal to be filtered and separately process the signal, the outputs of said paths being combined by a summator and provided to a first integrating accumulator ($\Sigma_1$), said first path multiplying the signal by a first gain factor ($K_1$), said second path multiplying the signal by a second gain factor ($K_2$) and integrating the signal with a second integrating accumulator($\Sigma_2$), said filter step being part of the feedback loop through the processing steps;

wherein each step in said feedback loop modifies the magnitude of the feedback signal by a respective gain/attenuation factor;

wherein all of the steps of said feedback loop except said filtering step provide a collective gain/attenuation factor of $\beta_T$; and wherein the quantity R of the collective factor $\beta_T$ times the square of the filter's first gain factor ($K_1^2$) divided by the filter's second gain factor ($K_2$) ($R = \beta_T \cdot K_1^2/K_2$) is in a range between approximately 0.5 and approximately 16.

14. The method of claim 13 wherein the quantity R is in a range between approximately 1 and approximately 4.

15. A method of suppressing an interference signal from an input signal which includes a useful signal and the interference signal, the interference signal having a bandwidth more narrow than the bandwidth of the useful signal and having a mean frequency value $\omega_{INT,T}$, said method comprising the steps of:

(a) generating a first signal as a function of the input signal;

(b) generating a first quadrature component and a second quadrature component of said first signal with respect to a first periodic reference signal, said quadrature components being orthogonal to one another, each said quadrature component having a frequency spectrum;

(c) filtering each of said first and second quadrature components to attenuate a portion of said component's frequency spectrum which is outside a selected frequency band, said selected frequency band including a portion of the interference signal spectrum corresponding to the mean frequency value of the interference signal, said filtering step generating a first filtered component and a second filtered component; and (d) generating a difference signal which is related to the difference between said input signal and said filtered components; and wherein said step (b) comprises the step of quadrature converting said first signal using said first reference signal to generate said quadrature components; wherein said step (d) comprises the step of inverse quadrature converting said filtered components using a second periodic reference signal to generate an interference copy signal ($u_{INT}$), said second periodic reference signal having the same frequency as said first reference signal and being advanced in phase by a predetermined amount of time; and wherein said step (d) further comprises the step of forming said first signal as the difference between the input signal and said interference copy signal.

16. The method of claim 15 wherein said step (a) comprises the step of generating a digital form of the input signal; wherein said step (b) further comprises the step of generating said quadrature coordinates in digital form; wherein said step (c) further comprises the step of generating said filtered components in digital form.

17. The method of claim 16 wherein said step (b) comprises the step of generating a quantized version of said first signal having a plurality M of quantization levels, and the step of quadrature converting said quantized version.

18. The method of claim 17 wherein M is at least 255.

19. The method of claim 17 wherein M is at least 63.

20. The method of claim 17 wherein said step (b) further comprises the step of generating a quantized version of said first reference signal having a plurality of $L_1$ of quantization levels, and wherein $L_1$ is greater than 1 and is in the range of approximately M/16 to approximately 16*M.

21. The method of claim 17 wherein said step (d) further comprises the step of generating said interference copy signal ($u_{INT}$) in digital form having a plurality of N quantization levels, and wherein N is greater than 1 and is in the range of approximately M/16 to approximately 16*M.

22. The method of claim 21 wherein N is greater than 1 and is in the range of approximately M/2 to approximately 2*M.

23. The method of claim 17 wherein said step (d) further comprises the step of generating a quantized version of said second reference signal having a plurality $L_2$ of quantization levels, and wherein $L_2$ is greater than 1 and is in the range of approximately M/16 to approximately 16*M.

24. The method of claim 23 wherein $L_2$ is greater than 1 and is in the range of approximately M/2 to approximately 2*M.

25. The method of claim 15 wherein said step of quadrature converting provides a first gain/attenuation factor $\beta_1$ between said first signal and the quadrature components of said first signal;

wherein said step of inverse quadrature converting provides a second gain/attenuation factor $\beta_2$ between said filtered components and said interference copy signal; and wherein said step (c) comprises the step of filtering each of said quadrature components with a respective filter, said filter providing a structure which is equivalent to two parallel signal processing paths which receive the signal to be filtered and separately process the signal, the outputs of said paths being combined by a summator and provided to a first integrating accumulator ($\Sigma_1$), said first path multiplying the signal by a first gain factor ($K_1$), said second path multiplying the signal by a second gain factor ($K_2$) and integrating the signal with a second integrating accumulator($\Sigma_2$); and wherein the quantity R of the first factor $\beta_1$ times the second factor $\beta_2$ times the square of said filter's first gain factor ($K_1^2$) divided by the filter's second gain factor ($K_2$) ($R=\beta_1 \cdot \beta_2 \cdot K_1^2/K_2$) is in a range between approximately 0.5 and approximately 16.

26. The method of claim 25 wherein the quantity R is in a range between approximately 1 and approximately 4.

27. A method of suppressing an interference signal from an input signal which includes a useful signal and the interference signal, the interference signal having a bandwidth more narrow than the bandwidth of the useful signal and having a mean frequency value $\omega_{INT,T}$, said method comprising the steps of:

(a) sampling the input signal at periodic intervals and generating a digital representation thereof having M quantization levels of resolution;

(b) generating an approximate copy of the interference signal in a digital form having N quantization levels of resolution;

(c) generating a difference signal which is related to the difference between said digital representation of the input signal and said approximate copy of the interference signal;

wherein said step (b) of generating said approximate copy of the interference signal comprises the steps of:

(d) generating a first quadrature component and a second quadrature component of said difference signal by quadrature converting said difference signal with respect to a first periodic reference signal having a frequency $\omega_{INT}$ approximately equal in magnitude to the mean frequency value $\omega_{INT,T}$ of the interference signal, said quadrature components being orthogonal to one another, each said quadrature component having a frequency spectrum;

(e) filtering each of said first and second quadrature components to attenuate a portion of said component's frequency spectrum which is outside a selected frequency band, said selected frequency band including a portion of the interference signal spectrum corresponding to the mean frequency value of the interference signal, said filtering step generating a first filtered component and a second filtered component; and (f) generating said approximate copy of the interference signal by inverse quadrature converting said filtered components using a second periodic reference signal, said second periodic reference signal having a frequency equal in magnitude to the frequency of said first reference signal.

28. The method of claim 27 wherein the phase of said second reference signal is advanced with respect to the first reference signal by a predetermined amount of time.

29. The method of claim 27 wherein the method generates a rejection bandwidth $\Delta_{SUP,-3\ dB}$ in said difference signal to signals centered about the frequency magnitude of said first reference signal $\omega_{INT}$, and wherein the difference between the mean interference frequency $\omega_{INT,T}$ and the frequency magnitude $\omega_{INT}$ of said first periodic reference signal is not more than one-half the value of the rejection bandwidth $\Delta_{SUP,-3\ dB}$.

30. The method of claim 27 wherein said step (e) comprises the step of filtering each of said quadrature components with a respective filter having two serially coupled integrators.

31. The method of claim 27 wherein said step (e) comprises the step of filtering each of said quadrature components with a respective filter having a double pole at zero frequency.

32. The method of claim 27 wherein said step (e) comprises the step of filtering each of said quadrature components with a respective filter, said filter providing a structure which is equivalent to two parallel signal processing paths which receive the signal to be filtered and separately process the signal, the outputs of said paths being combined by a summator and provided to a first integrating accumulator ($\Sigma_1$), said first path multiplying the signal by a first gain factor ($K_1$), said second path multiplying the signal by a second gain factor ($K_2$) and integrating the signal with a second integrating accumulator($\Sigma_2$).

33. The method of claim 32 wherein said steps (b) and (c) provide a feedback loop which conveys a feedback signal around the loop of processing steps included by steps (b) and (c);

wherein each step in said feedback loop modifies the magnitude of the feedback signal by a respective gain/attenuation factor;

wherein all of the steps of said feedback loop except said filtering step provide a collective gain/attenuation factor of $\beta_T$; and wherein the quantity R of the collective factor $\beta_T$ times the square of the filter's first gain factor ($K_1^2$) divided by the filter's second gain factor ($K_2$) ($R=\beta_T \cdot K_1^2/K_2$) is in a range between approximately 0.5 and approximately 16.

34. The method of claim 33 wherein the quantity R is in a range between approximately 1 and approximately 4.

35. The method of claim 27 wherein M is at least 63.

36. The method of claim 27 wherein said step (d) further comprises the step of generating a quantized version of said first reference signal having a plurality of $L_1$ of quantization levels, and wherein $L_1$ is in the range of approximately M/16 to approximately 16*M.

37. The method of claim 27 wherein N is greater than 1 and is in the range of approximately M/16 to approximately 16*M.

38. The method of claim 27 wherein N is greater than 1 and is in the range of approximately M/2 to approximately 2*M.

39. The method of claim 27 wherein said step (f) further comprises the step of generating a quantized version of said second reference signal having a plurality $L_2$ of quantization levels, and wherein $L_2$ is greater than 1 and is in the range of approximately M/16 to approximately 16*M.

40. The method of claim 37 wherein $L_2$ is in the range of approximately M/2 to approximately 2*M.

41. A method of suppressing an interference signal from an input signal which includes a useful signal and the interference signal, the interference signal having a bandwidth more narrow than the bandwidth of the useful signal and having a mean frequency value $\omega_{INT,T}$, said method comprising the steps of:

(a) generating an approximate copy of the interference signal in analog form;

(b) generating a difference signal which is related to the difference between the input signal and said approximate copy of the interference signal;

(c) sampling the difference signal at periodic intervals and generating a digital representation thereof having a plurality of M quantization levels;

wherein said step (a) of generating said approximate copy of the interference signal comprises the steps of:

(d) generating a first quadrature component and a second quadrature component of said difference signal in digital form by quadrature converting said difference signal with respect to a first periodic reference signal having a frequency $\omega_{INT}$ approximately equal in magnitude to the mean frequency value $\omega_{INT,T}$ of the interference signal, said quadrature components being orthogonal to one another, each said quadrature component having a frequency spectrum;

(e) filtering each of said first and second quadrature components to attenuate a portion of said component's frequency spectrum which is outside a selected frequency band, said selected frequency band including a portion of the interference signal spectrum corresponding to the mean frequency value of the interference signal, said filtering step generating a first filtered component and a second filtered component; and (f) generating a digital form of said approximate copy of the interference signal by inverse quadrature converting said filtered components using a second periodic reference signal, said second periodic reference signal having a frequency equal in magnitude to the frequency of said first reference signal; and (g) converting the digital form of said approximate copy of the interference signal to analog form with a resolution having a plurality N of quantization levels, wherein N is greater than 1 and in a range of approximately M/16 to approximately 16*M.

42. The method of claim 41 wherein said step (c) comprises the step of quantizing said difference signal to two levels.

43. The method of claim 41 wherein the phase of said second reference signal is advanced with respect to the first reference signal by a predetermined amount of time.

44. The method of claim 41 wherein the method generates a rejection bandwidth $\Delta_{SUP,-3\,dB}$ in said difference signal to signals centered about the frequency magnitude of said first reference signal $\omega_{INT}$, and wherein the difference between the mean interference frequency value $\omega_{INT,T}$ and the frequency magnitude $\omega_{INT}$ of said first periodic reference signal is not more than one-half the value of the rejection bandwidth $\Delta_{SUP,-3\,dB}$.

45. A method of suppressing an interference signal from an input signal which includes a useful signal and the interference signal, the interference signal having a bandwidth more narrow than the bandwidth of the useful signal and having a mean frequency value $\omega_{INT,T}$, said method comprising the steps of:

(a) quadrature down-converting the input signal using a quadrature local oscillator having frequency value $\omega_H$ to produce a first quadrature component $U_{K,C}$ and a second quadrature component $U_{K,S}$, said quadrature components being orthogonal, the mean interference frequency value ($\omega_{INT,T}$) being shifted to an intermediate value $\Omega_{INT,T}$ ($\Omega_{INT,T}=|\omega_{INT,T}-\omega_H|$), each of said quadrature components having a frequency spectrum which includes said intermediate value $\Omega_{INT,T}$;

(b) generating an approximate copy of the down-converted interference signal in quadrature form having a first quadrature component $U_{INT,C}$ and a second quadrature component $U_{INT,S}$;

(c) generating a difference signal in quadrature form which is related to the difference between the down-converted input signal and said approximate copy of the down-converted interference signal, said difference signal having a first quadrature component $U_{D,C}$ which is related to the difference between the first quadrature components of the down-converted input signal and said approximate copy ($U_{D,C}$ $U_{K,C}-U_{INT,C}$) and a second quadrature component $U_{D,S}$ which is related to the difference between the second quadrature components of the down-converted input signal and said approximate copy ($U_{D,S}$ $U_{K,S}-U_{INT,S}$), said first and second quadrature components ($U_{D,C},U_{D,S}$) being a first set of quadrature components of the difference signal, each of said quadrature components ($U_{D,C},U_{D,S}$) having a frequency spectrum that includes said intermediate value $\Omega_{INT,T}$ of the mean interference frequency; and wherein said step (b) of generating said approximate copy of the interference signal comprises the steps of:

(d) generating a second set of quadrature components ($C_D$, $S_D$) of the difference signal with respect to a first sinusoidal quadrature reference signal, said step comprising the step of frequency shifting said first set of quadrature components ($U_{D,C},U_{D,S}$) of the difference signal in a first direction such that said intermediate value $\Omega_{INT,T}$ is shifted to a value of approximately zero frequency;

(e) filtering each of said quadrature components ($C_D$, $S_D$) of said second set to generate respective filtered quadrature components ($U_C$, $U_S$), each of said filtered quadrature components ($U_C$, $U_S$) having a frequency spectrum which includes said shifted value of said intermediate value $\Omega_{INT,T}$;

(f) generating the quadrature components ($U_{INT,C}$, $U_{INT,S}$) of said approximate interference copy by frequency shifting said filtered quadrature components ($U_C$, $U_S$) in a second direction opposite to the first direction such that said shifted value of the mean interference frequency is shifted back to said intermediate value $\Omega_{INT,T}$, wherein said step of frequency shifting in the second direction uses a second sinusoidal quadrature reference signal having substantially the same magnitude of frequency as said first reference signal, the full phase of said second quadrature reference signal being shifted by a substantially constant amount of time with respect to the full phase of said first quadrature reference signal such that the magnitude of the full phase of said first reference signal is delayed in time with respect to the magnitude of the full phase of said second reference signal;

said steps (b) and (c) thereby providing two feedback adjustment loops, each of which modifies a respective quadrature component of said difference signal to suppress the amount of the interference signal present within the difference signal.

46. The method of claim 45 wherein the step of frequency shifting in said step (d) comprises the step of conjugate-complex multiplying said first set of quadrature components ($U_{D,C}, U_{D,S}$) of the difference signal with said first quadrature reference signal, and wherein said first quadrature reference signal has a frequency value approximately equal to said intermediate value $\Omega_{INT,T}$.

47. The method of claim 45 wherein the step of frequency shifting in said step (d) comprises the step of complex multiplying said first set of quadrature components ($U_{D,C}, U_{D,S}$) of the difference signal with said first quadrature reference signal, and wherein said first quadrature reference signal has a frequency value approximately equal to the negative of said intermediate value $\Omega_{INT,T}$.

48. The method of claim 45 wherein the step of frequency shifting in said step (f) comprises the step of complex multiplying said filtered quadrature components ($U_C, U_S$) with said second quadrature reference signal, and wherein said second quadrature reference signal has a frequency value approximately equal to said intermediate value $\Omega_{INT,T}$.

49. The method of claim 45 wherein the step of frequency shifting in said step (f) comprises the step of conjugate-complex multiplying said filtered quadrature components ($U_C, U_S$) with said second quadrature reference signal, and wherein said second quadrature reference signal has a frequency value approximately equal to the negative of said intermediate value $\Omega_{INT,T}$.

50. The method of claim 45 wherein said step (c) further comprises the step of sampling said first set of quadrature components ($U_{D,C}, U_{D,S}$) of the difference signal at periodic intervals and generating a digital representation thereof having M quantization levels for each quadrature component;

wherein steps (d), (e), and (f) are performed with the signals in digital form; and wherein said step (b) further comprises the step (g) of converting the digital form of the quadrature components of said approximate interference copy ($U_{INT,C}, U_{INT,S}$) to analog form with a resolution of N quantization levels in each of said components ($U_{INT,C}, U_{INT,S}$), wherein N is greater than 1 and is in a range of approximately M/16 to approximately 16*M.

51. The method of claim 50 wherein said first quadrature reference signal provided in step (d) is in digital form having a resolution of $L_1$ quantization levels, wherein $L_1$ is greater than 1 and is in a range of approximately M/16 to approximately 16*M.

52. The method of claim 50 wherein said second quadrature reference signal provided in step (f) is in digital form having a resolution of $L_2$ quantization levels, wherein $L_2$ is greater than 1 and is in a range of approximately M/16 to approximately 16*M.

53. The method of claim 45 wherein said step (a) comprises the step of direct quadrature converting the input signal by the use of two analog multipliers and two low-pass filters, each said multiplier receiving the input signal and a respective quadrature component of a quadrature reference signal, the output of each said multiplier being provided to a respective one of said low-pass filters.

54. The method of claim 45 wherein said step (e) comprises the step of filtering each of said quadrature components ($C_D, S_D$) of said second set with a respective filter having two serially coupled integrators.

55. The method of claim 45 wherein said step (e) comprises the step of filtering each of said quadrature components ($C_D, S_D$) of said second set with a respective filter having a double pole at zero frequency.

56. The method of claim 45 wherein said step (e) comprises the step of filtering each of said quadrature components ($C_D, S_D$) of said second set with a respective filter, said filter providing a structure which is equivalent to two parallel signal processing paths which receive the signal to be filtered and separately process the signal, the outputs of said paths being combined by a summator and provided to a first integrating accumulator ($\Sigma_1$), said first path multiplying the signal by a first gain factor ($K_1$), said second path multiplying the signal by a second gain factor ($K_2$) and integrating the signal with a second integrating accumulator ($\Sigma_2$).

57. The method of claim 56 wherein each step in each said feedback loop modifies the magnitude of the feedback signal of the loop by a respective gain/attenuation factor;

wherein all of the steps of each said feedback loop except said filtering step of said feedback loop provide a collective gain/attenuation factor of $\beta_T$; and wherein, for each said feedback loop, the quantity R of the collective factor $\beta_T$ of the feedback loop times the square of the first gain factor ($K_1^2$) of the filter in the feedback loop divided by the second gain factor ($K_2$) of the filter in the feedback loop ($R=\beta_T \cdot K_1^2/K_2$) is in a range between approximately 0.5 and approximately 16.

58. The method of claim 57 wherein the quantity R is in a range between approximately 1 and approximately 4.

59. A method of suppressing an interference signal from an input signal which includes a useful signal and the interference signal, the interference signal having a bandwidth more narrow than the bandwidth of the useful signal and having a mean frequency value $\Omega_{INT,T}$, said method comprising the steps of:

(a) quadrature down-converting the input signal using a quadrature local oscillator having a frequency value $\omega_H$ to produce a first quadrature component $U_{K,C}$ and a second quadrature component $U_{K,S}$, said quadrature components being orthogonal, the mean interference frequency value ($\omega_{INT,T}$) being shifted to an intermediate value $\Omega_{INT,T}$ ($\Omega_{INT,T}=|\omega_{INT,T}-\omega_H|$);

(b) generating an approximate copy of the down-converted interference signal in quadrature form having a first quadrature component $U_{INT,C}$ and a second quadrature component $U_{INT,S}$;

(c) generating a difference signal in quadrature form which is related to the difference between the down-converted input signal and said approximate copy of the down-converted interference signal, said difference signal having a first quadrature component $U_{D,C}$ which is related to the difference between the first quadrature components of the down-converted input signal and said approximate copy ($U_{D,C} U_{K,C}-U_{INT,C}$) and a second quadrature component $U_{D,S}$ which is related to the difference between the second quadrature components of the down-converted input signal and said approximate copy ($U_{D,S} U_{K,S}-U_{INT,S}$), said first and second quadrature components ($U_{D,C}, U_{D,S}$) being a first set of quadrature components of the difference signal, and wherein said step (b) of generating said approximate copy of the interference signal comprises the steps of:

(d) conjugate complex multiplying the first set of quadrature components ($U_{D,C}, U_{D,S}$) of the difference signal by a first quadrature reference signal to generate a second set of quadrature components ($C_D, S_D$) of the difference signal with respect to the first quadrature reference signal;

(e) filtering said second set of quadrature components ($C_D$, $S_D$) of the difference signal; and (f) complex multiplying the filtered second set of quadrature components ($C_D$, $S_D$) of the difference signal by a version of said first quadrature reference signal to produce the quadrature components of said approximate interference copy;

said steps (b) and (c) thereby providing two feedback adjustment loops, each of which modifies a respective quadrature component of said difference signal to suppress the amount of the interference signal present within the difference signal.

60. The method of claim 59 wherein the phase of said version of said first quadrature reference signal is advanced in time with respect to said quadrature reference signal by an amount which is less than one-half period of the intermediate frequency value $\Omega_{INT,T}$.

61. A method of suppressing an interference signal from an input signal which includes a useful signal and the interference signal, the interference signal having a bandwidth more narrow than the bandwidth of the useful signal and having a mean frequency value $\omega_{INT,T}$, said method comprising the steps of:

(a) quadrature down-converting the input signal using a quadrature local oscillator having frequency value $\omega_H$ to produce a first quadrature component $U_{K,C}$ and a second quadrature component $U_{K,S}$, said quadrature components being orthogonal, the mean interference frequency value ($\omega_{INT,T}$) being shifted to an intermediate value $\Omega_{INT,T}$ ($\Omega_{INT,T}=|\omega_{INT,T}-\omega_H|$);

(b) generating an approximate copy of the down-converted interference signal in quadrature form having a first quadrature component $U_{INT,C}$ and a second quadrature component $U_{INT,S}$;

(c) generating a difference signal in quadrature form which is related to the difference between the down-converted input signal and said approximate copy of the down-converted interference signal, said difference signal having a first quadrature component $U_{D,C}$ which is related to the difference between the first quadrature components of the down-converted input signal and said approximate copy ($U_{D,C}$ $U_{K,C}-U_{INT,C}$) and a second quadrature component $U_{D,S}$ which is related to the difference between the second quadrature components of the down-converted input signal and said approximate copy ($U_{D,S}$ $U_{K,S}-U_{INT,S}$), said first and second quadrature components ($U_{D,C}$,$U_{D,S}$) being a first set of quadrature components of the difference signal, and wherein said step (b) of generating said approximate copy of the interference signal comprises the steps of:

(d) complex multiplying the first set of quadrature components ($U_{D,C}$,$U_{D,S}$) of the difference signal by a first quadrature reference signal to generate a second set of quadrature components ($C_D$, $S_D$) of the difference signal with respect to the first quadrature reference signal;

(e) filtering said second set of quadrature components ($C_D$, $S_D$) of the difference signal; and (f) conjugate complex multiplying the filtered second set of quadrature components ($C_D$, $S_D$) of the difference signal by a version of said first quadrature reference signal to produce the quadrature components of said approximate interference copy;

said steps (b) and (c) thereby providing two feedback adjustment loops, each of which modifies a respective quadrature component of said difference signal to suppress the amount of the interference signal present within the difference signal.

62. The method of claim 61 wherein the phase of said version of said first quadrature reference signal is advanced in time with respect to said quadrature reference signal by an amount which is less than one-half period of the intermediate frequency value $\Omega_{INT,T}$.

63. A method of suppressing an interference signal from an input signal which includes a useful signal and the interference signal, the interference signal having a bandwidth more narrow than the bandwidth of the useful signal and having a mean frequency value $\omega_{INT,T}$, said method comprising the steps of:

(a) quadrature down-converting the input signal using a quadrature local oscillator having a frequency value $\omega_H$ to produce a first quadrature component $U_{K,C}$ and a second quadrature component $U_{K,S}$, said quadrature components being orthogonal, the mean interference frequency value ($\omega_{INT,T}$) being shifted to an intermediate value $\Omega_{INT,T}$ ($\Omega_{INT,T}=|\omega_{INT,T}-\omega_H|$);

(b) generating an approximate copy of the down-converted interference signal in quadrature form having a first quadrature component $U_{INT,C}$ and a second quadrature component $U_{INT,S}$;

(c) generating a difference signal in quadrature form which is related to the difference between the down-converted input signal and said approximate copy of the down-converted interference signal, said difference signal having a first quadrature component $U_{D,C}$ which is related to the difference between the first quadrature components of the down-converted input signal and said approximate copy ($U_{D,C}$ $U_{K,C}-U_{INT,C}$) and a second quadrature component $U_{D,S}$ which is related to the difference between the second quadrature components of the down-converted input signal and said approximate copy ($U_{D,S}$ $U_{K,S}-U_{INT,S}$), said first and second quadrature components ($U_{D,C}$,$U_{D,S}$) being a first set of quadrature components of the difference signal, and wherein said step (b) of generating said approximate copy of the interference signal comprises the steps of:

(d) complex multiplying the first set of quadrature components ($U_{D,C}$,$U_{D,S}$) of the difference signal by a first quadrature reference signal to generate a second set of quadrature components ($C_D$, $S_D$) of the difference signal with respect to the first quadrature reference signal;

(e) filtering said second set of quadrature components ($C_D$, $S_D$) of the difference signal; and (f) complex multiplying the filtered second set of quadrature components ($C_D$, $S_D$) of the difference signal by a second quadrature reference signal to produce the quadrature components of said approximate interference copy, said second quadrature reference signal substantially being the complex conjugate of said first quadrature reference signal;

said steps (b) and (c) thereby providing two feedback adjustment loops, each of which modifies a respective quadrature component of said difference signal to suppress the amount of the interference signal present within the difference signal.

64. The method of claim 63 further comprising the step of advancing the phase of said second quadrature reference signal with respect to said first quadrature reference signal by an amount which is less than one-half period of the intermediate frequency value $\Omega_{INT,T}$.

65. The method of claim 63 wherein said step (d) of complex multiplying comprises the step of conjugate complex multiplying said first set of quadrature components ($U_{D,C}, U_{D,S}$) of the difference signal by said first quadrature reference signal, and wherein said step (f) of complex multiplying comprises the step of conjugate complex multiplying the filtered second set of quadrature components ($C_D$, $S_D$) of the difference signal by a second quadrature reference signal.

66. The method of claim 65 further comprising the step of advancing the phase of said second quadrature reference signal with respect to said first quadrature reference signal by an amount which is less than one-half period of the intermediate frequency value $\Omega_{INT,T}$.

67. A method of suppressing an interference signal from an input signal which includes a useful signal and the interference signal, the interference signal having a bandwidth more narrow than the bandwidth of the useful signal and having a mean frequency value $\Omega_{INT,T}$, said method comprising the steps of:
 (a) generating an approximate copy of the interference signal;
 (b) generating a difference signal which is related to the difference between the input signal and said approximate copy of the interference signal;
 wherein said step (a) of generating said approximate copy of the interference signal comprises the steps of:
  (c) generating a phase coordinate signal having substantially constant amplitude and having a frequency and phase which substantially follow the frequency and phase of the interference signal, said phase coordinate signal being generated with a phase-lock loop;
  (d) generating a magnitude coordinate signal by synchronous detection of said difference signal with said phase coordinate signal followed by filtering;
  (e) generating said approximate interference copy by multiplying said phase coordinate signal and said magnitude coordinate signal, said steps (a) and (b) thereby providing a feedback adjustment loop which reduces the amplitude of the interference signal in the difference signal.

68. The method of claim 67 wherein there is substantially no phase difference in the phase coordinate signal used in steps (d) and (e).

69. The method of claim 67 wherein said step (b) further comprises the step of sampling the input signal at periodic intervals and generating a digital representation thereof having a plurality M of quantization levels; and
 wherein said step (a) further comprises the step of generating the approximate copy of the interference signal at said periodic intervals in digital form having N quantization levels, wherein N is greater than 1 and is in a range of approximately M/16 to approximately 16*M.

70. The method of claim 67 wherein said step (b) further comprises the step of sampling the input signal at periodic intervals and generating a digital representation thereof having a plurality M of quantization levels;
 wherein said step (c) generates said phase coordinate signal at said periodic intervals in digital form having $L_2$ quantization levels, wherein $L_2$ is greater than 2 and is in a range of approximately M/16 to approximately 16*M; and
 wherein said step (e) further comprises the step of multiplying said digital form of said phase coordinate signal with said magnitude coordinate signal.

71. The method of claim 70 wherein said step (d) further comprises the step of synchronously detecting said difference signal with said digital form of said phase coordinate signal.

72. The method of claim 67 wherein said step (b) further comprises the step of sampling the input signal at periodic intervals and generating a digital representation thereof having a plurality M of quantization levels;
 wherein said step (c) generates said phase coordinate signal at said periodic intervals in digital form having $L_2$ quantization levels, wherein $L_2$ is greater than 2 and is in a range of approximately M/16 to approximately 16*M; and
 wherein said step (d) further comprises the step of synchronously detecting said difference signal with said digital form of said phase coordinate signal.

73. The method of claim 67 wherein said step (c) generates said phase coordinate signal in quadrature format, wherein step (d) generates said magnitude coordinate signal in non-quadrature format, and wherein said step (e) multiplies said magnitude coordinate signal by only one of the quadrature components of said phase coordinate signal.

74. The method of claim 67 wherein said step (c) generates said phase coordinate signal in quadrature format, wherein step (d) generates said magnitude coordinate signal in non-quadrature format by synchronously detecting said difference signal with only one of the quadrature components of said phase coordinate signal.

75. The method of claim 67 wherein the frequency bandwidth of the difference signal synchronously detected by said step (d) is substantially larger than the bandwidth of the interference signal.

76. The method of claim 67 wherein step (b) generates said difference signal in proportion to the difference between the input signal and said approximate copy of the interference signal; and
 wherein step (d) comprises the steps of receiving said difference signal in unfiltered form and of synchronously detecting the unfiltered difference signal.

77. The method of claim 67 wherein said step (e) generates said approximate interference copy without filtering the multiplication product of said phase coordinate signal and said magnitude coordinate signal.

78. The method of claim 67 wherein said phase-lock loop comprises a filter having adjustable filtering characteristics which change the bandwidth of the PLL loop, wherein said method further comprises the step of measuring the frequency spectrum of the difference signal in a frequency band around the mean interference frequency value $\omega_{INT,T}$, and the step of adjusting the characteristics of said filter to substantially match the bandwidth of the PLL loop within a factor of two of the bandwidth of the interference signal.

79. The method of claim 67 wherein said phase-lock loop comprises a filter which provides a structure which is equivalent to two parallel signal processing paths which receive the signal to be filtered and separately process the signal, the outputs of said paths being combined by a summator and provided as the filter output, said first path multiplying the signal by a first gain factor ($K_1$), said second path multiplying the signal by a second gain factor ($K_2$) and integrating the signal with an integrating accumulator($\Sigma$).

80. The method of claim 79 further comprising the step of measuring the frequency spectrum of the difference signal in a frequency band around the mean interference frequency value $\omega_{INT,T}$, and the step of adjusting said first and second gain factors ($K_1, K_2$) from a set of values where the interference signal is detected in said frequency band to a set of values where the interference signal disappears from said frequency band.

81. The method of claim 79 further comprising the step of measuring the frequency spectrum of the difference signal in a frequency band around the mean interference frequency value $\omega_{INT,T}$, and the step of adjusting said first and second gain factors ($K_1,K_2$) from a set of values where the interference signal is not detected in said frequency band to a set of values where the interference signal is detected in said frequency band.

82. The method of claim 67 wherein said step of filter in said step (d) comprises the step of filtering with a filter having adjustable filtering characteristics, wherein said method further comprises the step of measuring the frequency spectrum of the difference signal in a frequency band around the mean interference frequency value $\omega_{INT,T}$, and the step of adjusting the characteristics of said filter to substantially match the bandwidth of PLL within a factor of two of the bandwidth of the interference signal.

83. The method of claim 67 wherein said phase-lock loop comprises a filter which provides a structure which is equivalent to two parallel signal processing paths which receive the signal to be filtered and separately process the signal, the outputs of said paths being combined by a summator and provided as the filter output, said first path multiplying the signal by a first gain factor ($K_1$), said second path multiplying the signal by a second gain factor ($K_2$) and integrating the signal with an integrating accumulator($\Sigma$).

84. A method of suppressing an interference signal from an input signal which includes a useful signal and the interference signal, the interference signal having a bandwidth more narrow than the bandwidth of the useful signal and having a mean frequency value $\omega_{INT,T}$, said method comprising the steps of:

(a) generating a first signal as a function of the input signal;

(b) generating a first quadrature component and a second quadrature component of said first signal with respect to a first periodic reference signal, said quadrature components being orthogonal to one another, each said quadrature component having a frequency spectrum;

(c) filtering each of said first and second quadrature components in the time domain to attenuate a portion of said component's frequency spectrum which is outside a selected frequency band, said selected frequency band including a portion of the interference signal spectrum corresponding to the mean frequency value of the interference signal, said filtering step comprising the step of adding together present and past values of the first quadrature component and the step of adding together present and past values of the second quadrature component, said filtering step generating a first filtered component and a second filtered component; and (d) generating a difference signal which is related to the difference between said input signal and said filtered components.

85. A method of suppressing an interference signal from an input signal which includes a useful signal and the interference signal, the interference signal having a bandwidth more narrow than the bandwidth of the useful signal and having a mean frequency value $\omega_{INT,T}$, said method comprising the steps of:

(a) generating a first signal as a function of the input signal;

(b) generating a first quadrature component and a second quadrature component of said first signal with respect to a first periodic reference signal, said quadrature components being orthogonal to one another, each said quadrature component having a frequency spectrum;

(c) filtering each of said first and second quadrature components in time with a respective filter having at least one pole to attenuate a portion of said component's frequency spectrum which is outside a selected frequency band, said selected frequency band including a portion of the interference signal spectrum corresponding to the mean frequency value of the interference signal, said filtering step generating a first filtered component and a second filtered component; and (d) generating a difference signal which is related to the difference between said input signal and said filtered components.

* * * * *

UNITED STATES PATENT AND TRADEMARK OFFICE
CERTIFICATE OF CORRECTION

PATENT NO. : 6,219,376 B1
DATED : April 17, 2001
INVENTOR(S) : Zhodzishsky et al.

It is certified that error appears in the above-identified patent and that said Letters Patent is hereby corrected as shown below:

Column 48,
Lines 55, 58 and 61, delete "claim 2" and insert therefor -- claim 4 --.

Column 49,
Lines 4 and 49, delete "accumulator($\Sigma_2$)" and insert therefor -- accumulator ($\Sigma_2$) --.
Lines 27 and 39, delete "claim 2" and insert therefor -- claim 4 --.

Column 50,
Line 39, before "wherein", insert -- and --.
Line 49, delete "plurality of" and insert therefor -- plurality --.

Column 51,
Line 19, delete "accumulator($\Sigma_2$)" and insert therefor -- accumulator ($\Sigma_2$) --.

Column 52,
Line 32, delete "accumulator($\Sigma_2$)" and insert therefor -- accumulator ($\Sigma_2$) --.

Column 53,
Line 66, after "having" insert -- a --.

Column 54,
Line 19, delete "$(U_{D,C} U_{K,C} - U_{INT,C})$" and insert therefor -- $(U_{D,C} \propto U_{K,C} - U_{INT,C})$ --.
Line 23, delete "$(U_{D,S} U_{K,S} - U_{INT,S})$" and insert therefor -- $(U_{D,S} \propto U_{K,S} - U_{INT,S})$ --.

Column 56,
Line 52, delete "$(U_{D,C} U_{K,C} - U_{INT,C})$" and insert therefor -- $(U_{D,C} \propto U_{K,C} - U_{INT,C})$ --.
Line 56, delete "$(U_{D,S} U_{K,S} - U_{INT,S})$" and insert therefor -- $(U_{D,S} \propto U_{K,S} - U_{INT,S})$ --.

Column 57,
Line 25, after "having" insert -- a --.
Line 42, delete "$(U_{D,C} U_{K,C} - U_{INT,C})$" and insert therefor -- $(U_{D,C} \propto U_{K,C} - U_{INT,C})$ --.
Line 46, delete "$(U_{D,S} U_{K,S} - U_{INT,S})$" and insert therefor -- $(U_{D,S} \propto U_{K,S} - U_{INT,S})$ --.

Column 58,
Line 32, delete "$(U_{D,C} U_{K,C} - U_{INT,C})$" and insert therefor -- $(U_{D,C} \propto U_{K,C} - U_{INT,C})$ --.
Line 36, delete "$(U_{D,S} U_{K,S} - U_{INT,S})$" and insert therefor -- $(U_{D,S} \propto U_{K,S} - U_{INT,S})$ --.

UNITED STATES PATENT AND TRADEMARK OFFICE
CERTIFICATE OF CORRECTION

PATENT NO.    : 6,219,376 B1
DATED         : April 17, 2001
INVENTOR(S)   : Zhodzishsky et al.

It is certified that error appears in the above-identified patent and that said Letters Patent is hereby corrected as shown below:

<u>Column 60,</u>
Line 57, delete "accumulator($\Sigma$)" and insert therefor -- accumulator ($\Sigma$) --.

<u>Column 61,</u>
Line 7, delete "filter" and insert therefor -- filtering --.
Line 14, delete "PLL" and insert therefor -- the phase-lock loop --.
Line 24, delete "accumulator($\Sigma$)" and insert therefor -- accumulator ($\Sigma$) --.

Signed and Sealed this

Fifteenth Day of November, 2005

JON W. DUDAS
*Director of the United States Patent and Trademark Office*